US012277511B2

(12) United States Patent
Ablitt et al.

(10) Patent No.: US 12,277,511 B2
(45) Date of Patent: Apr. 15, 2025

(54) METHOD AND SYSTEM FOR PREDICTING RELEVANT NETWORK RELATIONSHIPS

(71) Applicant: SAS INSTITUTE INC., Cary, NC (US)

(72) Inventors: Nicholas Akbar Ablitt, Putney (GB); James Byron Morris, Raleigh, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 18/777,760

(22) Filed: Jul. 19, 2024

(65) Prior Publication Data
US 2025/0036981 A1 Jan. 30, 2025

Related U.S. Application Data

(60) Provisional application No. 63/529,621, filed on Jul. 28, 2023.

(51) Int. Cl.
G06N 7/01 (2023.01)
(52) U.S. Cl.
CPC .................................. *G06N 7/01* (2023.01)
(58) Field of Classification Search
CPC ........................................................ G06N 7/01
See application file for complete search history.

(56) References Cited

U.S. PATENT DOCUMENTS

| 7,769,751 | B1 | 8/2010 | Wu et al. |
| 8,612,208 | B2 | 12/2013 | Cooper et al. |
| 10,885,020 | B1 | 1/2021 | Ablitt |
| 11,200,503 | B2 | 12/2021 | Medlock et al. |

(Continued)

FOREIGN PATENT DOCUMENTS

WO    2023107748 A1    6/2023

OTHER PUBLICATIONS

Bridges, et al, Understanding GPU Power: A Survey of Profiling, Modeling, and Simulation Methods, [received Oct. 3, 2024]. Retrieved from Internet:<https://dl.acm.org/doi/abs/10.1145/2962131> (Year: 2016).*

(Continued)

Primary Examiner — Paul M Knight
Assistant Examiner — Bart I Rylander
(74) Attorney, Agent, or Firm — The Law Office of Tiffany E. Monroe, LLC; Tiffany E. Monroe

(57) ABSTRACT

The computing device trains a first model on a first data set using a first graph to predict relevant links between a plurality of nodes. The computing device applies the trained first model to the one or more links between the plurality of nodes from a first node, iteratively connects each node to the one or more first sets of generated networks for each of the relevant links until the relevant links for connection to the plurality of nodes are not present, and outputs the one or more first sets of generated networks. The computing device also applies the trained first model to the one or more links between the plurality of nodes, removes the non-relevant links, connects each node of the plurality of nodes with the relevant links to generate one or more second sets of networks, and outputs the one or more second sets of generated networks.

30 Claims, 48 Drawing Sheets

(56) References Cited

U.S. PATENT DOCUMENTS

| | | |
|---|---|---|
| 11,231,830 B2 | 1/2022 | Morris et al. |
| 11,978,273 B1 | 5/2024 | Ramaswamy et al. |
| 2003/0115188 A1 | 6/2003 | Srinivasa et al. |
| 2022/0108082 A1 | 4/2022 | Morris et al. |
| 2023/0290168 A1 | 9/2023 | Hasegawa et al. |
| 2024/0126732 A1 | 4/2024 | Ablitt |
| 2024/0202571 A1 | 6/2024 | Yaghi et al. |

OTHER PUBLICATIONS

Chen, et al, A fast algorithm for predicting links to nodes of interest, [received Oct. 3, 2024]. Retrieved from Internet: <https://www.sciencedirect.com/science/article/pii/S0020025515007021> (Year: 2016).*

Deng, et al, Graph Neural Network-Based Efficient Subgraph Embedding Method for Link Prediction in Mobile Edge Computing, [received Oct. 3, 2024]. Retrieved from Internet:<https://www.mdpi.com/1424-8220/23/10/4936> (Year: 2023).*

Ge, et al, Intelligent Link Prediction Management Based on Community Discovery and User Behavior Preference in Online Social Networks, [received Oct. 3, 2024]. Retrieved from Internet:<https://onlinelibrary.wiley.com/doi/full/10.1155/2021/3860083> (Year: 2021).*

Jiang, et al, Community Detection in complex networks with an ambiguous structure using central node based link prediction, [received Oct. 3, 2024]. Retrieved from Internet: <https://www.sciencedirect.com/science/article/pii/S0950705120300897> (Year: 2020).*

Samad, et al, A Comprehensive Survey of Link Prediction Techniques for Social Network, [received Jan. 3, 2024]. Retrieved from Internet:< https://publications.eai.eu/index.php/inis/article/view/257> (Year: 2020).*

Zhan, et al, Integrated anchor and social link predictions across multiple social networks, [received Oct. 3, 2024]. Retrieved from Internet: <https://link.springer.com/article/10.1007/s10115-018-1210-1> (Year: 2019).*

Zhang, et al, Link Prediction Based on Graph Neural Networks, [received Oct. 3, 2024]. Retrieved from Internet:<https://proceedings.neurips.cc/paper/2018/hash/53f0d7c537d99b3824f0f99d62ea2428-Abstract.html> (Year: 2018).*

Chen et al., "Efficient Lossless Compression of Trees and Graphs", accessed from: https://users.cs.duke.edu/~reif/paper/chen/graph/graph.pdf, pp. 1-9.

Bannach et al., "Faster Graph Algorithms Through DAG Compression", accessed from: https://drops.dagstuhl.de/storage/00lipics/lipics-vol289-stacs2024/LIPIcs.STACS.2024.8/LIPIcs.STACS.2024.8.pdf, pp. 8:1-8:18.

* cited by examiner

1421

1422

1424

| Nodes | Node Attributes | | |
|---|---|---|---|
| Node ID | Node Type | Date of Birth | Value |
| D1 | Application | | $1,200 |
| D11 | Application | | $10,000 |
| D12 | Application | | $500 |
| D2 | Application | | $4,000 |
| D21 | Application | | $1,000 |
| D3 | Application | | $4,000 |
| D31 | Application | | $2,000 |
| D4 | Application | | $1,000 |
| D41 | Application | | $2,300 |
| D5 | Application | | $1,500 |
| D51 | Application | | $5,000 |
| Bx1 | Business | | |
| Bx2 | Business | | |
| P1 | Person | 03.22.1992 | |
| P11 | Person | 10.16.1990 | |
| P2 | Person | 04.12.1983 | |
| P3 | Person | 11.21.1995 | |
| P4 | Person | 01.02.2000 | |
| P5 | Person | 06.28.1970 | |
| L1 | Location | | |
| L2 | Location | | |
| L3 | Location | | |
| L4 | Location | | |
| L5 | Location | | |
| E1 | Email | | |
| E2 | Email | | |
| E3 | Email | | |
| Ey | Email | | |
| E5 | Email | | |
| T1 | Telephone | | |
| T2 | Telephone | | |
| T4 | Telephone | | |

Links of Nodes | Node Attributes | Link Attributes

| Node 1 ID | Node 2 ID | Node 1 Type | Node 2 Type | Role |
|---|---|---|---|---|
| D1 | P1 | Application | Person | Applicant |
| D1 | E1 | Application | Email | Personal |
| D1 | L1 | Application | Location | Personal |
| D1 | Bx1 | Application | Business | Workplace |
| D11 | P1 | Application | Person | Applicant |
| D11 | E1 | Application | Email | Personal |
| D11 | L1 | Application | Location | Personal |
| D11 | T1 | Application | Telephone | Home |
| D12 | T1 | Application | Telephone | Home |
| D12 | L1 | Application | Location | Personal |
| D12 | P11 | Application | Person | Applicant |
| D2 | P2 | Application | Person | Applicant |
| D2 | E2 | Application | Email | Personal |
| D2 | L2 | Application | Location | Home |
| D2 | T2 | Application | Telephone | Home |
| D2 | Bx1 | Application | Business | Workplace |
| D21 | E2 | Application | Email | Personal |
| D21 | P2 | Application | Person | Applicant |
| D3 | P3 | Application | Person | Applicant |
| D3 | L3 | Application | Location | Personal |
| D3 | E3 | Application | Email | Personal |
| D3 | Ey | Application | Email | Workplace |
| D3 | Bx1 | Application | Business | Workplace |
| D31 | P3 | Application | Person | Applicant |
| D31 | L3 | Application | Location | Personal |
| D31 | E3 | Application | Email | Personal |
| D4 | L4 | Application | Location | Personal |
| D4 | T4 | Application | Telephone | Home |
| D4 | P4 | Application | Person | Applicant |
| D4 | Ey | Application | Email | Workplace |
| D4 | Bx2 | Application | Business | Workplace |
| D41 | L4 | Application | Location | Home |
| D41 | T4 | Application | Telephone | Personal |
| D41 | P4 | Application | Person | Applicant |
| D5 | P5 | Application | Person | Applicant |
| D5 | L5 | Application | Location | Home |
| D5 | E5 | Application | Email | Home |
| D5 | Bx2 | Application | Business | Workplace |
| D51 | P5 | Application | Person | Guarantor |
| D51 | L5 | Application | Location | Guarantor Home |
| D51 | E5 | Application | Email | Guarantor Home |

| Links of Nodes | | Node Attributes | | | Link Attributes | | Node Attribute Computations | |
|---|---|---|---|---|---|---|---|---|
| Node 1 ID | Node 2 ID | Node 1 Type | Node 2 Type | Node 1 value | Role | Node 2 related value | Linked node 1 count | Linked node 2 count |
| D61 | L61 | Application | Location | $1,200 | Home | $11,200 | 3 | 2 |
| D61 | P61 | Application | Person | $1,200 | Applicant | $11,200 | 3 | 2 |
| D61 | E61 | Application | Email | $1,200 | Personal | $16,800 | 3 | 3 |
| D62 | L61 | Application | Location | $10,000 | Home | $11,200 | 4 | 2 |
| D62 | P61 | Application | Person | $10,000 | Applicant | $11,200 | 4 | 2 |
| D62 | E61 | Application | Email | $10,000 | Personal | $16,800 | 4 | 3 |
| D62 | T61 | Application | Telephone | $10,000 | Personal | $6,800 | 4 | 2 |
| D63 | E61 | Application | Email | $5,600 | Personal | $16,800 | 3 | 3 |
| D63 | T61 | Application | Telephone | $5,600 | Personal | $6,800 | 3 | 2 |
| D63 | P62 | Application | Person | $5,600 | Applicant | $6,200 | 3 | 2 |
| D64 | P62 | Application | Person | $600 | Applicant | $6,200 | 3 | 2 |
| D64 | L62 | Application | Location | $600 | Home | $600 | 3 | 1 |
| D61 | Bx3 | Application | Business | $1,200 | Workplace | $3,300 | 3 | 3 |
| D64 | Bx3 | Application | Business | $600 | Workplace | $3,300 | 3 | 3 |
| D71 | Bx3 | Application | Business | $1,500 | Workplace | $3,300 | 4 | 3 |
| D71 | E71 | Application | Email | $1,500 | Personal | $5,500 | 4 | 3 |
| D71 | T71 | Application | Telephone | $1,500 | Personal | $5,500 | 4 | 3 |
| D71 | P71 | Application | Person | $1,500 | Applicant | $1,500 | 4 | 1 |
| D72 | E71 | Application | Email | $3,400 | Personal | $5,500 | 3 | 3 |
| D72 | T71 | Application | Telephone | $3,400 | Personal | $5,500 | 3 | 3 |
| D72 | P72 | Application | Person | $3,400 | Applicant | $3,400 | 3 | 1 |
| D73 | E71 | Application | Email | $600 | Personal | $5,500 | 3 | 3 |
| D73 | T71 | Application | Telephone | $600 | Personal | $5,500 | 3 | 3 |
| D73 | L71 | Application | Location | $600 | Workplace | $600 | 3 | 1 |

| | Node Attributes | | | | Node Attribute Computations | | | | | | |
|---|---|---|---|---|---|---|---|---|---|---|---|
| Node ID | Node Type | Date of Birth | Value | Related value | Linked node count | Linked D node count | Linked B node count | Linked P node count | Linked L node count | Linked E node count | Linked T node count |
| D1 | Application | | $1,200 | | 3 | 0 | 1 | 1 | 1 | 1 | 0 |
| D11 | Application | | $10,000 | | 4 | 0 | 0 | 1 | 1 | 1 | 1 |
| D12 | Application | | $500 | | 3 | 0 | 0 | 1 | 1 | 1 | 0 |
| D2 | Application | | $4,000 | | 5 | 0 | 1 | 1 | 1 | 0 | 1 |
| D21 | Application | | $1,000 | | 2 | 0 | 0 | 1 | 0 | 0 | 1 |
| D3 | Application | | $4,000 | | 5 | 0 | 1 | 1 | 1 | 1 | 1 |
| D31 | Application | | $2,000 | | 3 | 0 | 0 | 1 | 1 | 1 | 0 |
| D4 | Application | | $1,000 | | 5 | 0 | 1 | 1 | 1 | 0 | 1 |
| D41 | Application | | $2,300 | | 3 | 0 | 0 | 1 | 1 | 0 | 1 |
| D5 | Application | | $1,500 | | 4 | 0 | 1 | 1 | 1 | 1 | 0 |
| D51 | Application | | $5,000 | | 3 | 0 | 0 | 1 | 1 | 1 | 0 |
| Bx1 | Business | | | $9,200 | 3 | 3 | 0 | 0 | 0 | 0 | 0 |
| Bx2 | Business | | | $2,500 | 2 | 2 | 0 | 0 | 0 | 0 | 0 |
| P1 | Person | 03.22.1992 | | $11,200 | 2 | 2 | 0 | 0 | 0 | 0 | 0 |
| P11 | Person | 10.16.1990 | | $500 | 1 | 1 | 0 | 0 | 0 | 0 | 0 |
| P2 | Person | 04.12.1983 | | $5,000 | 2 | 2 | 0 | 0 | 0 | 0 | 0 |
| P3 | Person | 11.21.1995 | | $6,000 | 2 | 2 | 0 | 0 | 0 | 0 | 0 |
| P4 | Person | 01.02.2000 | | $3,300 | 2 | 2 | 0 | 0 | 0 | 0 | 0 |
| P5 | Person | 06.28.1970 | | $6,500 | 2 | 2 | 0 | 0 | 0 | 0 | 0 |
| L1 | Location | | | $11,700 | 3 | 3 | 0 | 0 | 0 | 0 | 0 |
| L2 | Location | | | $4,000 | 1 | 1 | 0 | 0 | 0 | 0 | 0 |
| L3 | Location | | | $6,000 | 2 | 2 | 0 | 0 | 0 | 0 | 0 |
| L4 | Location | | | $3,300 | 2 | 2 | 0 | 0 | 0 | 0 | 0 |
| L5 | Location | | | $6,500 | 2 | 2 | 0 | 0 | 0 | 0 | 0 |
| E1 | Email | | | $11,200 | 2 | 2 | 0 | 0 | 0 | 0 | 0 |
| E2 | Email | | | $5,000 | 2 | 2 | 0 | 0 | 0 | 0 | 0 |
| E3 | Email | | | $6,000 | 2 | 2 | 0 | 0 | 0 | 0 | 0 |
| E4 | Email | | | $5,000 | 2 | 2 | 0 | 0 | 0 | 0 | 0 |
| E5 | Email | | | $6,500 | 2 | 2 | 0 | 0 | 0 | 0 | 0 |
| T1 | Telephone | | | $10,500 | 2 | 2 | 0 | 0 | 0 | 0 | 0 |
| T2 | Telephone | | | $4,000 | 1 | 1 | 0 | 0 | 0 | 0 | 0 |
| T4 | Telephone | | | $3,300 | 2 | 2 | 0 | 0 | 0 | 0 | 0 |

| | | Nodes | | Node Attributes | | | Link Attributes | | Node Attribute Computations | | Target Variable Indicator |
|---|---|---|---|---|---|---|---|---|---|---|---|
| Node 1 ID | Node 2 ID | Node 1 Type | Node 2 Type | Node 1 value | Role | Node 2 related value | Linked node 1 count | Linked node 2 count | Intra-community (target variable) |
| D1 | P1 | Application | Person | $1200 | Applicant | $11,200 | 3 | | 2 | TRUE |
| D1 | E1 | Application | Email | $1200 | Personal | $11,200 | 3 | | 2 | TRUE |
| D1 | L1 | Application | Location | $1200 | Personal | $11,700 | 3 | | 3 | TRUE |
| D1 | Bx1 | Application | Business | $1200 | Workplace | $9,200 | 3 | | 3 | FALSE |
| D11 | P1 | Application | Person | $10000 | Applicant | $11,200 | 4 | | 2 | TRUE |
| D11 | E1 | Application | Email | $10000 | Personal | $11,200 | 4 | | 3 | TRUE |
| D11 | L1 | Application | Location | $10000 | Personal | $11,700 | 4 | | 3 | TRUE |
| D11 | T1 | Application | Telephone | $10000 | Home | $10,500 | 4 | | 2 | TRUE |
| D12 | T1 | Application | Telephone | $500 | Home | $10,500 | 3 | | 2 | TRUE |
| D12 | L1 | Application | Location | $500 | Personal | $11,700 | 3 | | 3 | TRUE |
| D12 | P11 | Application | Person | $500 | Applicant | $500 | 3 | | 1 | TRUE |
| D2 | P2 | Application | Person | $4000 | Applicant | $5,000 | 5 | | 2 | TRUE |
| D2 | E2 | Application | Email | $4000 | Personal | $5,000 | 5 | | 2 | TRUE |
| D2 | L2 | Application | Location | $4000 | Home | $4,000 | 5 | | 1 | TRUE |
| D2 | T2 | Application | Telephone | $4000 | Home | $9,200 | 5 | | 1 | TRUE |
| D2 | Bx1 | Application | Business | $4000 | Workplace | $5,000 | 5 | | 3 | FALSE |
| D21 | E2 | Application | Email | $1000 | Personal | $5,000 | 2 | | 2 | TRUE |
| D21 | P2 | Application | Person | $1000 | Applicant | $5,000 | 2 | | 2 | TRUE |
| D3 | P3 | Application | Person | $4000 | Applicant | $6,000 | 5 | | 2 | TRUE |
| D3 | L3 | Application | Location | $4000 | Personal | $6,000 | 5 | | 2 | TRUE |
| D3 | E3 | Application | Email | $4000 | Personal | $6,000 | 5 | | 2 | TRUE |
| D3 | By | Application | Business | $4000 | Workplace | $5,000 | 5 | | 2 | FALSE |
| D31 | Bx1 | Application | Business | $2000 | Workplace | $9,200 | 3 | | 3 | FALSE |
| D31 | P3 | Application | Person | $2000 | Applicant | $6,000 | 3 | | 2 | TRUE |
| D31 | L3 | Application | Location | $2000 | Personal | $6,000 | 3 | | 2 | TRUE |
| D31 | E3 | Application | Email | $2000 | Personal | $6,000 | 3 | | 2 | TRUE |
| D4 | L4 | Application | Location | $1000 | Personal | $3,300 | 5 | | 2 | TRUE |
| D4 | T4 | Application | Telephone | $1000 | Home | $3,300 | 5 | | 2 | TRUE |
| D4 | P4 | Application | Person | $1000 | Applicant | $3,300 | 5 | | 2 | TRUE |
| D4 | Ey | Application | Email | $1000 | Workplace | $5,000 | 5 | | 2 | FALSE |
| D4 | Bx2 | Application | Business | $1000 | Workplace | $2,500 | 5 | | 2 | FALSE |
| D41 | L4 | Application | Location | $2300 | Home | $3,300 | 3 | | 2 | TRUE |
| D41 | T4 | Application | Telephone | $2300 | Personal | $3,300 | 3 | | 2 | TRUE |
| D41 | P4 | Application | Person | $2300 | Applicant | $3,300 | 3 | | 2 | TRUE |
| D5 | P5 | Application | Person | $1500 | Applicant | $6,500 | 4 | | 2 | TRUE |
| D5 | L5 | Application | Location | $1500 | Home | $6,500 | 4 | | 2 | TRUE |
| D5 | E5 | Application | Email | $1500 | | $6,500 | 4 | | 2 | TRUE |
| D5 | Bx2 | Application | Business | $1500 | Workplace | $2,500 | 3 | | 2 | FALSE |
| D51 | P5 | Application | Person | $5000 | Guarantor | $6,500 | 3 | | 2 | TRUE |
| D51 | L5 | Application | Location | $5000 | Guarantor Home | $6,500 | 3 | | 2 | TRUE |
| D51 | E5 | Application | Email | $5000 | Guarantor Home | $6,500 | 3 | | 2 | TRUE |

1724, 1729

2010

| | Links of Nodes | | Node Attributes | | Link Attributes | Target Variable Indicator |
|---|---|---|---|---|---|---|
| | Node 1 ID | Node 2 ID | Node 1 Type | Node 2 Type | Role | Intra-community (target variable) |
| | P1 | L1 | Person | Location | home | TRUE |
| | P1 | T1 | Person | Telephone | | TRUE |
| | P1 | T11 | Person | Telephone | | TRUE |
| | P1 | E1 | Person | Email | | TRUE |
| | P11 | L1 | Person | Location | home | TRUE |
| 2012 | P11 | T1 | Person | Telephone | | TRUE |
| | P12 | L1 | Person | Location | home | TRUE |
| | P12 | T11 | Person | Telephone | | TRUE |
| | P12 | E1 | Person | Email | | TRUE |
| | P12 | Lx | Person | Location | work | FALSE |
| 2014 | P2 | Lx | Person | Location | work | FALSE |
| | P2 | L2 | Person | Location | home | TRUE |
| | P2 | Ly | Person | Location | home | FALSE |
| | P2 | E2 | Person | Email | | TRUE |
| | P2 | T2 | Person | Telephone | | TRUE |
| | P21 | L2 | Person | Location | home | TRUE |
| | P21 | E2 | Person | Email | | TRUE |
| | P21 | T2 | Person | Telephone | | TRUE |
| | P3 | Ly | Person | Location | home | FALSE |
| | P3 | L3 | Person | Location | home | TRUE |
| | P3 | T3 | Person | Telephone | | TRUE |
| | P31 | L3 | Person | Location | home | TRUE |
| | P31 | T3 | Person | Telephone | | TRUE |

FIG. 20B

METHOD AND SYSTEM FOR PREDICTING RELEVANT NETWORK RELATIONSHIPS

CROSS REFERENCE TO RELATED APPLICATIONS

This application claims the benefit of priority under 35 U.S.C. § 119(e) to U.S. Provisional Patent Application No. 63/529,621 filed on Jul. 28, 2023, the entirety of each of which is hereby incorporated by reference herein.

TECHNICAL FIELD

The present disclosure relates to, but not by way of limitation, a method and system for predicting relevant network relationships by using network features to train a model.

BACKGROUND

To determine network relationships in use cases including identity detection or public security, a graph algorithm approach or a rule-based approach is commonly used. However, the challenge with the graph algorithm approach is determining relevant edge or link weights. The challenge with the rule-based approach is determining the rules and thresholds for the network features to identify the relevant network relationships. Predicting relevant network relationships by using network features to train a model is needed.

SUMMARY

In an example embodiment, a computer-program product tangibly embodied in a non-transitory machine-readable storage medium is provided. The computer-program product includes instructions to cause a computing device to output one or more first sets of generated networks with relevant network relationships by training a model and applying the model for an operational real-time application. For training, the computing device obtains a first data set associated with a plurality of nodes to generate one or more sets of networks. The computing device trains a first model on the first data set using a first graph to predict relevant links between the plurality of nodes by executing operations including: determine one or more features for one or more links between the plurality of nodes, determine a target variable indicator for the one or more links between the plurality of nodes using the first graph, and based on the determination of the one or more features and the determination of the target variable indicator for the one or more links between the plurality of nodes using the first graph, train the first model to predict the relevant links of the one or more links between the plurality of nodes. For the operational real-time application, the computing device obtains the first data set or a second data set associated with the plurality of nodes. The computing device determines a first node for the first data set or the second data set associated with the plurality of nodes. (A) From the first node from the first data set or the second data set associated with the plurality of nodes, the computing device executes operations including: (B) determine, for the first node, the one or more features for the one or more links between the plurality of nodes connected to the first node, (C) based on the determination of the one or more features for the one or more links between the plurality of nodes connected to the first node, apply the trained first model to the one or more links between the plurality of nodes from the first node, (D) based on the application of the trained first model to the one or more links between the plurality of nodes from the first node, output the relevant links and non-relevant links of the one or more links between the plurality of nodes from the first node, (E) based on the output of the relevant links and the non-relevant links of the one or more links between the plurality of nodes from the first node, connect the first node to each node of the plurality of nodes for the relevant links in one or more first sets of generated networks, and for each node of the plurality of nodes connected to the first node based on the relevant links, repeat (A) to (E) to iteratively connect each node from the plurality of nodes to the one or more first sets of generated networks for each of the relevant links until the relevant links for connection to the plurality of nodes are not present. The computing device outputs the one or more first sets of generated networks in a first graphical user interface, as a first input to an automated analytical process, or as a first input to an investigative system.

In an exemplary alternative embodiment, the computer-program product includes the determination of the target variable indicator for the one or more links between the plurality of nodes using the first graph including: determining a set of subgraphs from the first graph, determining whether each of the one or more links between each node of the plurality of nodes connect within a single subgraph of the set of subgraphs from the first graph, based on the determination of whether each of the one or more links between each node of the plurality of nodes connect within the single subgraph of the set of subgraphs from the first graph, label the one or more links as intra-community links in the single subgraph of the set of subgraphs from the first graph, determining whether each of the one or more links between each node of the plurality of nodes connect between at least two subgraphs of the set of subgraphs from the first graph, based on the determination of whether each of the one or more links between each node of the plurality of nodes connect between at least two subgraphs of the set of subgraphs from the first graph, label the one or more links as inter-community links in the at least two subgraphs of the set of subgraphs from the first graph, output the labeled one or more links as the intra-community links in the single subgraph of the set of subgraphs from the first graph, and output the labeled one or more links as the inter-community links in the at least two subgraphs of the set of subgraphs from the first graph.

In another exemplary alternative embodiment, the computer-program product includes the one or more features for the one or more links between the plurality of nodes including: for each of the one or more links between two nodes of the plurality of nodes: one or more link attributes for the one or more links between each pair of connected nodes of the plurality of nodes, one or more node attributes of each pair of the connected nodes at a first end or a second end of the one or more links, one or more node attribute computations or one or more node attribute thresholds applied to each pair of the connected nodes at the first end or the second end of the one or more links, one or more link attribute computations or one or more link attribute thresholds applied to one or more attributes of the one or more links for each pair of the connected nodes, and a first network for the one or more links between each pair of the connected nodes that connects a second node from each pair of the connected nodes to a set of nodes from each pair of the connected nodes.

In another exemplary alternative embodiment, the computer-program product includes the one or more link attributes including one or more roles.

In another exemplary alternative embodiment, the computer-program product includes the one or more node attributes including one or more node types, one or more date of births, or one or more values.

In another exemplary alternative embodiment, the computer-program product includes the one or more node attribute computations including one or more sums of one or more related applications, one or more counts of one or more nodes that are connected to a selected node in a relationship, or the one or more counts of the one or more nodes for the one or more node attributes that are connected to the selected node in the relationship.

In another exemplary alternative embodiment, the computer-program product includes the plurality of nodes including data representing at least one person, at least one location, at least one telephone number, at least one email address, at least one business, at least one application, at least one account, at least one vehicle, at least one IP address, at least one organization, at least one agent, at least one supplier, or at least one event.

In another exemplary alternative embodiment, the computer-program product includes the first model including a decision tree, a random forest, a neural network, or another type of predictive model.

In another exemplary alternative embodiment, the computer-program product includes the application of the trained first model to the one or more links between the plurality of nodes that provides a trained model variable.

In another exemplary alternative embodiment, the computer-program product includes the application of the trained first model to the one or more links between the plurality of nodes that is optimized by: automatically computing a first threshold for the trained model variable for one or more factors including network size, applying a second threshold for the trained model variable to each of the one or more links or to the one or more links for the one or more factors including mean, standard deviation, or the network size, and applying a third threshold for the trained model variable from one or more user preferences.

In another exemplary alternative embodiment, a computer-program product tangibly embodied in a non-transitory machine-readable storage medium is provided. The computer-program product includes instructions to cause a computing device to output the one or more first sets of generated networks with relevant network relationships by training a model and applying the model for an operational batch application. For training, the computing device obtains a first data set associated with a plurality of nodes to generate one or more sets of networks. The computing device trains a first model on the first data set using a first graph to predict relevant links between the plurality of nodes by executing operations including: determine one or more features for one or more links between the plurality of nodes, determine a target variable indicator for the one or more links between the plurality of nodes using the first graph, and based on the determination of the one or more features and the determination of the target variable indicator for the one or more links between the plurality of nodes using the first graph, train the first model to predict the relevant links of the one or more links between the plurality of nodes. For the operational batch application, the computing device obtains the first data set or a second data set associated with the plurality of nodes. For each node of the plurality of nodes from the first data set or the second data set, the computing device executes operations including: determine the one or more features for the one or more links between the plurality of nodes, based on the determination of the one or more features for the one or more links between the plurality of nodes, apply the trained first model to the one or more links between the plurality of nodes, based on the application of the trained first model to the one or more links between the plurality of nodes, output the relevant links and non-relevant links of the one or more links between the plurality of nodes, based on the output of the relevant links and the non-relevant links of the one or more links between the plurality of nodes, remove the non-relevant links of the one or more links between the plurality of nodes, and based on the removal of the non-relevant links of the one or more links between the plurality of nodes, connect each node of the plurality of nodes with the relevant links to generate one or more first sets of networks. The computing device outputs the one or more first sets of generated networks in a first graphical user interface, as a first input to an automated analytical process, or as a first input to an investigative system.

In another exemplary alternative embodiment, a computer-implemented method is provided to output one or more first sets of generated networks with relevant network relationships by training a model and applying the model for an operational real-time application.

In another exemplary alternative embodiment, a computer-implemented method is provided to output one or more first sets of generated networks with relevant network relationships by training a model and applying the model for an operational batch application.

In yet another example embodiment, a computing device is provided. The computing device includes, but is not limited to, a processor and a memory. The memory contains instructions that when executed by the processor configures the computing device to output one or more first sets of generated networks with relevant network relationships by training a model and applying the model for an operational real-time application.

In yet another example embodiment, a computing device is provided. The computing device includes, but is not limited to, a processor and a memory. The memory contains instructions that when executed by the processor configures the computing device to output one or more first sets of generated networks with relevant network relationships by training a model and applying the model for an operational batch application.

BRIEF DESCRIPTION OF THE DRAWINGS

The specification makes reference to the following appended figures, in which use of like reference numerals in different figures is intended to illustrate like or analogous components.

FIG. 14B illustrates an example table of a training data set for nodes, according to some embodiments of the present technology.

FIG. 14C illustrates an example table of a training data set for links, according to some embodiments of the present technology.

FIG. 14D illustrates an example table of a trained model data set for links, according to some embodiments of the present technology.

FIG. 17B illustrates an example table depicting executing operations to train a model to predict relevant network relationships using node attributes and node attribute computations, according to some embodiments of the present technology.

FIG. 17C illustrates an example table depicting executing operations to train a model to predict relevant network relationships using the Community Detection algorithm to determine the target variable, according to some embodiments of the present technology.

FIG. 20B illustrates an example table of nodes depicting executing operations to train a model to predict relevant network relationships using the Community Detection algorithm to determine the target variable, according to some embodiments of the present technology.

DETAILED DESCRIPTION

Figure 1:
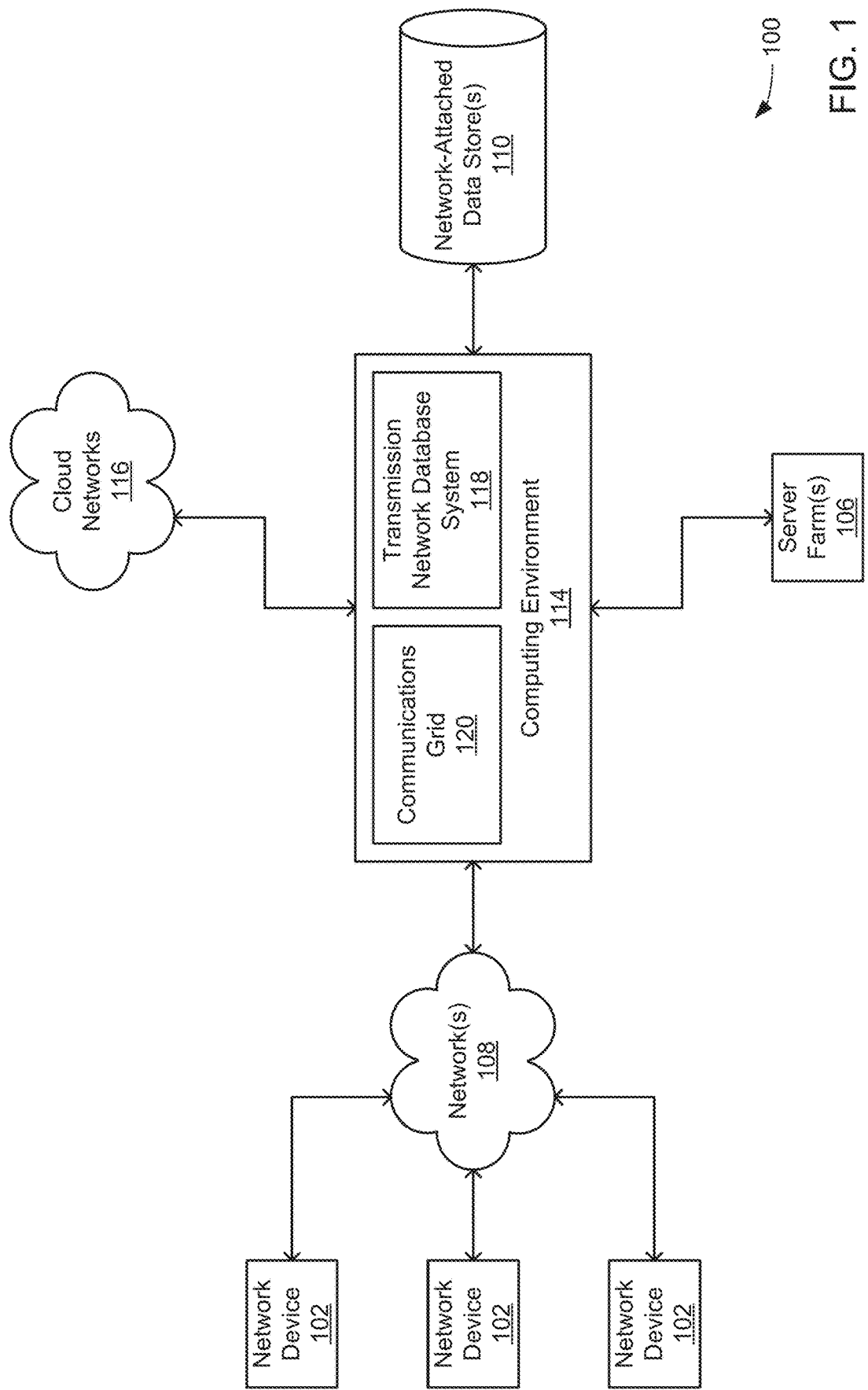
FIG. 1 illustrates a block diagram that provides an illustration of the hardware components of a computing system, according to some embodiments of the present technology.

Community Detection is a graph algorithm that identifies subgraphs of a larger complete graph, where the nodes are interconnected by links. Community Detection may break up a larger graph (i.e., network) into smaller graphs or networks that are of greater relevance or significance for assessment for the purposes of scoring and/or investigation.

The scoring may include a use case where the network represents relationships between entities such as people, objects, locations, and events. The scoring may associate characteristics that include risk across these entities or identify organized activity.

There are challenges with applying Community Detection in the scoring use case. First, when the nodes and links are non-homogenous, a simple unweighted use of Community Detection can often lack relevance to the types of real relationships that exist between nodes. For instance, the links may connect different node types or data values associated with the nodes or the links may vary and have a relevant effect on how the relationship between the nodes and the links is interpreted in a use case. Second, when weighting is applied, the identification of these weights can be challenging. Third, the resulting graphs can be difficult to explain to human investigators. Finally, in a system where data changes over time, the requirement to recompute the communities over the complete graph when a single piece of data changes can have a detrimental impact on computing performance.

An alternative approach for creating these relevant networks of related entities is to use a rule-based approach applied to both the nodes and links to determine which links to follow and which links to ignore when determining the subgraphs (i.e., networks) for scoring and investigation. The challenge with a rule-based approach is determining the rules and the thresholds for which links to follow and which links to ignore for a specific set of data and possible attributes. The rule-based approach may be time consuming and may require expert knowledge, data analysis, and manual iterations to see the effects of different rules across a large set of attributes and values.

Determining the types of relationships that are relevant or non-relevant in a single instance of a network requires a priori knowledge about the meaning of the relationship. The meaning of the relationship can be based on the attributes directly associated with the relationship or attributes of the nodes at each end of the relationship. An attribute of a node can include structural characteristics, such as the count of certain other relationships, or attributes associated with the relationship, such as a connection from a person to a location being a business location.

Therefore, the goal is to determine this knowledge based on the full set of data available or from all of the networks available. For instance, relationships that are relevant often coincide with other relevant relationships between nodes or sets of nodes, and relationships that are non-relevant connect nodes or sets of nodes that are disjoint. Additionally, for example, a relevant relationship may include persons who interact with each other multiple times, or if events are connected by multiple other nodes (e.g., the same person, location, object, etc.)

Community Detection is used against the complete graph to determine whether a link is relevant or non-relevant based on whether the link is intra-community or inter-community during Community Detection. We then train a model based on the features of a link to predict whether a link is relevant or non-relevant. For instance, the model can be a simple rules-based model or a more advanced machine-learning technique.

When determining networks operationally, the features for each link are computed, and the model is applied to the link to determine whether to retain it in the subgraph or remove it from the subgraph.

The training process may not produce a perfect model for prediction. When the model is applied, the error in the model ensures that the networks are traversed based on the predicted relevance of the relationships. The application of the model predicts the network structure based on attributes of the links and nodes that are connected to it.

For example, a financial institution may only have partial information about its customers and third parties. When third parties are referenced in a transaction or financial settlement for the financial institution's customers, the relationship may still be relevant even when it is the only link between the customers and the third parties due to the partial information.

In another example, if a bad actor is using a stolen or fake identity, some elements of these identities may be reused, including the receiving bank account or the correspondence email address. Knowing that these relationships are typically relevant, these relationships may be retained even if they are the only connection between disjoint graphs.

The training process requires a complete and large data set to determine the relationship between the links and the relevance of the links. For example, a data set may include millions or billions of records.

The features may be generated for links that are derived from attributes and computations of links, adjacent nodes, or a localized network structure.

For example, the specific attributes values of a link may include a link connecting a person to a phone number that has an attribute (i.e., relationship) that the phone number is the person's "home" phone number.

In another example, the computations or thresholds applied to attributes of a link may include two bank accounts having a link representing a set of financial transactions between the accounts and the sum of these financial transactions is greater than $10,000.

In another example, the specific attributes of nodes at either end of the link may include a person linked to a location. The location may include a commercial property.

In another example, the computations or thresholds applied to nodes at either end of the link may include a person linked to a location. The person may be less than 18 years of age.

In another example, a localized network structure may include a link connecting a person and a location. The location may include a link to 25 other persons.

The training process may include computing the features of all links, computing intra-community links and inter-community links using a Community Detection algorithm, and training a model to predict the intra-community links by using the computed features of all links.

The model may provide a continuous variable as the result of applying the model to new links. A first threshold may be automatically computed that optimizes for many factors including network size. A second threshold may be used for each link or applied globally across all links. The third threshold may be further tuned based on user feedback.

The model may be optimized over time based on user feedback from analysts, users, or investigators. The model may also be optimized as part of optimizing the whole system when using networks as part of a scoring process for use cases including identity detection or public security.

The model may be used in both batch use and real-time case scenarios. In batch use case and real-time case scenarios, the relevance of links may be determined incrementally rather than generating the whole network with each change (e.g., for the real-time case, process one data record as it occurs; for the batch use case, process one thousand updated data records out of one million data records). In batch use case scenarios, the relevance of the links may also be determined for all data records.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
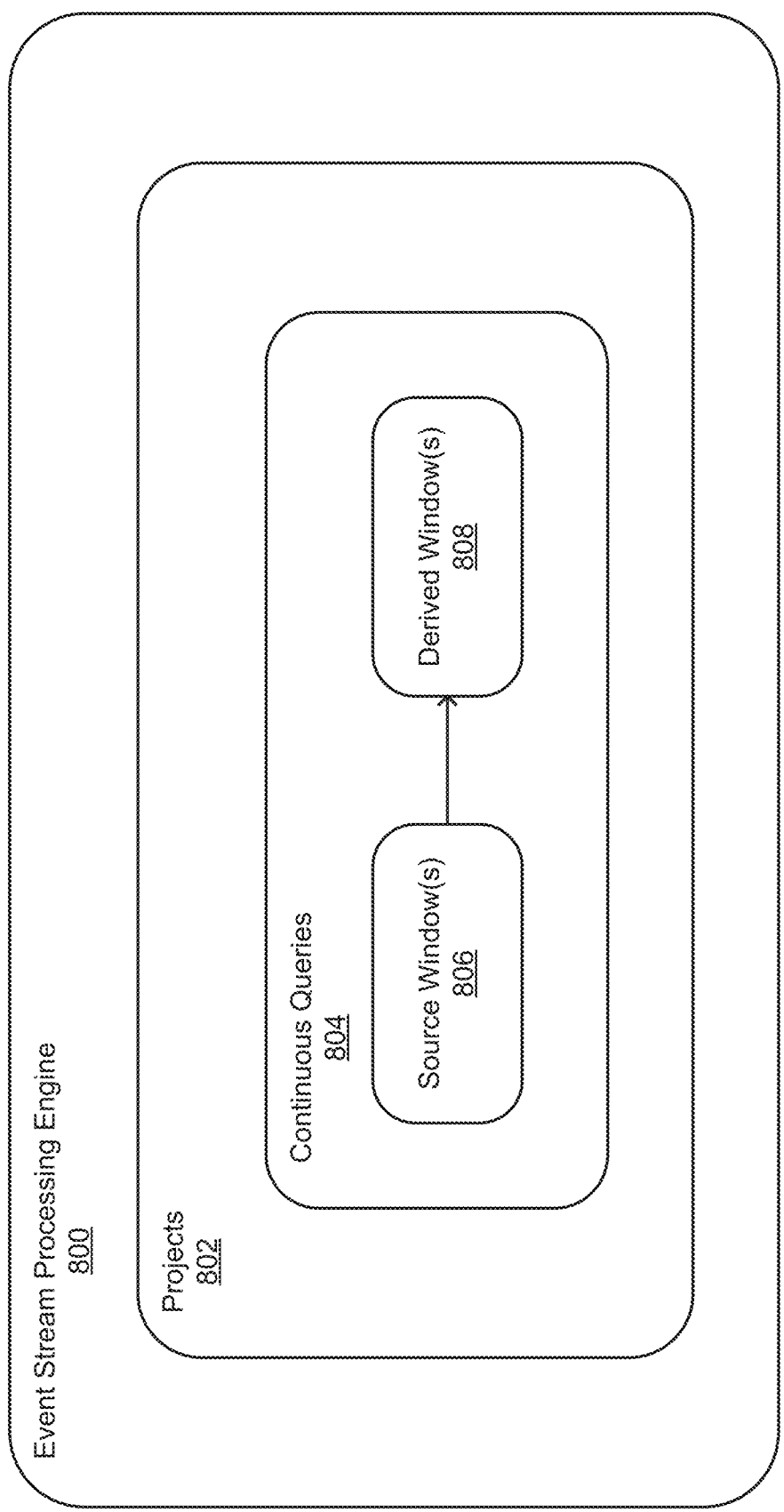
FIG. 8 illustrates a block diagram including components of an Event Stream Processing Engine (ESPE), according to embodiments of the present technology.
Figure 9:
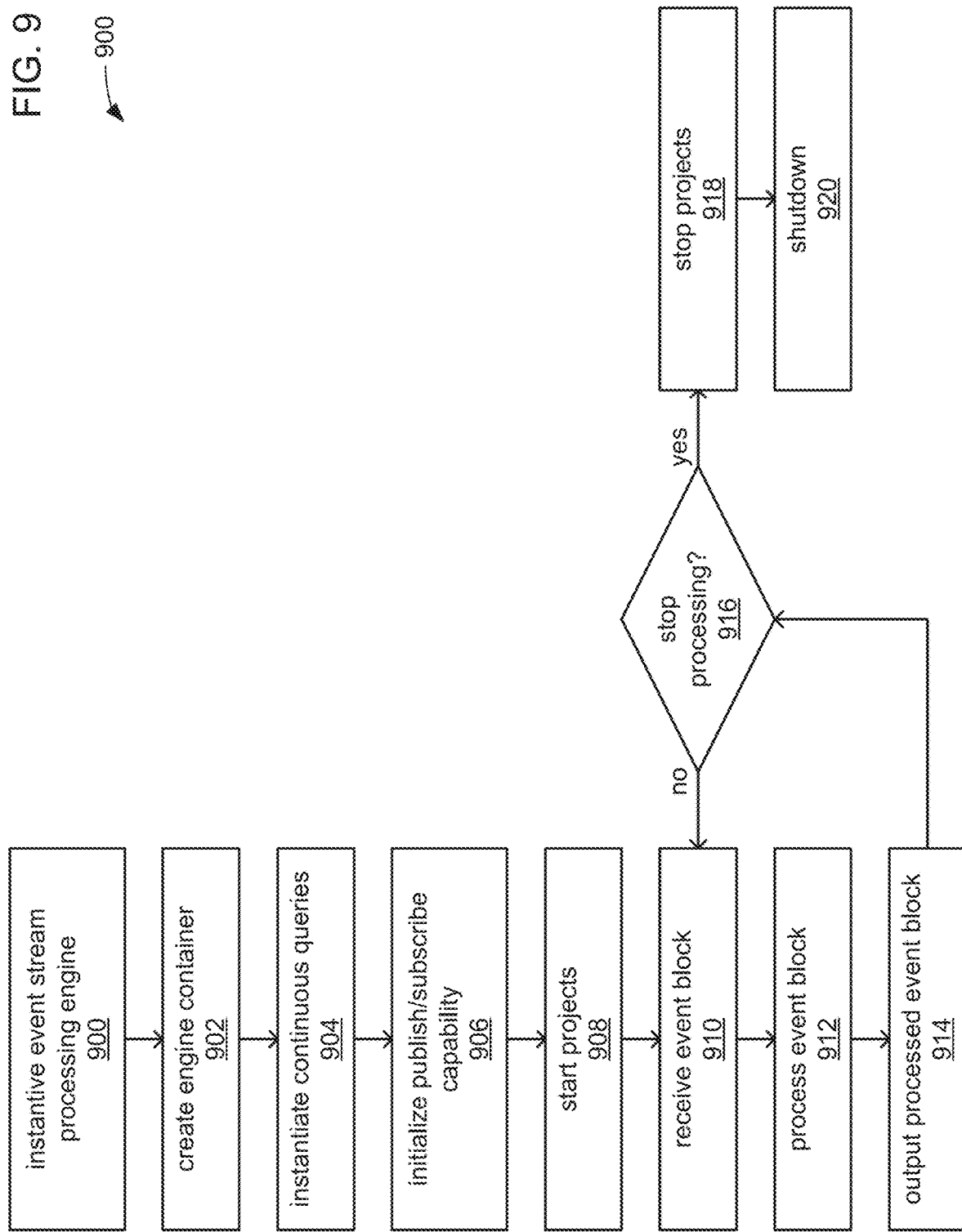
FIG. 9 illustrates a flow chart showing an example process including operations performed by an event stream processing engine, according to some embodiments of the present technology.
Figure 10:
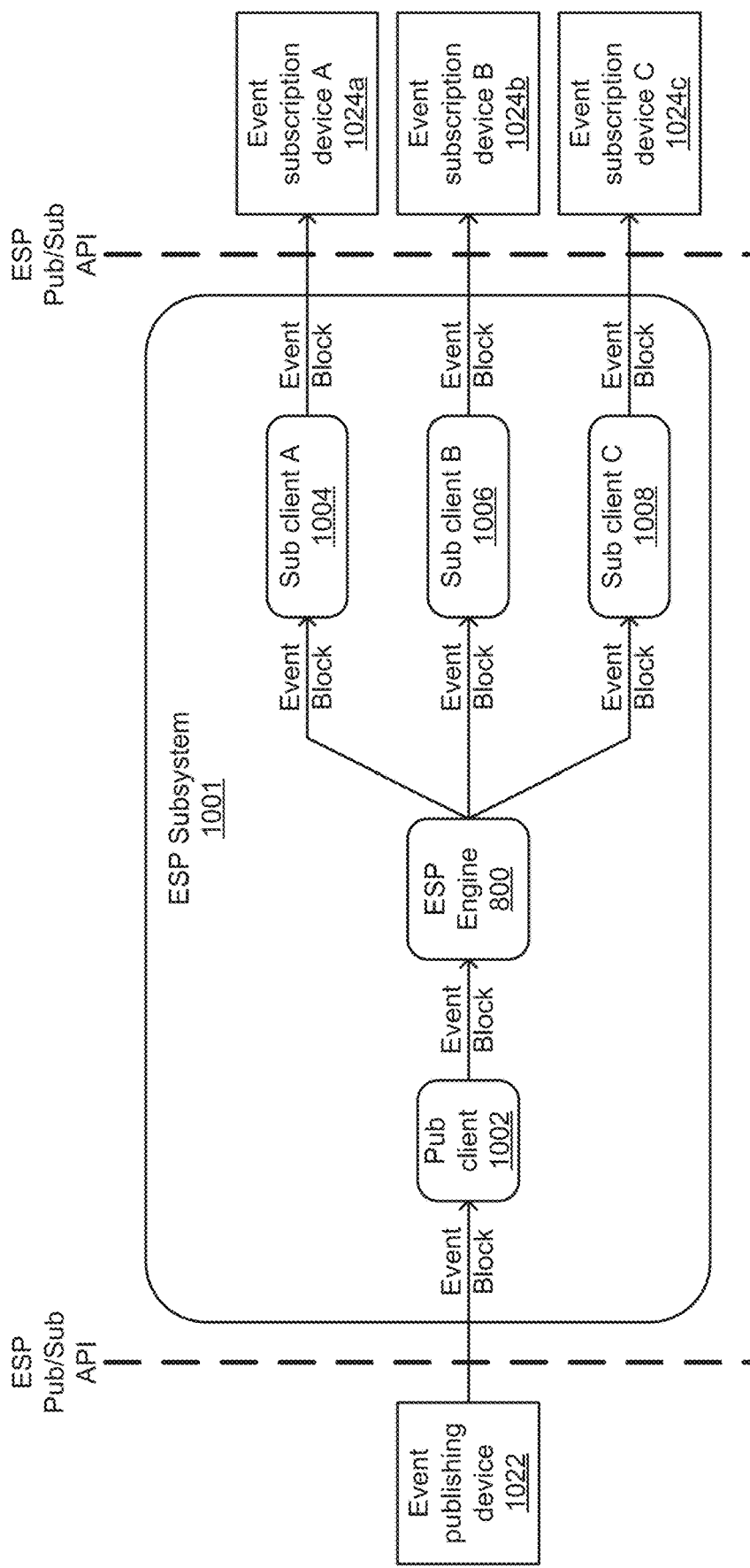
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
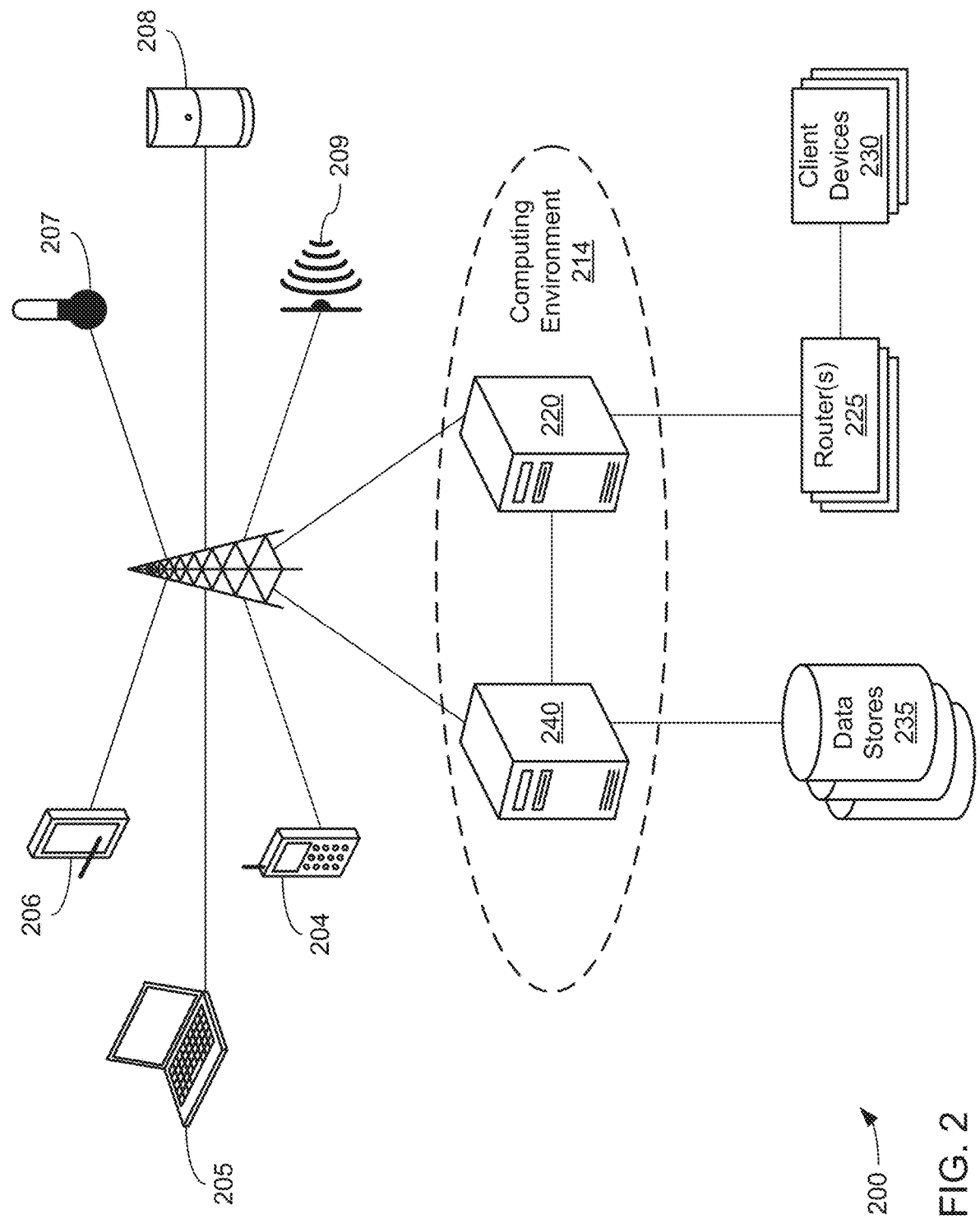
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
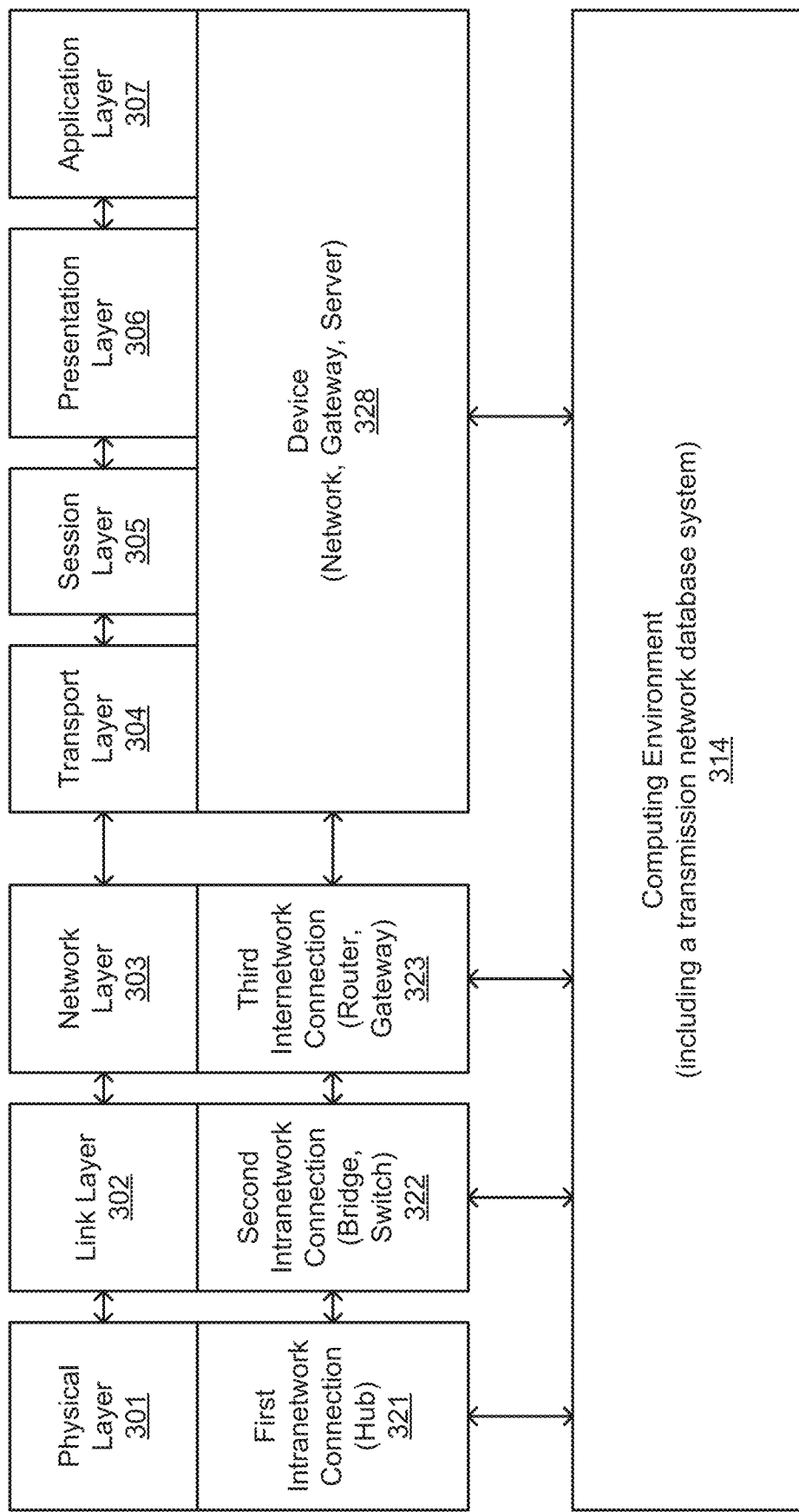
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
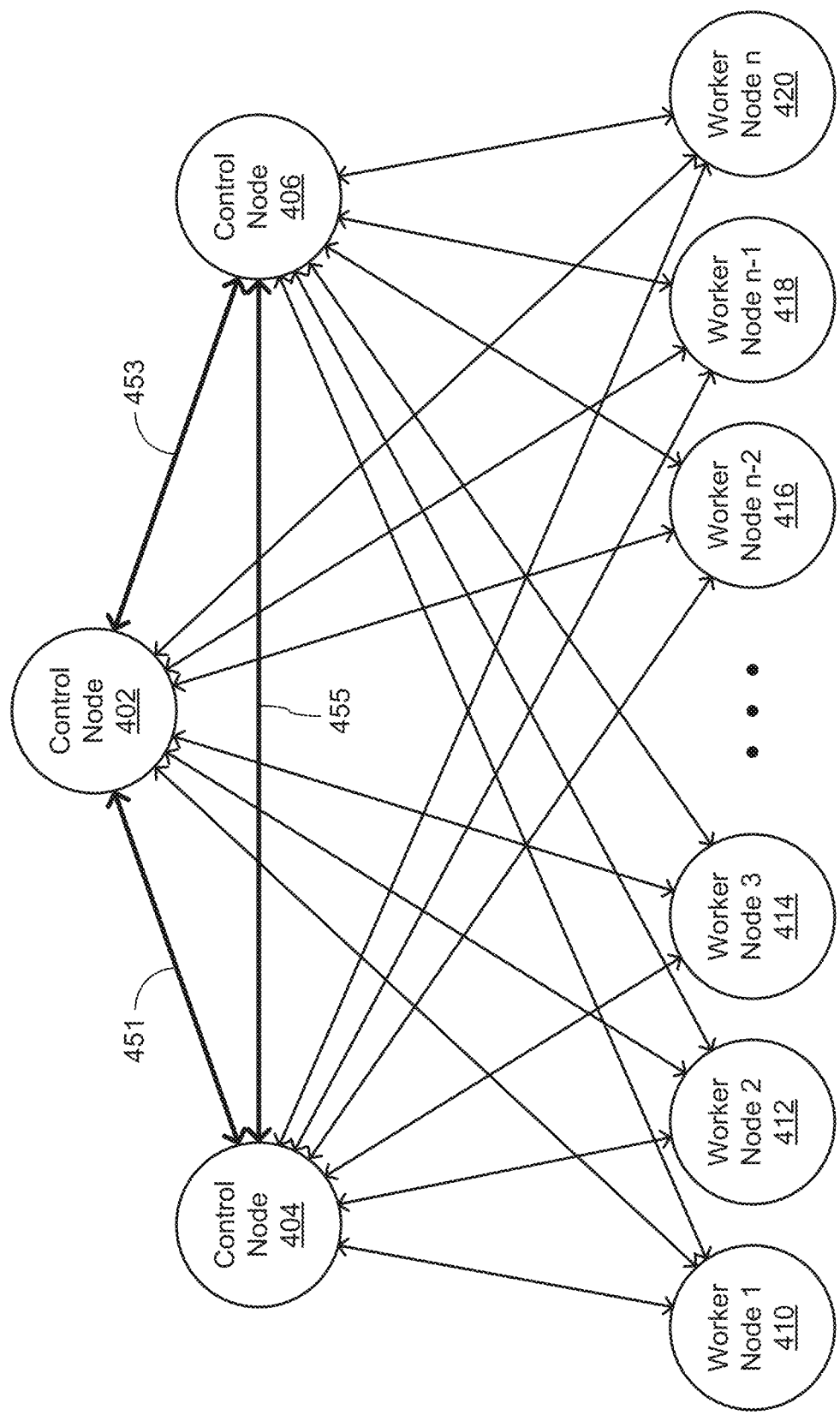
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
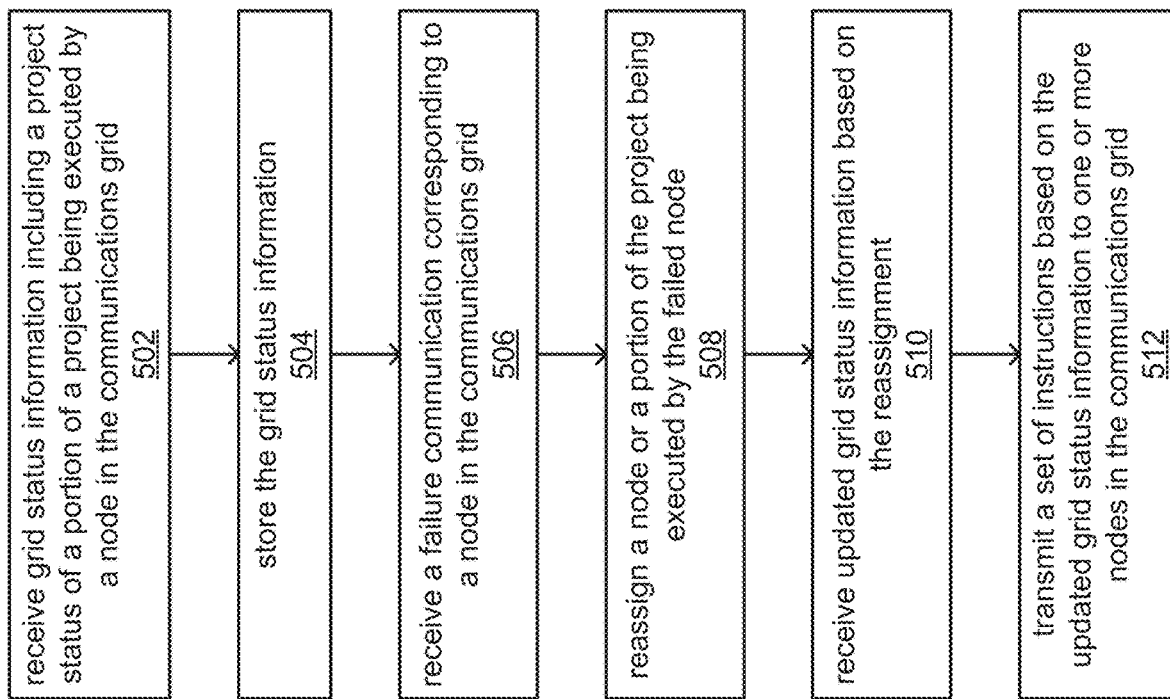
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
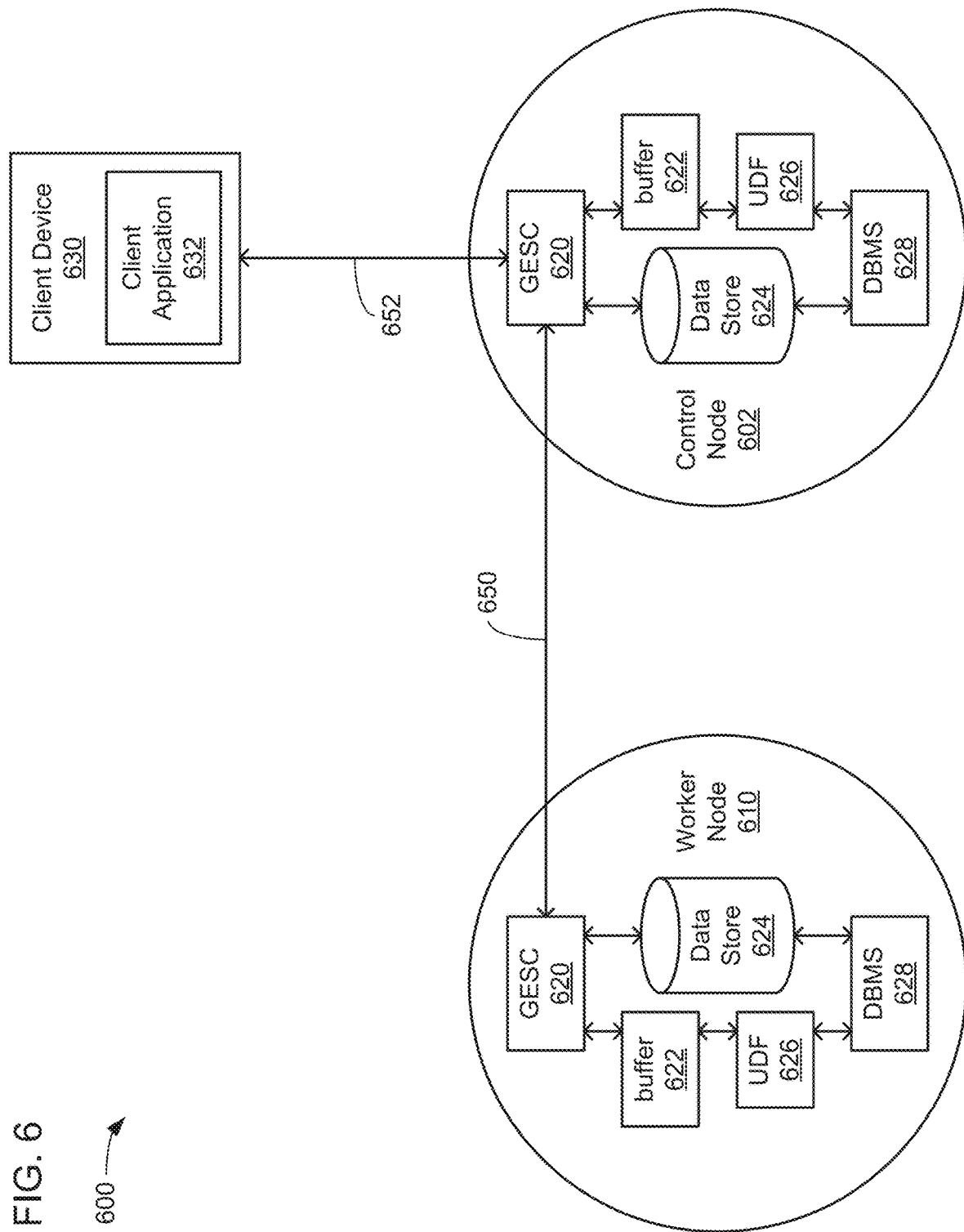
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
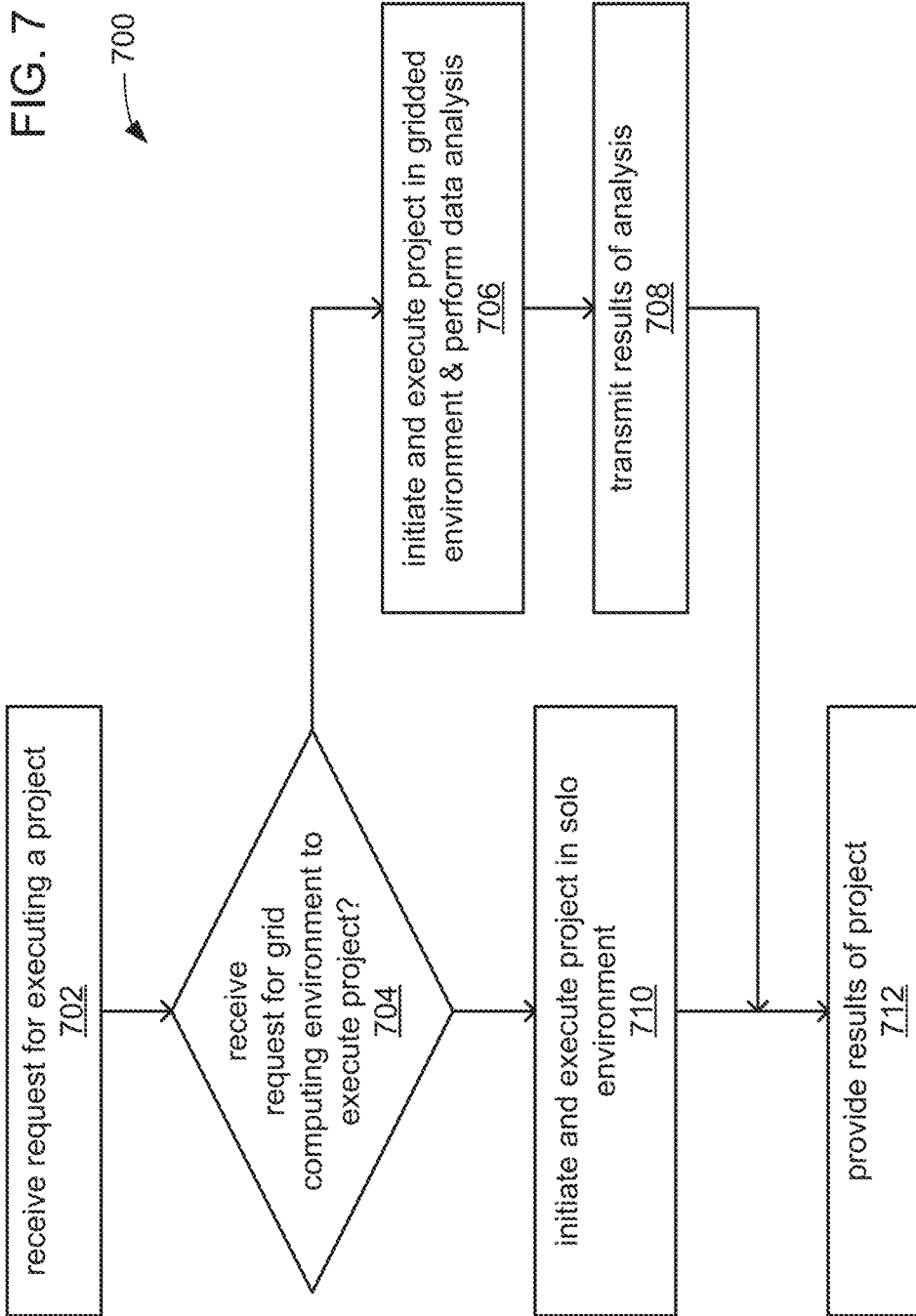
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 1001 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable storage medium operably coupled to the processor. The processor is configured to execute an ESP engine (ESPE). The computer-readable storage medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable storage medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable storage medium.

Figure 11:
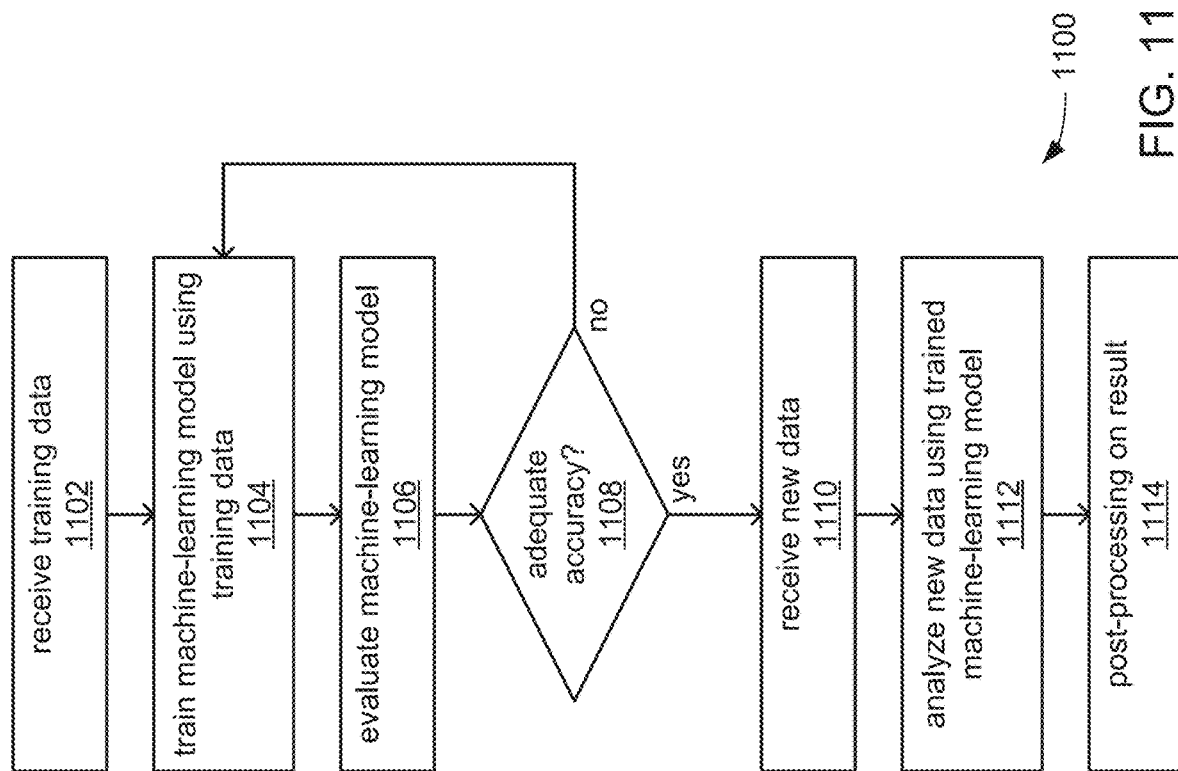
FIG. 11 illustrates a flow chart of an example of a process for generating and using a machine-learning model, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
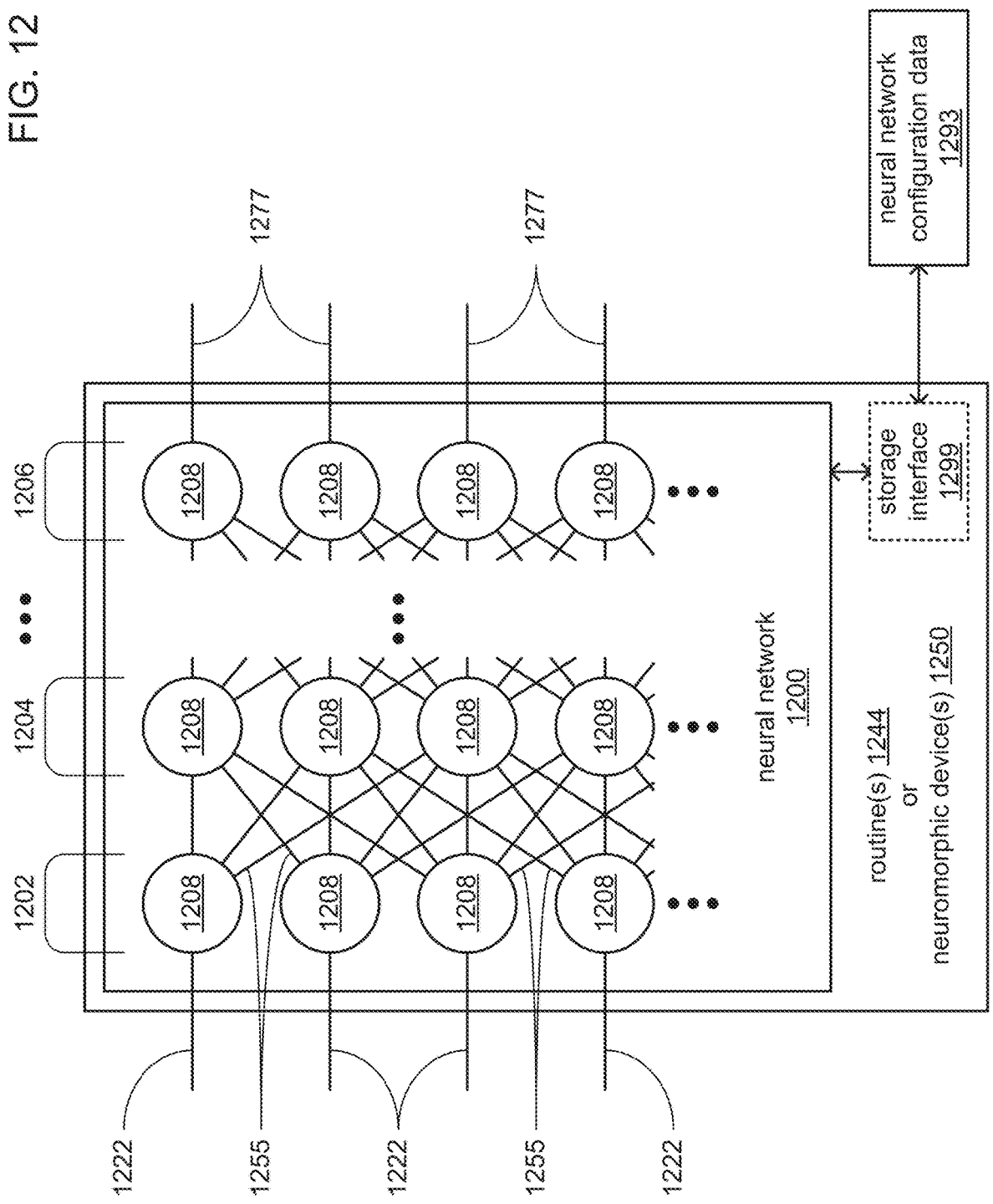
FIG. 12 illustrates a neural network that represents a more specific example of a machine-learning model, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation y=max(x, 0) where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feedforward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
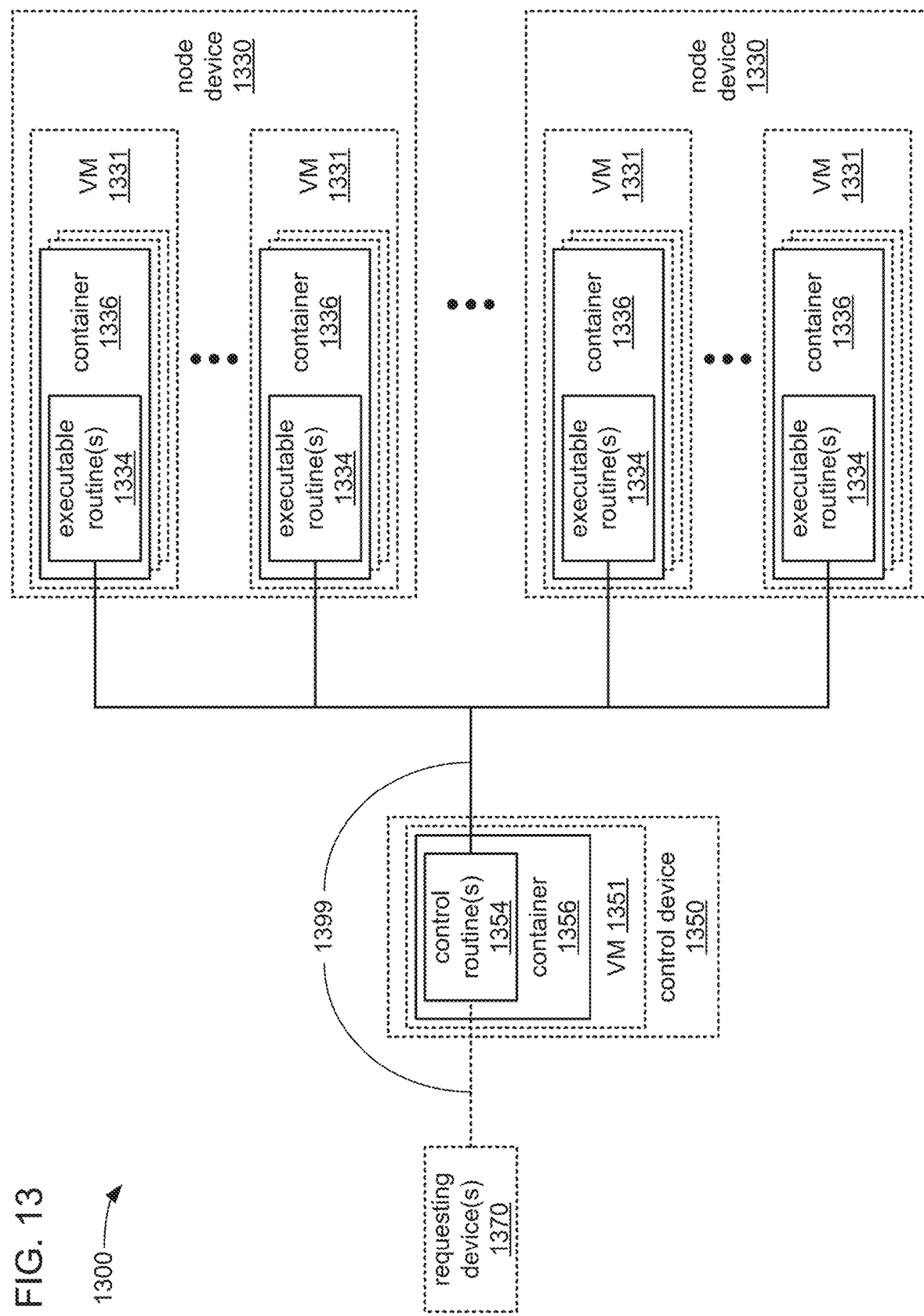
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine

1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14A:
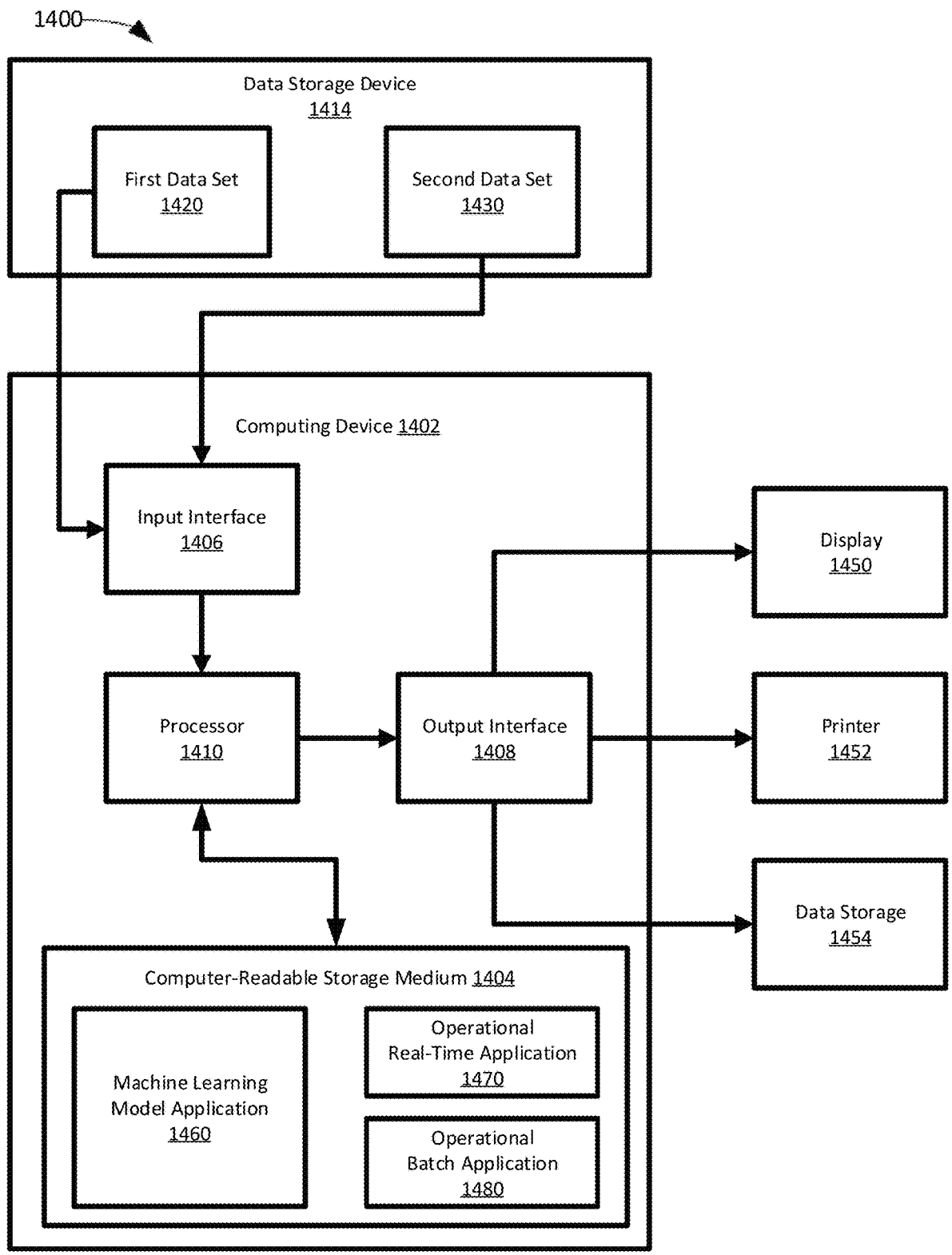
FIG. 14A illustrates a block diagram of a system for executing a machine learning model application for training a model using network features to predict relevant network relationships and for executing an operational real-time application or an operational batch application by applying the trained model to predict the relevant network relationships, according to some embodiments of the present technology.

FIG. 14A illustrates a block diagram of a system for executing a machine learning model application for training a model using network features to predict relevant network relationships and for executing an operational real-time application or an operational batch application by applying the trained model to predict the relevant network relationships, according to some embodiments of the present technology.

The system 1400 includes a data storage device 1414 and a computing device 1402. The data storage device 1414 includes a first data set 1420 and a second data set 1430. The computing device 1402 is a system including an input interface 1406, an output interface 1408, a computer-readable storage medium 1404, and a processor 1410. In one or more embodiments, fewer, different, and additional components can be incorporated into computing device 1402 or data storage device 1414.

In one or more embodiments, the input interface 1406 receives the first data set 1420 from the data storage device 1414 for executing a machine learning model application 1460 for training a model using network features to predict relevant network relationships. The input interface 1406 may receive the first data set 1420 or a second data set 1430 for executing the operational real-time application 1470 or the operational batch application 1480 by applying the trained model to predict the relevant network relationships.

The computing device 1402 outputs information to a display 1450, printer 1452, or data storage 1454 via output interface 1408. Output interface 1408 provides an interface for outputting information (e.g., output the one or more first sets of generated networks in a first graphical user interface, as a first input to an automated analytical process, or as a first input to an investigative system; output the one or more second sets of generated networks in a second graphical user interface, as a second input to an automated analytical process, or as a second input to an investigative system).

Computer-readable storage medium 1404 is an electronic holding place or storage for information so the information can be accessed by processor 1410. Computer-readable storage medium 1404 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1410 executes instructions (e.g., stored at the computer-readable storage medium 1404). The instructions can be carried out by a special purpose computer, logic circuits, or hardware circuits. In one or more embodiments, processor 1410 is implemented in hardware and/or firmware. Processor 1410 executes an instruction, meaning it performs or controls the operations called for by that instruction. The term "execution" is the process of running an application or the carrying out of the operation called for by an instruction. The instructions can be written using one or more programming languages, scripting languages, assembly languages, etc. Processor 1410 in one or more embodiments can retrieve a set of instructions from a permanent memory device and copy the instructions in an executable form to a temporary memory device that is generally some form of RAM, for example.

In one or more embodiments, computer-readable storage medium 1404 stores instructions for execution by processor 1410. For example, computer-readable storage medium 1404 may include instructions for executing a machine learning model application 1460 for training a model using network features to predict relevant network relationships. In one or more embodiments, computer-readable storage medium 1404 may include instructions for executing an operational real-time application 1470 or an operational batch application 1480 by applying the trained model to predict the relevant network relationships for the first data set 1420 or a second data set 1430. The first data set may include a training data set for the machine learning model application or a training data set for the machine learning model application with an addition, update or deletion of a new set of records or an updated set of records. The second data set may include a trained model dataset.

In one or more embodiments, one or more applications stored on computer-readable storage medium 1404 are implemented in software (e.g., computer-readable and/or computer-executable instructions) stored in computer-readable storage medium 1404 and accessible by processor 1410 for execution of the instructions. The applications can be integrated or connected with other analytic tools (e.g., offered by SAS Institute Inc. of Cary, N.C., USA such as SAS® Viya™).

In one or more embodiments, the machine learning model application 1460 obtains a first data set 1420 associated with a plurality of nodes to generate one or more sets of networks. The plurality of nodes may include, for example, data representing at least one person, at least one location, at least one telephone number, at least one email address, at least one business, at least one application, at least one account, at least one vehicle, at least one IP address, at least one organization, at least one agent, at least one supplier, or at least one event.

The machine learning model application 1460 performs operations associated with training a first model on the first data set using a first graph to predict relevant links between the plurality of nodes that includes determining one or more features for one or more links between the plurality of nodes, determining a target variable indicator for the one or more links between the plurality of nodes using the first graph, and based on the determination of the one or more features and the determination of the target variable indicator for the one or more links between the plurality of nodes using the first graph, training the first model to predict the relevant links of the one or more links between the plurality of nodes.

The first model may include a decision tree, a random forest, a neural network, or another type of predictive model.

The one or more features for the one or more links between the plurality of nodes may include for each of the one or more links between two nodes of the plurality of nodes: one or more link attributes for the one or more links between each pair of connected nodes of the plurality of nodes, one or more node attributes of each pair of the connected nodes at a first end or a second end of the one or more links, one or more node attribute computations or one or more node attribute thresholds applied to each pair of the connected nodes at the first end or the second end of the one or more links, one or more link attribute computations or one or more link attribute thresholds applied to one or more attributes of the one or more links for each pair of the connected nodes, and a first network for the one or more links between each pair of the connected nodes that connects a second node from each pair of the connected nodes to a set of nodes from each pair of the connected nodes.

FIG. 14B illustrates an example table of a training data set for nodes, according to some embodiments of the present technology. For example, the first data set may include the plurality of nodes (e.g., Node Id="$D_3$" in row 1422 of table 1421 or Node Id="$P_3$" in row 1424 of table 1421) and one or more node attributes (e.g., Node Type="Application" in row 1422 of table 1421 and Value="$4,000" in row 1422 of table 1421 or Node Type="Person" in row 1424 of table 1421 and Date of Birth="11.21.1995" in row 1424 of table 1421) for the plurality of nodes.

FIG. 14C illustrates an example table of a training data set for links, according to some embodiments of the present technology. For example, the first data set may include the one or more links between the plurality of nodes (e.g., Node 1 ID="$D_3$" and Node 2 ID="$P_3$" in row 1426 of table 1425) and the one or more features (e.g., Node 1 type="Application", Node 2 type="Person" and Role="Applicant" in row 1426 of table 1425) for the one or more links between the plurality of nodes.

FIG. 14D illustrates an example table of a trained model data set for links, according to some embodiments of the present technology. For example, the second data set may include the one or more links between the plurality of nodes (e.g., Node 1 ID="$D_{64}$" and Node 2 ID="$L_{62}$" in row 1432 of table 1431) and the one or more features (e.g., Node 1 type="Application", Node 2 type="Location", Node 1 value="$600", Role="Home", Node 2 related value="$600", Linked Node 1 count="3", and Linked Node 2 count="1" in row 1432 of table 1431) for the one or more links between the plurality of nodes.

FIGS. 15A, 15B, 16A, and 16B illustrate flow diagrams for executing operations to train a model to predict relevant network relationships, according to some embodiments of the present technology.

Figure 15A:
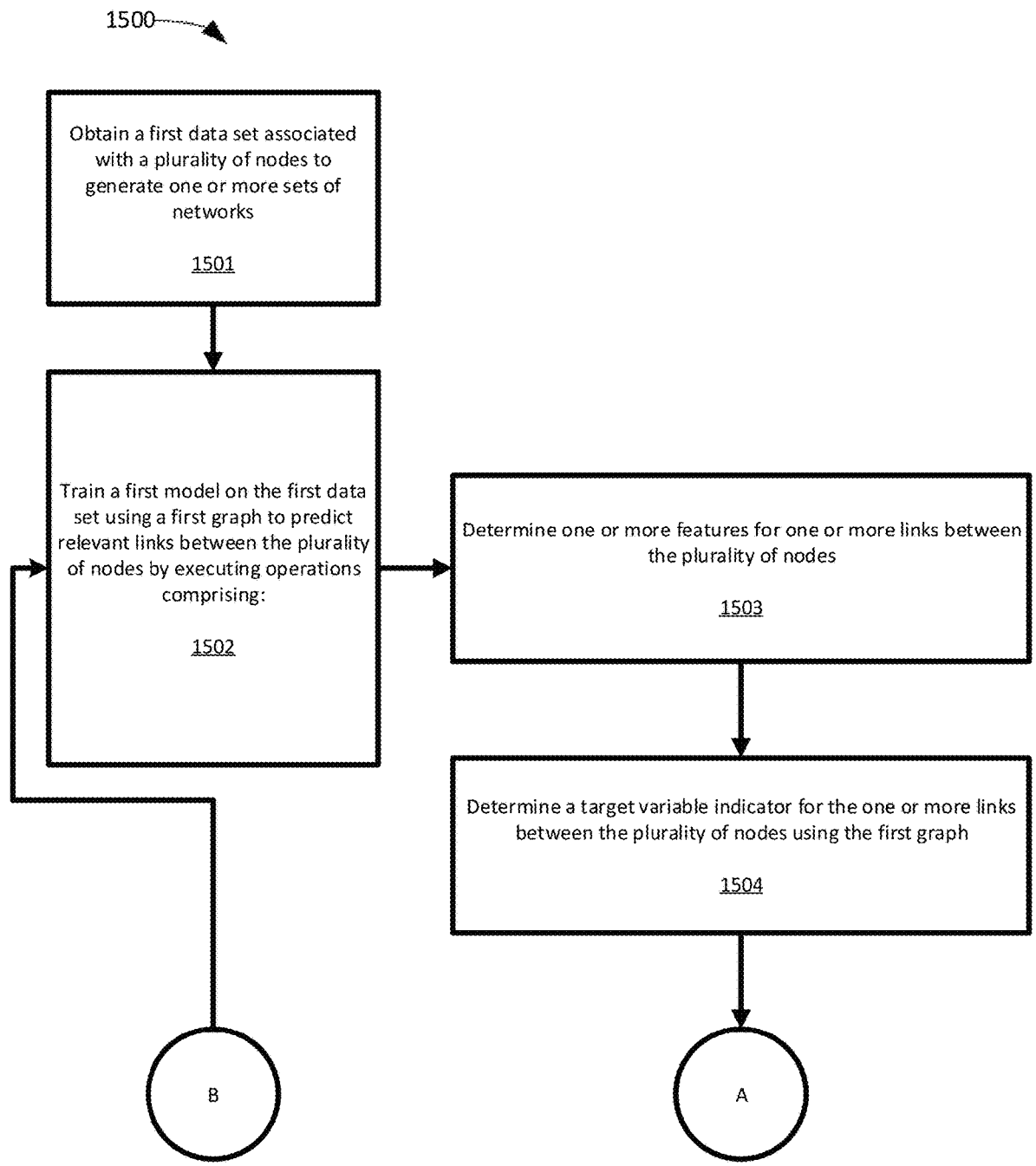
FIGS. 15A, 15B, 15C and 15D illustrate flow diagrams for executing operations for the operational real-time application by applying the trained model to predict the relevant network relationships and outputting the first sets of generated networks in a first graphical user interface, as a first input to an automated analytical process, or as a first input to an investigative system, according to some embodiments of the present technology.
Figure 16A:
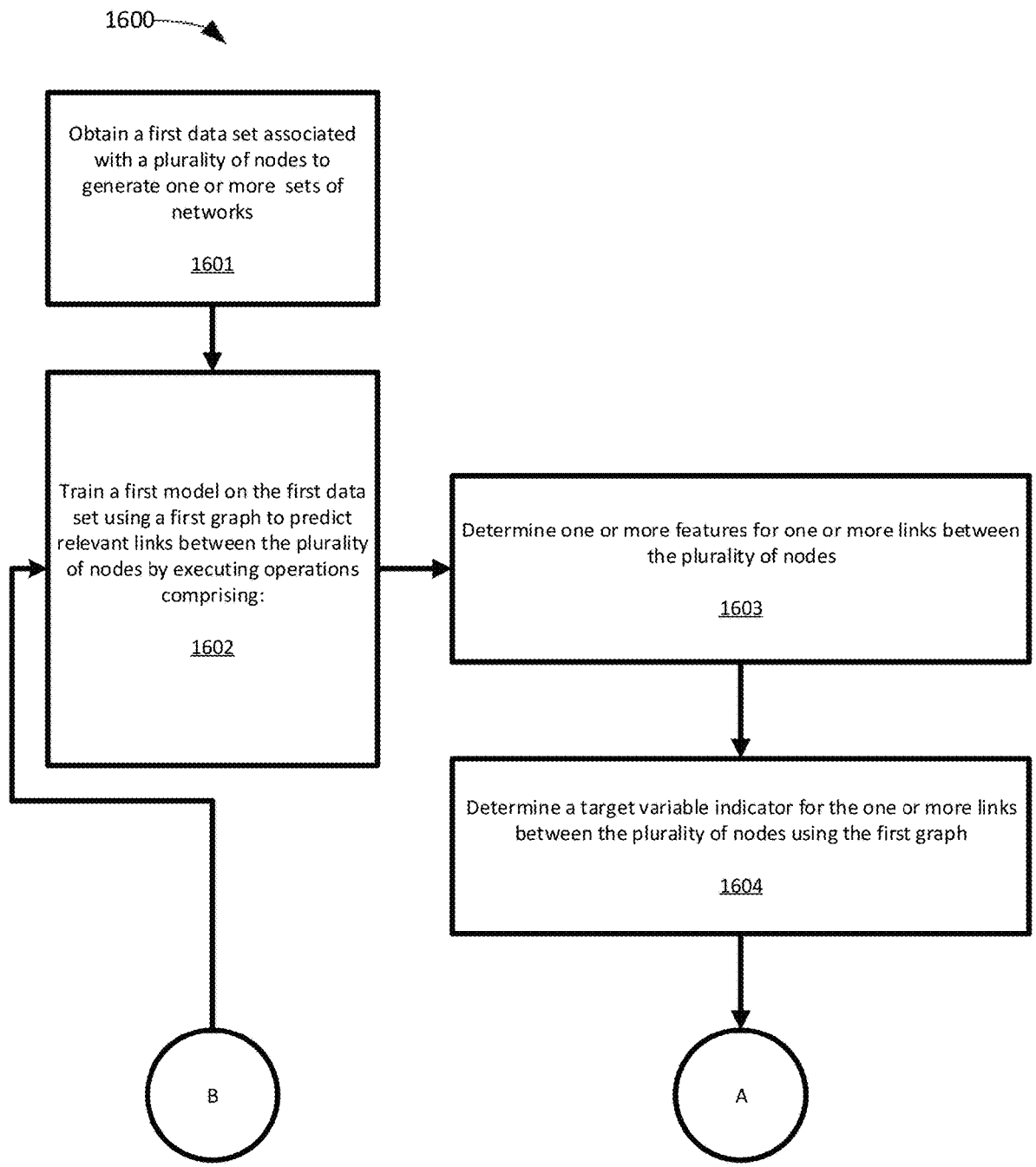
FIGS. 16A, 16B, 16C and 16D illustrate flow diagrams for executing operations for the operational batch application by applying the trained model to predict the relevant network relationships and outputting the first sets of generated networks in a first graphical user interface, as a first input to an automated analytical process, or as a first input to an investigative system, according to some embodiments of the present technology.

For block 1501 in flow diagram 1500 of FIG. 15A and for block 1601 in flow diagram 1600 of FIG. 16A, the computing device may obtain a first data set associated with a plurality of nodes to generate one or more sets of networks.

The first data set may include a training data set (e.g., material details, logistics information, parts and supplies, bank loan applications, bank accounts, police incident reports, income tax returns, insurance claims, watchlist entries, invoices, purchase orders, transactions, user accounts, ballistic reports, audit logs, network device information, healthcare records, property registrations documents, license applications, etc.) for a plurality of nodes and one or more node attributes for the plurality of nodes for training a first model.

The plurality of nodes may include, for example, data representing at least one person, at least one location, at least one telephone number, at least one email address, at least one business, at least one application, at least one account, at least one vehicle, at least one IP address, at least one organization, at least one agent, at least one supplier, or at least one event.

For example, as shown in table 1421 of FIG. 14B, the computing device may obtain the first data set associated with the plurality of nodes (e.g., column "Nodes" of table 1421).

The plurality of nodes (e.g., $B_{x1}$ and $B_{x2}$ in column "Nodes" of table 1421) may include data representing at least one business in the first data set. The plurality of nodes (e.g., $D_1$, $D_{11}$, $D_{12}$, $D_2$, $D_{21}$, $D_3$, $D_{31}$, $D_4$, $D_{41}$, $D_5$, and $D_{51}$ in column "Nodes" of table 1421) may include data representing at least one application in the first data set. The plurality of nodes (e.g., $E_1$, $E_2$, $E_3$, $E_5$, and $E_y$ in column "Nodes" of table 1421) may include data representing at least one email address in the first data set. The plurality of nodes (e.g., $L_1$, $L_2$, $L_3$, $L_4$, and $L_5$ in column "Nodes" of table 1421) may include data representing at least one location in the first data set. The plurality of nodes (e.g., $P_1$, $P_{11}$, $P_2$, $P_3$, $P_4$, and $P_5$ in column "Nodes" of table 1421) may include data representing at least one person in the first data set. The plurality of nodes (e.g., $T_1$, $T_2$, and $T_4$ in column "Nodes" of table 1421) may include data representing at least one telephone number in the first data set.

The first data set may also include a training data set (e.g., material details, logistics information, parts and supplies, bank loan applications, bank accounts, police incident reports, income tax returns, insurance claims, watchlist entries, invoices, purchase orders, transactions, user accounts, ballistic reports, audit logs, network device information, healthcare records, property registrations documents, license applications, etc.) for one or more links between the plurality of nodes and for the one or more features for the one or more links between the plurality of nodes for training a first model.

For example, as shown in table 1425 of FIG. 14C, the computing device may obtain the first data set associated with the plurality of nodes (e.g., column "Links of Nodes" in table 1425).

For block 1502 and block 1503 in flow diagram 1500 of FIG. 15A and for block 1602 and block 1603 in flow diagram 1600 of FIG. 16A, the computing device may train a first model on the first data set using a first graph to predict relevant links between the plurality of nodes by executing operations including: determine one or more features for one or more links between the plurality of nodes.

The first model may include a decision tree, a random forest, a neural network, or another type of predictive model.

The first graph may include a set of subgraphs that are determined using the Community Detection algorithm.

The one or more features for the one or more links between the plurality of nodes may include for each of the one or more links between two of the nodes plurality of nodes: one or more link attributes for the one or more links between each pair of connected nodes of the plurality of nodes, one or more node attributes of each pair of the connected nodes at a first end or a second end of the one or more links, one or more node attribute computations or one or more node attribute thresholds applied to each pair of the connected nodes at the first end or the second end of the one or more links, one or more link attribute computations or one or more link attribute thresholds applied to one or more attributes of the one or more links for each pair of the connected nodes, and a first network for the one or more links between each pair of the connected nodes that connects a second node from each pair of the connected nodes to a set of nodes from each pair of the connected nodes.

Figure 17A:
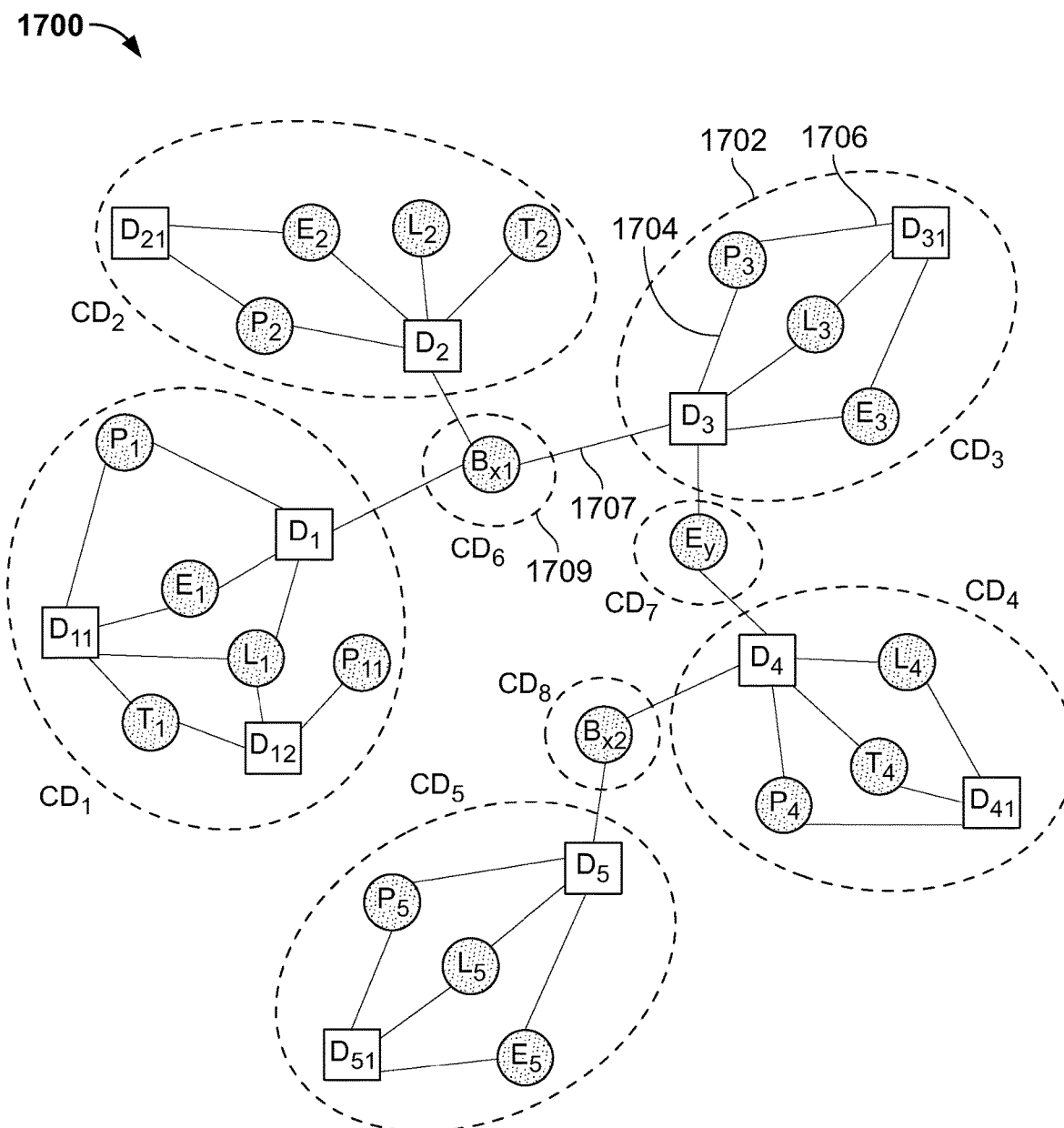
FIG. 17A illustrates an example schematic diagram depicting executing operations to train a model to predict relevant network relationships using nodes, according to some embodiments of the present technology.

FIG. 17A illustrates an example schematic diagram depicting executing operations to train a model to predict relevant network relationships using nodes, according to some embodiments of the present technology.

For example, as shown in schematic diagram 1700 of FIG. 17A, the first graph may include one or more subgraphs (e.g., $CD_3$ 1702) from the set of subgraphs. The subgraphs may include the one or more links between the plurality of nodes (e.g., Link 1 1704 between Node $P_3$ and Node $D_3$ and Link 2 1706 between Node $P_3$ and Node $D_{31}$).

FIG. 17B illustrates an example table depicting executing operations to train a model to predict relevant network relationships using node attributes and node attribute computations, according to some embodiments of the present technology.

For example, as shown in table 1710 of FIG. 17B, the determination of the one or more features, by the computing device, for the one or more links between the plurality of nodes may include for each of the one or more links between two nodes of the plurality of nodes: one or more node attributes (e.g., Node Type="Person" and Date of Birth="11.21.1995" for Node Id=$P_3$ in row 1718 of table 1710, Node Type="Application" and Value="$4,000" for Node Id=$D_3$ in row 1714 of table 1710, and Node Type="Application" and Value="$2,000" for Node Id=$D_{31}$ in row 1716 of table 1710) of each pair of the connected nodes at a first end (e.g., Node Id=$P_3$ connected to Node Id $D_3$) or a second end (e.g., Node Id=$P_3$ connected to Node Id $D_{31}$) of the one or more links (e.g., Link 1 1704 between Node $P_3$ and Node $D_3$ and Link 2 1706 between Node $P_3$ and Node $D_{31}$ in FIG. 17A) and one or more node attribute computations (e.g., Related value="$6,000", Linked node count="2" and Linked D node count="2" in row 1718 of table 1710) applied to each pair of the connected nodes at the first end (e.g., Node Id=$P_3$ connected to Node Id $D_3$) or the second end (e.g., Node Id=$P_3$ connected to Node Id $D_{31}$) of the one or more links (e.g., Link 1 1704 between Node $P_3$ and Node $D_3$ and Link 2 1706 between Node $P_3$ and Node $D_{31}$ in FIG. 17A).

The node attribute computation for "Related Value" may include one or more sums of one or more related applications (e.g., Application $D_3$ with a Value of $4,000 in row 1714 of table 1710 and Application $D_{31}$ with a Value of $2,000 in row 1716 of table 1710 equals "$6,000").

The node attribute computation for "Linked node count" may include one or more counts of one or more nodes (e.g., Node Id=$D_3$ in row 1714 of table 1710 and Node Id=$D_{31}$ in row 1716 of table 1710 equals "2") that are connected to a selected node (e.g., Node Id=$P_3$ in row 1718 of table 1710) in a relationship.

The node attribute computation for "Linked D node count" may include the one or more counts of the one or more nodes for the one or more node attributes (e.g., Node Id=$D_3$ for Node Type "Application" in row 1714 of table 1710 and Node Id=$D_{31}$ for Node Type "Application" in row 1716 of table 1710 for node attribute "Node Type" equals "2") that are connected to the selected node (e.g., Node Id=$P_3$ for Node Type "Person" in row 1718 of table 1710) in the relationship.

Figure 20A:
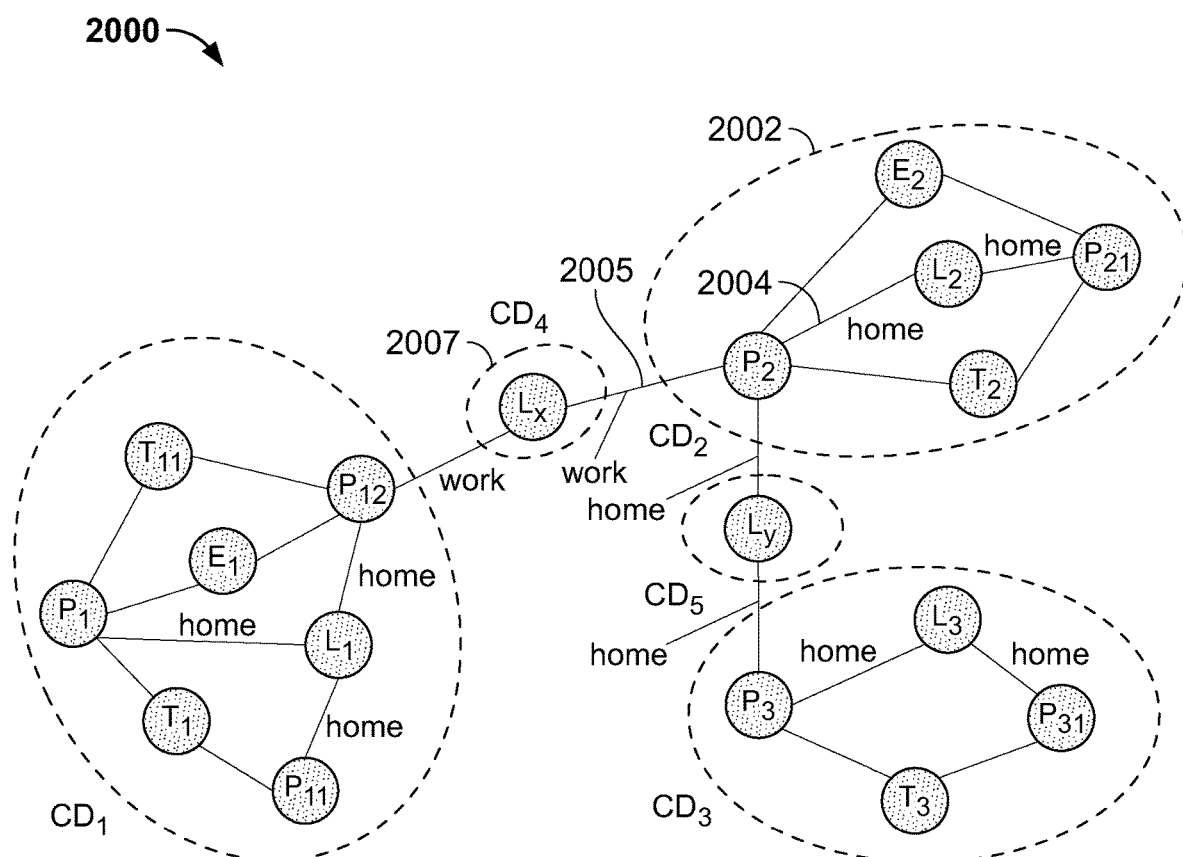
FIG. 20A illustrates an example schematic diagram depicting executing operations to train a model to predict relevant network relationships using links of nodes, according to some embodiments of the present technology.

FIG. 20A illustrates an example schematic diagram depicting executing operations to train a model to predict relevant network relationships using links of nodes, according to some embodiments of the present technology.

For example, as shown in schematic diagram 2000 of FIG. 20A, the first graph may include one or more subgraphs (e.g., $CD_2$ 2002) from the set of subgraphs. The subgraphs may include the one or more links between the plurality of nodes (e.g., Link 10 2004 between Node $P_2$ and Node $L_2$).

FIG. 20B illustrates an example table of nodes depicting executing operations to train a model to predict relevant network relationships using the Community Detection algorithm to determine the target variable, according to some embodiments of the present technology.

For example, as shown in table 2010 of FIG. 20B, the determination of the one or more features, by the computing device, for the one or more links between the plurality of nodes may include for each of the one or more links between two nodes of the plurality of nodes: one or more link attributes (e.g., Role="home" in row 2014 of table 2010) for the one or more links between each pair of connected nodes (e.g., Node 1 Id=$P_2$ and Node 2 Id=$L_2$ in row 2014 of table 2010) of the plurality of nodes and one or more node attributes (e.g., Node 1 Type="Person" for Node 1 Id=$P_2$ and Node 2 Type="Location" for Node Id=$L_2$ in row 2014 of table 2010) of each pair of the connected nodes at a first end (e.g., Node Id=$P_2$ connected to Node Id $L_2$) or a second end of the one or more links (e.g., Link 10 2004 between Node $P_2$ and Node $L_2$ in FIG. 20A).

For block 1502 and block 1504 in flow diagram 1500 of FIG. 15A and for block 1602 and block 1604 in flow diagram 1600 of FIG. 16A, the computing device may train a first model on the first data set using a first graph to predict relevant links between the plurality of nodes by executing operations including: determine a target variable indicator for the one or more links between the plurality of nodes using the first graph.

Alternatively, or additionally, the computing device operations may include determining a set of subgraphs from the first graph. Determining the set of subgraphs (e.g., subgraphs $CD_1$, $CD_2$, $CD_3$, $CD_4$, $CD_5$, $CD_6$, $CD_7$, and $CD_8$ as shown in FIG. 17A or subgraphs $CD_1$, $CD_2$, $CD_3$, $CD_4$, and $CD_5$ as shown in FIG. 20A) from the first graph may include applying a Community Detection algorithm for sets of nodes that are strongly connected (i.e., nodes that include many connections) or for sets of nodes where the connections are more highly weighted.

Alternatively, or additionally, the computing device operations may include determining whether each of the one or more links between each node of the plurality of nodes connect within a single subgraph of the set of subgraphs from the first graph.

For example, as shown in schematic diagram 1700 of FIG. 17A, the computing device may determine whether each of the one or more links between each node of the plurality of nodes (e.g., Link 1 1704 between Node $P_3$ and Node $D_3$ and Link 2 1706 between Node $P_3$ and Node $D_{31}$) connect within a single subgraph (e.g., $CD_3$ 1702) of the set of subgraphs from the first graph.

For example, as shown in schematic diagram 2000 of FIG. 20A, the computing device may determine whether each of the one or more links between each node of the plurality of nodes (e.g., Link 10 2004 between Node $P_2$ and Node $L_2$) connect within a single subgraph (e.g., $CD_2$ 2002) of the set of subgraphs from the first graph.

Alternatively, or additionally, based on the determination of whether each of the one or more links between each node of the plurality of nodes connect within the single subgraph of the set of subgraphs from the first graph, label the one or more links as intra-community links in the single subgraph of the set of subgraphs from the first graph.

FIG. 17C illustrates an example table depicting executing operations to train a model to predict relevant network relationships using the Community Detection algorithm to determine the target variable, according to some embodiments of the present technology.

The table of nodes in FIG. 17B may be used as an input for the table of links in FIG. 17C.

For example, as shown in schematic diagram 1700 of FIG. 17A and in table 1720 of FIG. 17C, based on the determination of whether each of the one or more links between each node of the plurality of nodes (e.g., Link 1 1704 between Node $P_3$ and Node $D_3$ and Link 2 1706 between Node $P_3$ and Node $D_{31}$ in schematic diagram 1700) connect within the single subgraph (e.g., $CD_3$ 1702 in schematic diagram 1700) of the set of subgraphs from the first graph, label the one or more links as intra-community links (e.g., Intra-community="TRUE" in row 1724 of table 1720) in the single subgraph of the set of subgraphs from the first graph.

For example, as shown in schematic diagram 2000 of FIG. 20A and table 2010 of FIG. 20B, based on the determination of whether each of the one or more links between each node of the plurality of nodes (e.g., Link 10 2004 between Node $P_2$ and Node $L_2$ in schematic diagram 2000) connect within the single subgraph (e.g., $CD_2$ 2002 in schematic diagram 2000) of the set of subgraphs from the first graph, label the one or more links as intra-community links (e.g., Intra-community="TRUE" in row 2014 of table 2010) in the single subgraph of the set of subgraphs from the first graph.

Alternatively, or additionally, the computing device operations may include determining whether each of the one or more links between each node of the plurality of nodes connect between at least two subgraphs of the set of subgraphs from the first graph.

For example, as shown in schematic diagram 1700 of FIG. 17A, the computing device may determine whether each of the one or more links between each node of the plurality of nodes (e.g., Link 3 1707 between Node $D_3$ and Node $B_{x1}$) connect between at least two subgraphs (e.g., $CD_3$ 1702 and in $CD_6$ 1709) of the set of subgraphs from the first graph.

For example, as shown in schematic diagram 2000 of FIG. 20A, the computing device may determine whether each of the one or more links between each node of the plurality of nodes (e.g., Link 11 2005 between Node $P_2$ and Node $L_x$) connect between at least two subgraphs (e.g., $CD_2$ 2002 and $CD_4$ 2007) of the set of subgraphs from the first graph.

Alternatively, or additionally, based on the determination of whether each of the one or more links between each node of the plurality of nodes connect between at least two subgraphs of the set of subgraphs from the first graph, label the one or more links as inter-community links in the at least two subgraphs of the set of subgraphs from the first graph.

For example, as shown in schematic diagram 1700 of FIG. 17A and table 1720 of FIG. 17C, based on the determination of whether each of the one or more links between each node of the plurality of nodes (e.g., Link 3 1707 between Node $D_3$ and Node $B_{x1}$ in schematic diagram 1700) connect between at least two subgraphs (e.g., $CD_3$ 1702 and $CD_6$ 1709 in schematic diagram 1700) of the set of subgraphs from the first graph, label the one or more links as inter-community links (e.g., Intra-community="FALSE" in row 1729 of table 1720) in the at least two subgraphs of the set of subgraphs from the first graph.

For example, as shown in schematic diagram 2000 of FIG. 20A and table 2010 of FIG. 20B, based on the determination of whether each of the one or more links between each node of the plurality of nodes (e.g., Link 11 2005 between Node $P_2$ and Node $L_x$ in schematic diagram 2000) connect between at least two subgraphs (e.g., $CD_2$ 2002 and $CD_4$ 2007 in schematic diagram 2000) of the set of subgraphs from the first graph, label the one or more links as inter-community links (e.g., Intra-community="FALSE" in row 2012 of table 2010) in the at least two subgraphs of the set of subgraphs from the first graph.

Alternatively, or additionally, the computing device may output the labeled one or more links between each node of the plurality of nodes as the intra-community links in the single subgraph of the set of subgraphs from the first graph.

For example, as shown in schematic diagram 1700 of FIG. 17A, the computing device may output the labeled one or more links between each node of the plurality of nodes (e.g., Link 1 1704 between Node $P_3$ and Node $D_3$ and Link 2 1706 between Node $P_3$ and Node $D_{31}$) as the intra-community links in the single subgraph of the set of subgraphs from the first graph.

For example, as shown in schematic diagram 2000 of FIG. 20A, the computing device may output the labeled one or more links between each node of the plurality of nodes (e.g., Link 10 2004 between Node $P_2$ and Node $L_2$) as the intra-community links in the single subgraph of the set of subgraphs from the first graph.

Alternatively, or additionally, the computing device may output the labeled one or more links between each node of the plurality of nodes as the inter-community links in the at least two subgraphs of the set of subgraphs from the first graph.

For example, as shown in schematic diagram 1700 of FIG. 17A, the computing device may output the labeled one or more links between each node of the plurality of nodes (e.g., Link 3 1707 between Node $D_3$ and Node $B_{x1}$ in schematic diagram 1700) as the inter-community links in the at least two subgraphs of the set of subgraphs from the first graph.

For example, as shown in schematic diagram 2000 of FIG. 20A, the computing device may output the labeled one or more links between each node of the plurality of nodes (e.g., Link 11 2005 between Node $P_2$ and Node $L_x$ in schematic diagram 2000) as the inter-community links in the at least two subgraphs of the set of subgraphs from the first graph.

Figure 15B:
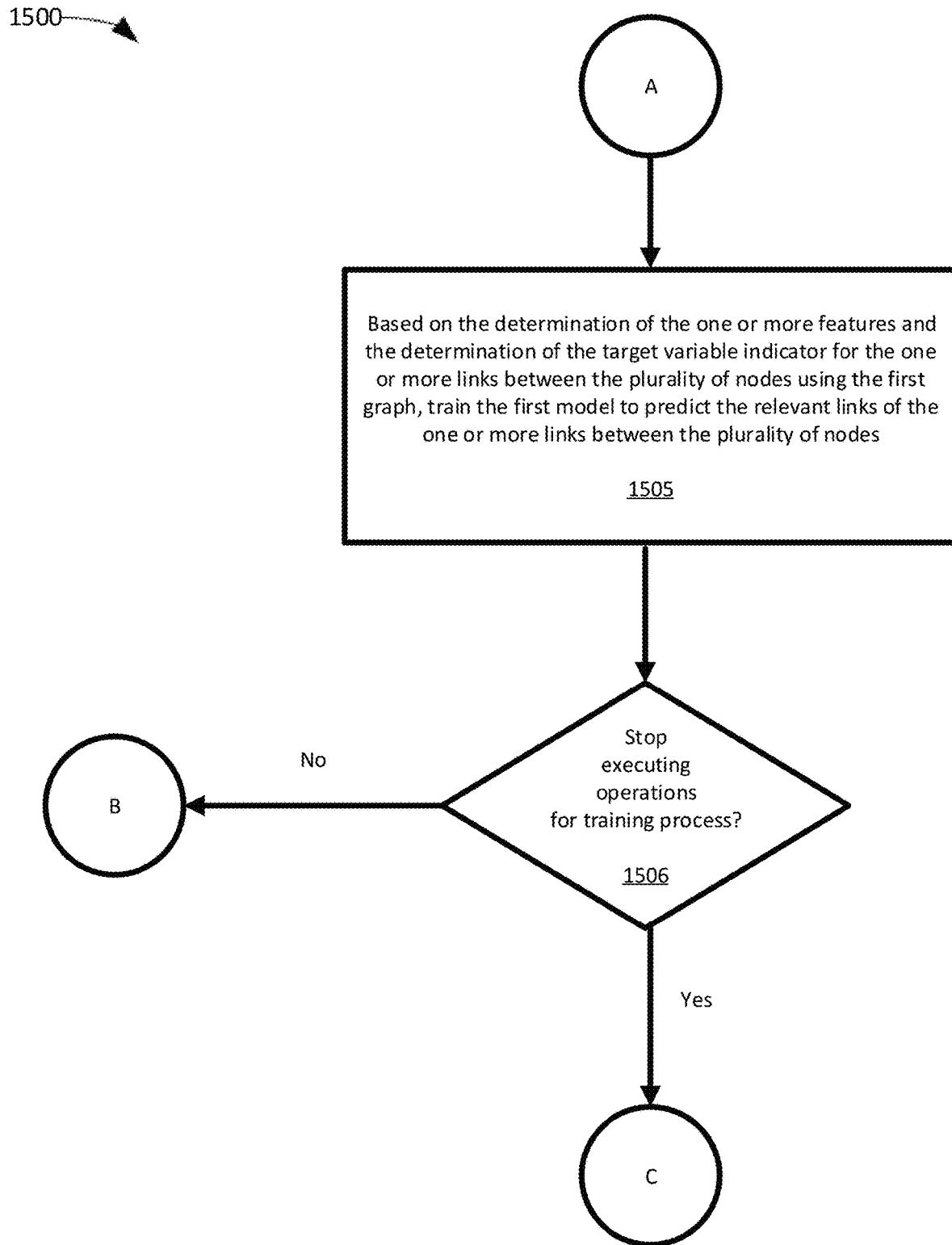
Figure 16B:
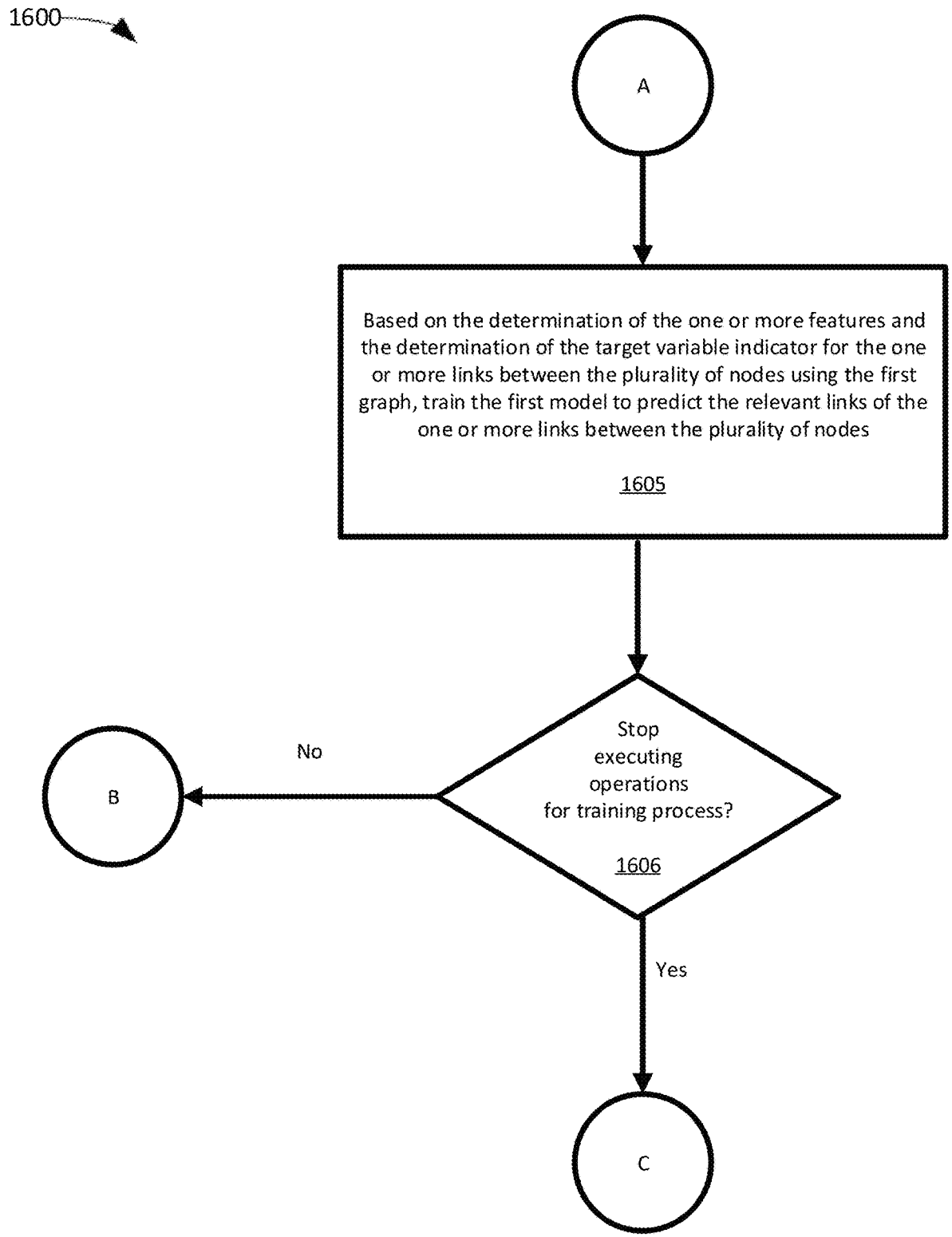

For block 1502 in flow diagram 1500 of FIG. 15A and block 1505 in flow diagram 1500 of FIG. 15B and for block 1602 in flow diagram 1600 of FIG. 16A and block 1605 in flow diagram 1600 of FIG. 16B, the computing device may train a first model on the first data set using a first graph to predict relevant links between the plurality of nodes by executing operations including: based on the determination of the one or more features and the determination of the target variable indicator for the one or more links between the plurality of nodes using the first graph, train the first model to predict the relevant links of the one or more links between the plurality of nodes.

For example, as shown in schematic diagram 1700 of FIG. 17A and table 1720 of FIG. 17C, based on the determination of the one or more features and the determination of the target variable indicator (e.g., Intra-community="TRUE" in row 1724 of table 1720) for the one or more links between the plurality of nodes using the first graph, the computing device may train the first model to predict the relevant links (e.g., Link 1 1704 between Node $P_3$ and Node $D_3$ and Link 2 1706 between Node $P_3$ and Node $D_{31}$ in schematic diagram 1700) of the one or more links between the plurality of nodes. Thus, the one or more links between the plurality of nodes connecting applications to persons, emails, locations, and telephone numbers include relevant links.

Based on the determination of the one or more features and the determination of the target variable indicator (e.g., Intra-community="FALSE" in row 1729 of table 1720) for the one or more links between the plurality of nodes using the first graph, the computing device may also train the first model to predict the non-relevant links (e.g., Link 3 1707 between Node $D_3$ and Node $B_{x1}$ in schematic diagram 1700) of the one or more links between the plurality of nodes. Thus, the one or more links between the plurality of nodes connecting applications to businesses include non-relevant links.

For example, as shown in schematic diagram 2000 of FIG. 20A and table 2010 of FIG. 20B, based on the determination of the one or more features and the determination of the target variable indicator (e.g., Intra-community="TRUE" in row 2014 of table 2010) for the one or more links between the plurality of nodes using the first graph, the computing device may train the first model to predict the relevant links (e.g., Link 10 2004 between Node $P_2$ and Node $L_2$ in schematic diagram 2000) of the one or more links between the plurality of nodes. Thus, the one or more links between the plurality of nodes connecting persons to locations with the link attribute "home" include relevant links.

Based on the determination of the one or more features and the determination of the target variable indicator (e.g., Intra-community="FALSE" in row 2012 of table 2010) for the one or more links between the plurality of nodes using the first graph, the computing device may also train the first model to predict the non-relevant links (e.g., Link 11 2005 between Node $P_2$ and Node $L_x$ in schematic diagram 2000) of the one or more links between the plurality of nodes. Thus, the one or more links between the plurality of nodes connecting persons to locations with the link attribute "work" include non-relevant links.

For block 1506 in flow diagram 1500 of FIG. 15B and for block 1606 in flow diagram 1600 of FIG. 16B, the computing device may determine whether the execution of the operations to train a first model on the first data set using a first graph to predict relevant links between the plurality of nodes may stop or may not stop.

The computing device may determine that the execution of the operations to train a first model on the first data set using a first graph to predict relevant links between the plurality of nodes may not stop. Based on the determination, the computing device may return the execution of the operations to train a first model on the first data set using a first graph to predict relevant links between the plurality of nodes to block 1502 in flow diagram 1500 of FIG. 15A and to block 1602 in flow diagram 1600 of FIG. 16A.

The computing device may determine that the execution of the operations to train a first model on the first data set using a first graph to predict relevant links between the plurality of nodes may stop.

Figure 15C:
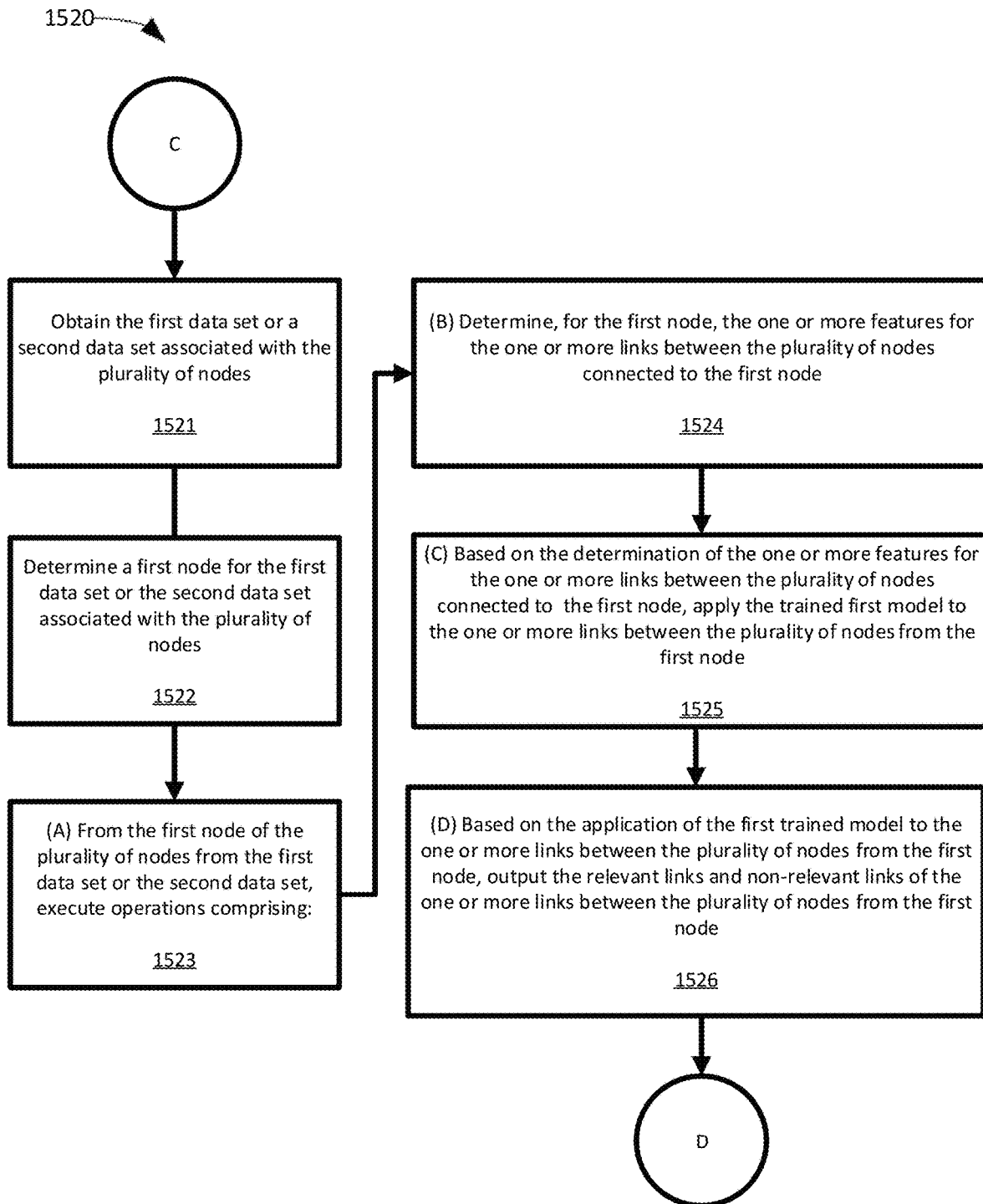

Based on the determination, the computing device may stop executing operations to train a first model on the first data set using a first graph to predict relevant links between the plurality of nodes and continue to block 1521 in flow diagram 1520 of FIG. 15C to execute operations for the operational real-time application by applying the trained model to predict the relevant network relationships and outputting the one or more first sets of generated networks in a first graphical user interface, as a first input to an automated analytical process, or as a first input to an investigative system.

Figure 16C:
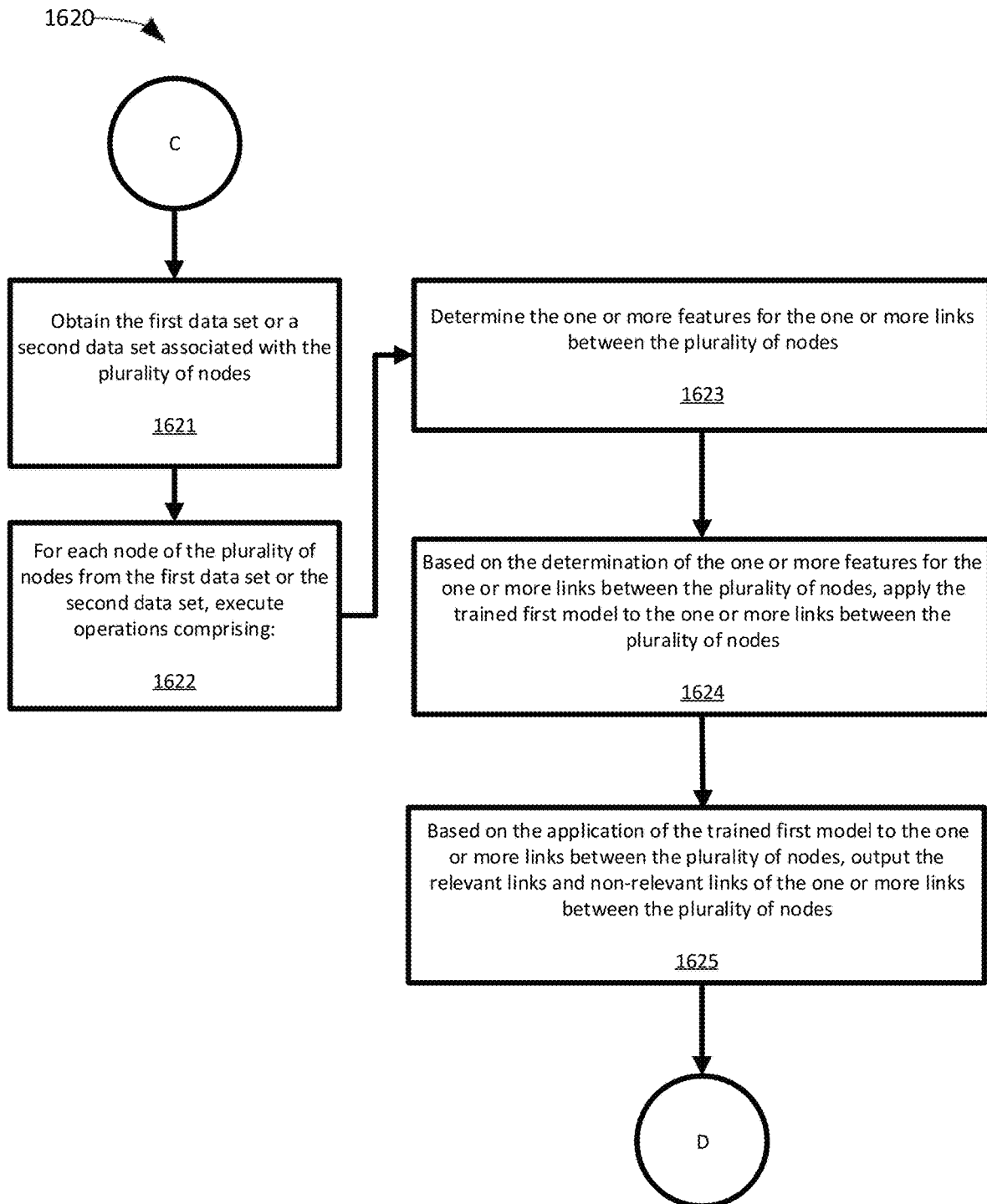

Based on the determination, the computing device may also stop executing operations to train a first model on the first data set using a first graph to predict relevant links between the plurality of nodes and continue to block 1621 in flow diagram 1620 of FIG. 16C to execute operations for the operational batch application by applying the trained model to predict the relevant network relationships and outputting the one or more first sets of generated networks in a first graphical user interface, as a first input to an automated analytical process, or as a first input to an investigative system.

Alternatively, or additionally, the computing device may obtain the first data set associated with the plurality of nodes to generate one or more sets of networks. The computing device may train an updated model on the first data set using the first graph to predict the relevant links between the plurality of nodes by executing operations including: determine the one or more features for the one or more links between the plurality of nodes, determine a target variable indicator for the one or more links between the plurality of nodes using the first graph, and based on the determination of the one or more features and the determination of the target variable indicator for the one or more links between the plurality of nodes using the first graph, train the updated model to predict the relevant links of the one or more links between the plurality of nodes.

Figure 15D:
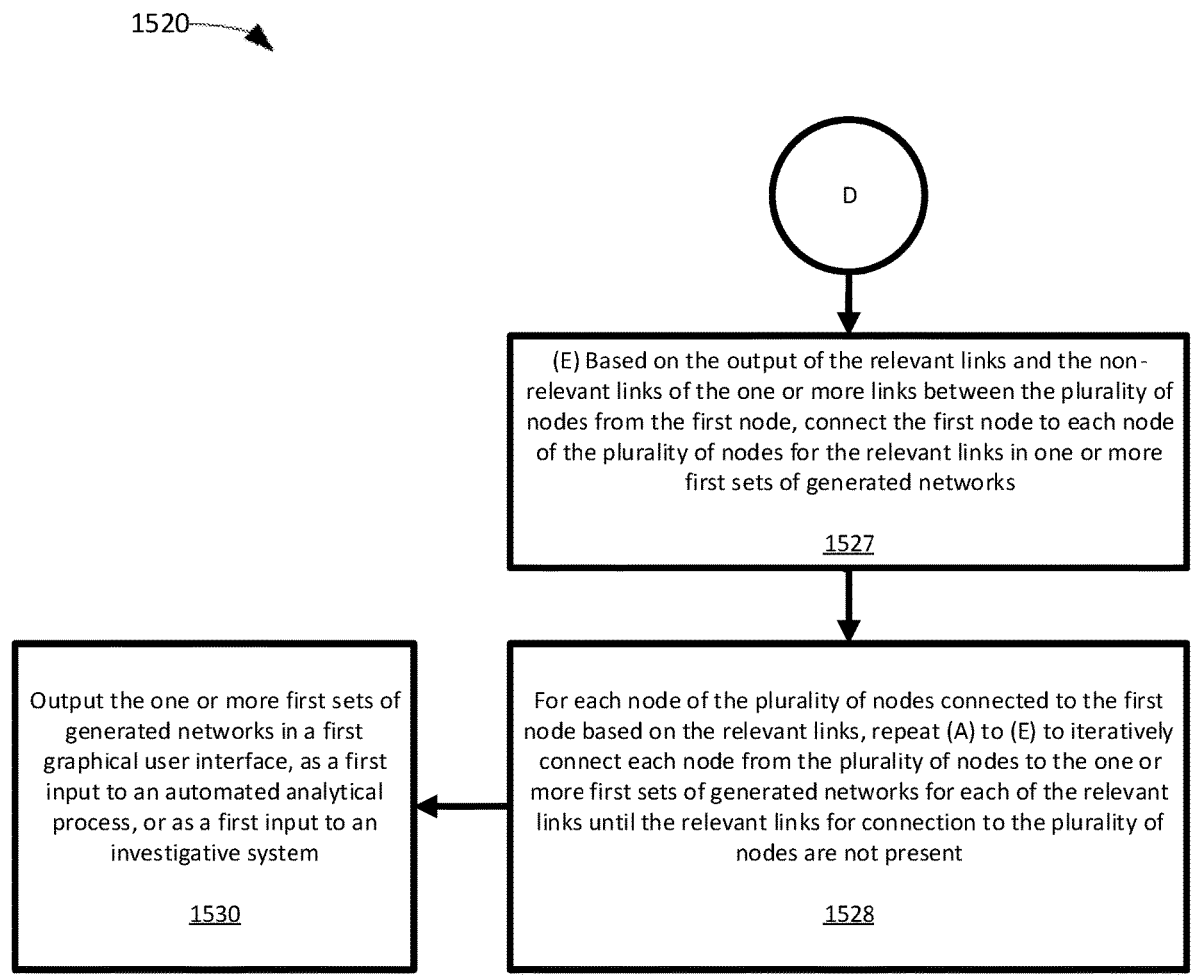

FIGS. 15C and 15D illustrate flow diagrams for executing operations for the operational real-time application by applying the trained model to predict the relevant network relationships and outputting the one or more first sets of generated networks in a first graphical user interface, as a first input to an automated analytical process, or as a first input to an investigative system, according to some embodiments of the present technology.

For block 1521 in flow diagram 1520 of FIG. 15C, the computing device may obtain the first data set or a second data set associated with the plurality of nodes.

The first data set may include a training data set (e.g., material details, logistics information, parts and supplies, bank loan applications, bank accounts, police incident reports, income tax returns, insurance claims, watchlist entries, invoices, purchase orders, transactions, user accounts, ballistic reports, audit logs, network device information, healthcare records, property registrations documents, license applications, etc.) for a plurality of nodes and one or more node attributes for the plurality of nodes for training a first model.

The second data set may include a trained model dataset.

The plurality of nodes may include, for example, data representing at least one person, at least one location, at least one telephone number, at least one email address, at least one business, at least one application, at least one account, at least one vehicle, at least one IP address, at least one organization, at least one agent, at least one supplier, or at least one event.

For example, as shown in table 1421 of FIG. 14B, the computing device may obtain the first data set associated with the plurality of nodes (e.g., column "Nodes" of table 1421).

For example, as shown in table 1425 of FIG. 14C, the computing device may obtain the first data set associated with the plurality of nodes (e.g., column "Links of Nodes" in table 1425).

For example, as shown in table 1431 of FIG. 14D, the computing device may obtain a second data set associated with the plurality of nodes (e.g., column "Links of Nodes" in table 1431).

For block 1522 in flow diagram 1520 of FIG. 15C, the computing device may determine a first node for the first data set or the second data set associated with the plurality of nodes.

Figure 18A:
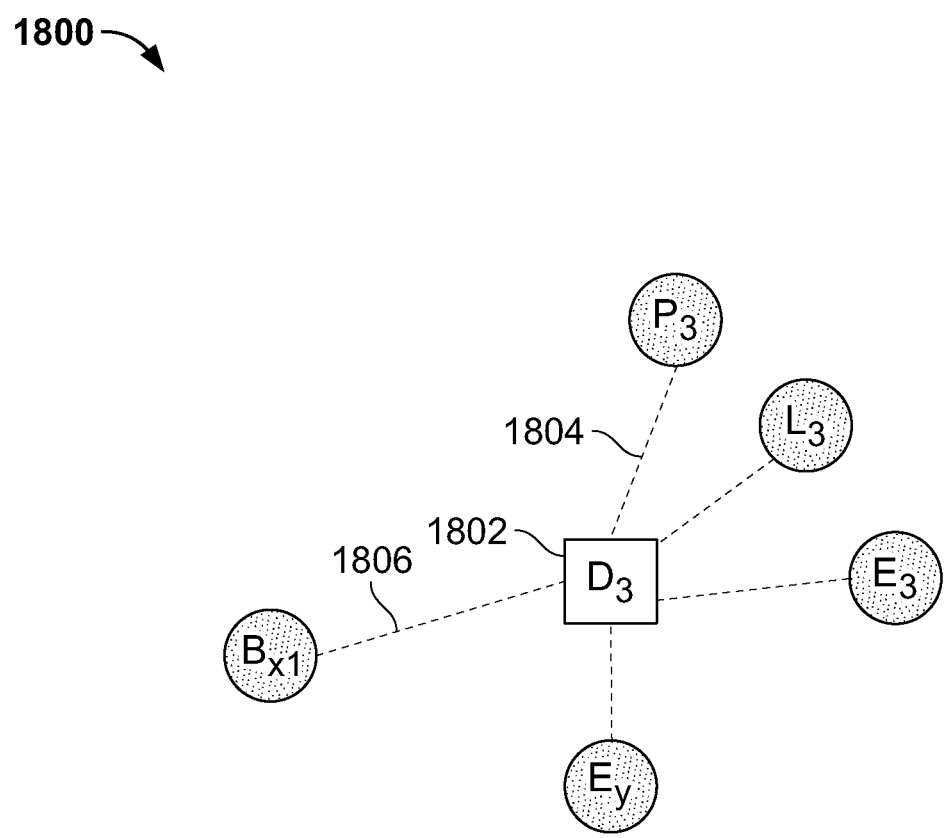
FIG. 18A illustrates an example schematic diagram depicting executing operations for the operational real-time application to determine a first node and to determine the features for links between nodes connected to the first node, according to some embodiments of the present technology.

FIG. 18A illustrates an example schematic diagram depicting executing operations for the operational real-time application to determine a first node and to determine the features for links between nodes connected to the first node, according to some embodiments of the present technology.

For example, as shown in schematic diagram 1800 of FIG. 18A, the computing device may determine a first node (e.g., Node $D_3$ 1802) for the first data set or the second data set associated with the plurality of nodes.

Figure 21A:
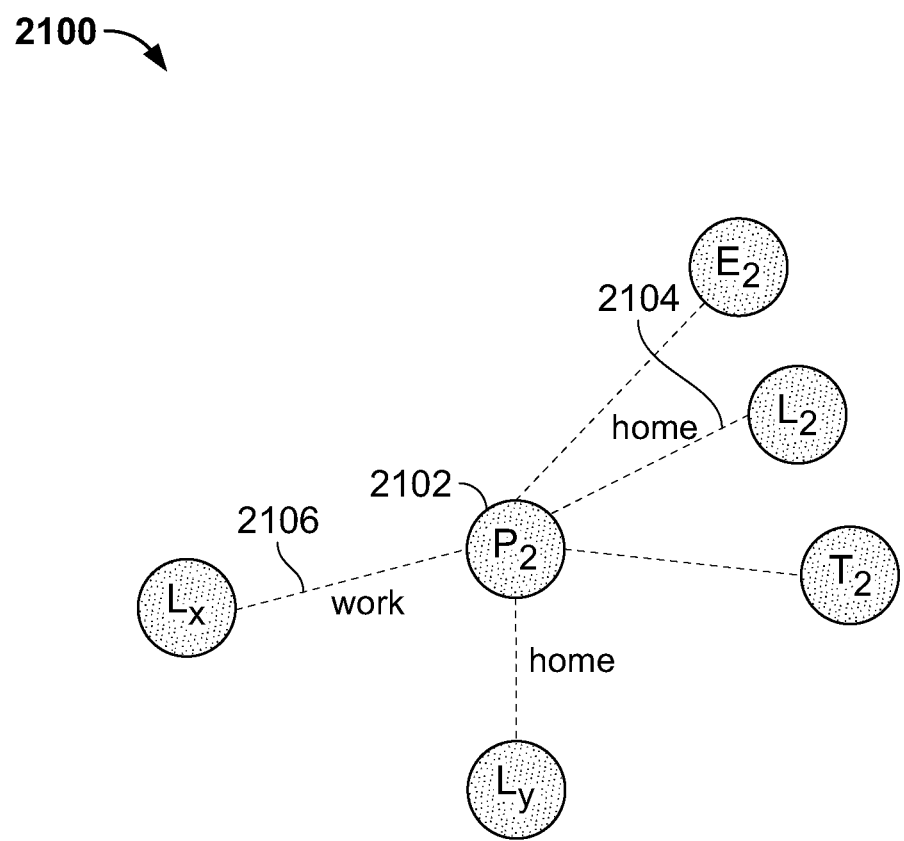
FIG. 21A illustrates an example schematic diagram depicting executing operations for the operational real-time application to determine a first node and to determine the features for links with link attributes between nodes connected to the first node, according to some embodiments of the present technology.

FIG. 21A illustrates an example schematic diagram depicting executing operations for the operational real-time application to determine a first node and to determine the features for links with link attributes between nodes connected to the first node, according to some embodiments of the present technology.

For example, as shown in schematic diagram 2100 of FIG. 21A, the computing device may determine a first node (e.g., Node $P_2$ 2102) for the first data set or the second data set associated with the plurality of nodes.

For block 1523 and block 1524 in flow diagram 1520 of FIG. 15C, the computing device may, (A) from the first node from the first data set or the second data set associated with the plurality of nodes, execute operations including: (B) determine, for the first node, the one or more features for the one or more links between the plurality of nodes connected to the first node.

The one or more features for the one or more links between the plurality of nodes may include for each of the one or more links between two nodes of the plurality of nodes: one or more link attributes for the one or more links between each pair of connected nodes of the plurality of nodes, one or more node attributes of each pair of the connected nodes at a first end or a second end of the one or more links, one or more node attribute computations or one or more node attribute thresholds applied to each pair of the connected nodes at the first end or the second end of the one or more links, one or more link attribute computations or one or more link attribute thresholds applied to one or more attributes of the one or more links for each pair of the connected nodes, and a first network for the one or more links between each pair of the connected nodes that connects a second node from each pair of the connected nodes to a set of nodes from each pair of the connected nodes.

For example, as shown in table 1720 of FIG. 17C and in schematic diagram 1800 of FIG. 18A, the computing device may determine, for the first node (e.g., Node $D_3$ 1802 in schematic diagram 1800), the one or more features (e.g., Node Attributes including "Node 1 Type", Node 2 Type" and "Node 1 Value" and Node Attribute Computations including "Node 2 related value", "Linked node 1 count", and "Linked node 2 count" in table 1720) for the one or more links between the plurality of nodes (e.g., Links between Node 1 ID "$D_3$" and Node 2 ID "$P_3$" in row 1724 of table 1720; Link 4 1804 between Node $D_3$ and Node $P_3$ in schematic diagram 1800; Links between Node 1 ID "$D_3$" and Node 2 ID "$B_{x1}$" in row 1729 of table 1720; Link 5 1806 between Node $D_3$ and Node $B_{x1}$ in schematic diagram 1800) connected to the first node.

For example, as shown in table 2010 of FIG. 20B and in schematic diagram 2100 of FIG. 21A, the computing device may determine, for the first node (e.g., Node $P_2$ 2102 in schematic diagram 2100), the one or more features (e.g., Link Attributes including "Role" in table 2010) for the one or more links between the plurality of nodes (e.g., Links between Node 1 ID "$P_2$" and Node 2 ID "$L_x$" in row 2012 of table 2010; Link 12 2106 between Node $P_2$ and Node $L_x$ in schematic diagram 2100; Links between Node 1 ID "$P_2$" and Node 2 ID $L_2$" in row 2014 of table 2010; Link 13 2104 between Node $P_2$ and Node $L_2$ in schematic diagram 2100) connected to the first node.

For block 1523 and block 1525 in flow diagram 1520 of FIG. 15C, the computing device may, (A) from the first node from the first data set or the second data set associated with the plurality of nodes, execute operations including: (C) based on the determination of the one or more features for the one or more links between the plurality of nodes connected to the first node, apply the trained first model to the one or more links between the plurality of nodes from the first node.

The application of the trained first model (i.e., a decision tree, a random forest, a neural network, or another type of predictive model), by the computing device, may include running the trained first model on each row of the first data set (e.g., table 1421 in FIG. 14B or table 1425 in FIG. 14C) or the second data set (e.g., table 1431 in FIG. 14D).

The application of the trained first model (i.e., a decision tree, a random forest, a neural network, or another type of predictive model), by the computing device, may include determining whether the one or more links are relevant links or non-relevant links by predicting a probability or other continuous number (e.g., a number between 0.000000 and 1.000000) as an indication of the likelihood that the one more links include relevant links or non-relevant links.

For example, as shown in schematic diagram 1800 of FIG. 18A, based on the determination of the one or more features for the one or more links between the plurality of nodes connected to the first node (e.g., $D_3$ 1802 in schematic diagram 1800), the computing device may, for each node of the plurality of nodes from the first data set or the second data set, apply the trained first model to the one or more links between the plurality of nodes (e.g., Link 4 1804 between Node $D_3$ and Node $P_3$ in schematic diagram 1800; Link 5 1806 between Node $D_3$ and Node $B_{x1}$ in schematic diagram 1800) from the first node.

For example, as shown in schematic diagram 2100 of FIG. 21A, based on the determination of the one or more features for the one or more links between the plurality of nodes connected to the first node (e.g., Node $P_2$ 2102 in schematic diagram 2100), the computing device may, for each node of the plurality of nodes from the first data set or the second data set, apply the trained first model to the one or more links between the plurality of nodes (e.g., Link 12 2106 between Node $P_2$ and Node $L_x$ in schematic diagram 2100; Link 13 2104 between Node $P_2$ and Node $L_2$ in schematic diagram 2100) from the first node.

The application of the trained first model, by the computing device, to the one or more links between the plurality of nodes may provide a trained model variable. The trained model variable may include a probability or other continuous variable of the one or more links between the plurality of nodes as relevant links.

The application of the trained first model, by the computing device, to the one or more links between the plurality of nodes is optimized by: automatically computing a first threshold for the trained model variable for one or more factors including network size or performance of the system, applying a second threshold for the trained model variable to each of the one or more links or to the one or more links for the one or more factors including mean, standard deviation, or the network size, or applying a third threshold for the trained model variable from one or more user preferences.

For block 1523 and block 1526 in flow diagram 1520 of FIG. 15C, the computing device may, (A) from a first node of the plurality of nodes from the first data set or the second data set, execute operations including: (D) based on the application of the trained first model to the one or more links between the plurality of nodes from the first node, output the relevant links and the non-relevant links of the one or more links between the plurality of nodes from the first node.

Figure 18B:
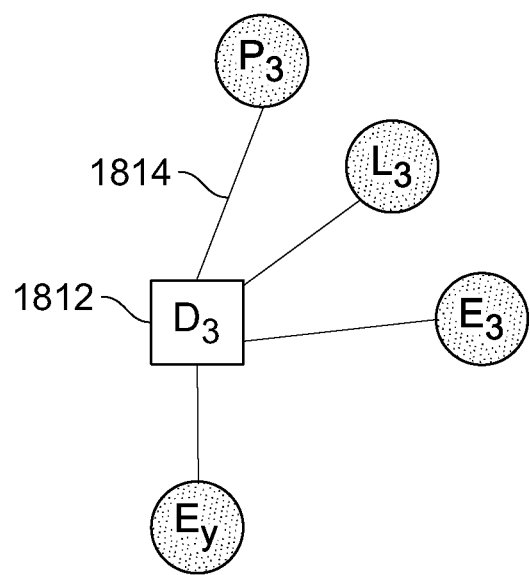
FIG. 18B illustrates an example schematic diagram depicting executing operations for the operational real-time application to output relevant and non-relevant links between nodes from the first node, according to some embodiments of the present technology.

FIG. 18B illustrates an example schematic diagram depicting executing operations for the operational real-time application to output relevant and non-relevant links between nodes from the first node, according to some embodiments of the present technology.

For example, as shown in schematic diagram 1810 of FIG. 18B, the computing device may, from a first node of the plurality of nodes from the first data set or the second data set, execute operations including: based on the application of the trained first model to the one or more links between the plurality of nodes from the first node (e.g., $D_3$ 1812 in schematic diagram 1810), output relevant links (e.g., Link 6 1814 between Node $D_3$ and Node $P_3$ in schematic diagram 1810) and the non-relevant links (e.g., removed Link between Node $D_3$ and Node $B_{x1}$ as shown in schematic diagram 1800) of the one or more links between the plurality of nodes from the first node. Thus, the one or more links between the plurality of nodes connecting applications to persons, emails, and locations include relevant links. The one or more links between the plurality of nodes connecting applications to businesses include non-relevant links.

Figure 21B:
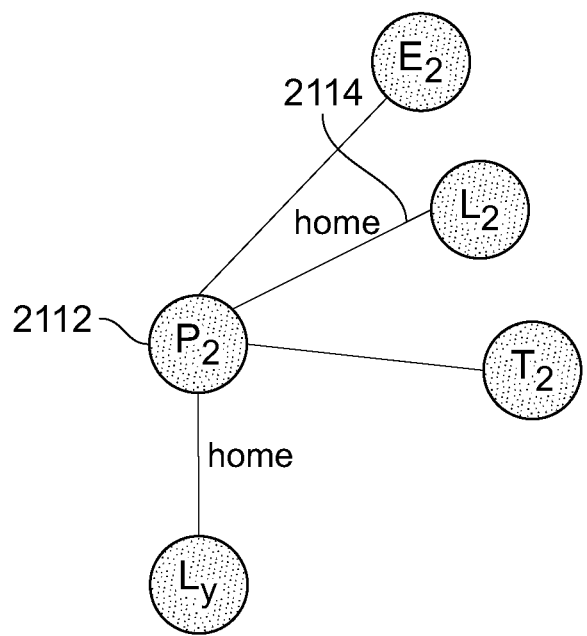
FIG. 21B illustrates an example schematic diagram depicting executing operations for the operational real-time application to output relevant and non-relevant links with link attributes between nodes from the first node, according to some embodiments of the present technology.

FIG. 21B illustrates an example schematic diagram depicting executing operations for the operational real-time application to output relevant and non-relevant links with link attributes between nodes from the first node, according to some embodiments of the present technology.

For example, as shown in schematic diagram 2110 of FIG. 21B, the computing device may, from a first node of the plurality of nodes from the first data set or the second data set, execute operations including: based on the application of the trained first model to the one or more links between the plurality of nodes from the first node (e.g., Node $P_2$ 2112 in schematic diagram 2110), output relevant links (e.g., Link 14 2114 between Node $P_2$ and Node $L_2$ in schematic diagram 2110) and the non-relevant links (e.g., removed Link between Node $P_2$ and Node $L_x$ labeled with Link attribute "work" as shown in schematic diagram 2100) of the one or more links between the plurality of nodes from the first node. Thus, the one or more links between the plurality of nodes connecting persons to locations with the link attribute "home" include relevant links. The one or more links between the plurality of nodes connecting persons to locations with the link attribute "work" include non-relevant links.

For block 1523 in flow diagram 1520 of FIG. 15C and block 1527 in flow diagram 1520 of FIG. 15D, the computing device may, (A) from a first node of the plurality of nodes from the first data set or the second data set, execute operations including: (E) based on the output of the relevant links and the non-relevant links of the one or more links between the plurality of nodes from the first node, connect the first node to each node of the plurality of nodes for the relevant links in one or more first sets of networks.

For example, as shown in schematic diagram 1810 of FIG. 18B, the computing device may, from a first node of the plurality of nodes from the first data set or the second data set, execute operations including: based on the output of the relevant links and the non-relevant links of the one or more links between the plurality of nodes from the first node, connect the first node (e.g., $D_3$ 1812 in schematic diagram 1810) to each node (e.g., $P_3$, $L_3$, $E_3$, and $E_y$ in schematic diagram 1810) of the plurality of nodes for the relevant links (e.g., Links denoted by solid lines in schematic diagram 1810) in one or more first sets of networks.

For example, as shown in schematic diagram 2110 of FIG. 21B, the computing device may, from a first node of the plurality of nodes from the first data set or the second data set, execute operations including: based on the output of the relevant links and the non-relevant links of the one or more links between the plurality of nodes from the first node, connect the first node (e.g., Node $P_2$ 2112 in schematic diagram 2110) to each node (e.g., $L_2$ and $L_y$ in schematic diagram 2110) of the plurality of nodes for the relevant links (e.g., Links labeled with Link attribute "home" in schematic diagram 2110) in one or more first sets of networks.

For block 1523 in flow diagram 1520 of FIG. 15C and block 1528 in flow diagram 1520 of FIG. 15D, the computing device may, from a first node of the plurality of nodes from the first data set or the second data set, execute operations including: for each node of the plurality of nodes connected to the first node based on the relevant links, repeat (A) to (E) to iteratively connect each node from the plurality of nodes to the one or more first sets of networks for each of the relevant links until the relevant links for connection to the plurality of nodes are not present.

FIGS. 18C, 18D, 18E, and 18F illustrate example schematic diagrams for the operational real-time application for repeating (A) to (E) to iteratively connect each node to the first sets of networks for each of the relevant links, according to some embodiments of the present technology.

Figure 18C:
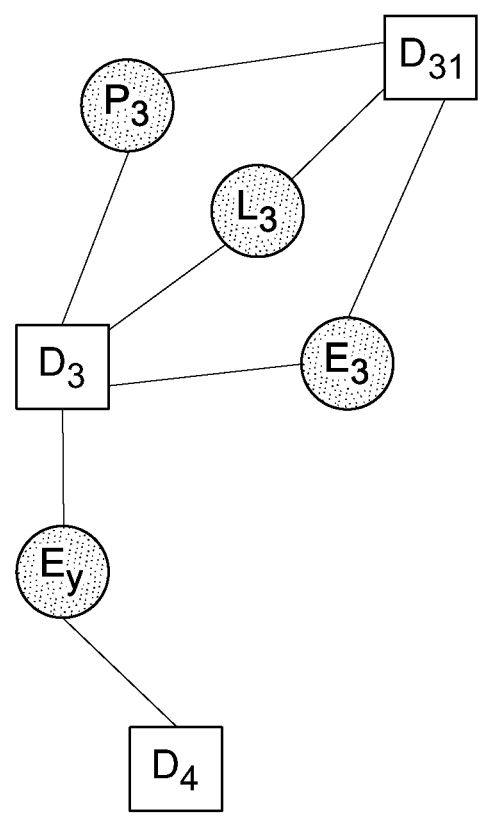
FIGS. 18C, 18D, 18E, and 18F illustrate example schematic diagrams for the operational real-time application for repeating (A) to (E) to iteratively connect each node to the first sets of networks for each of the relevant links, according to some embodiments of the present technology.

For example, as shown in schematic diagram 1820 of FIG. 18C, the computing device may, from the first node of the plurality of nodes from the first data set or the second data set, execute operations including: for each node of the plurality of nodes connected to the first node (e.g., $D_3$) based on the relevant links, repeat (A) to (E) to iteratively connect each node (e.g., $P_3$, $L_3$, $E_3$, $E_y$, $D_{31}$, and $D_4$) from the plurality of nodes to the one or more first sets of networks for each of the relevant links until the relevant links for connection to the plurality of nodes are not present.

Figure 18D:
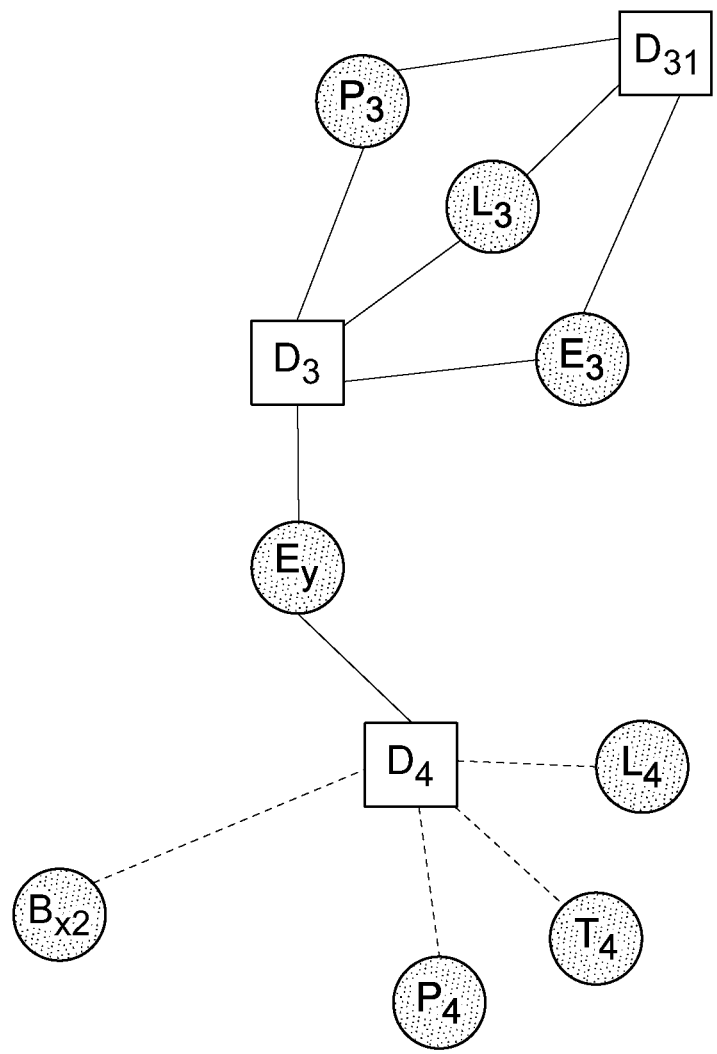

For example, as shown in schematic diagram 1830 of FIG. 18D, the computing device may, from the first node of the plurality of nodes from the first data set or the second data set, execute operations including: for each node of the plurality of nodes connected to the first node (e.g., $D_3$) based on the relevant links, repeat (A) to (C) to iteratively connect each node (e.g., $P_3$, $L_3$, $E_3$, $E_y$, $D_{31}$, and $D_4$) from the plurality of nodes to the one or more first sets of networks for each of the relevant links until the relevant links for connection to the plurality of nodes are not present.

Figure 18E:
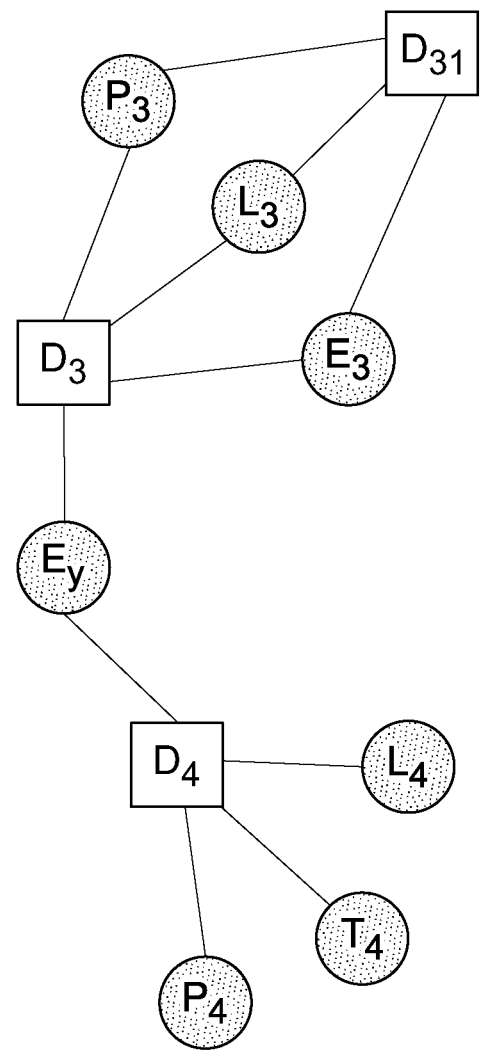

For example, as shown in schematic diagram 1840 of FIG. 18E, the computing device may, from the first node of the plurality of nodes from the first data set or the second data set, execute operations including: for each node of the plurality of nodes connected to the first node (e.g., $D_3$) based on the relevant links, repeat (D) to (E) to iteratively connect each node (e.g., $P_3$, $L_3$, $E_3$, $E_y$, $D_{31}$, $D_4$, $L_4$, $P_4$, and $T_4$) from the plurality of nodes to the one or more first sets of networks for each of the relevant links until the relevant links for connection to the plurality of nodes are not present.

Figure 18F:
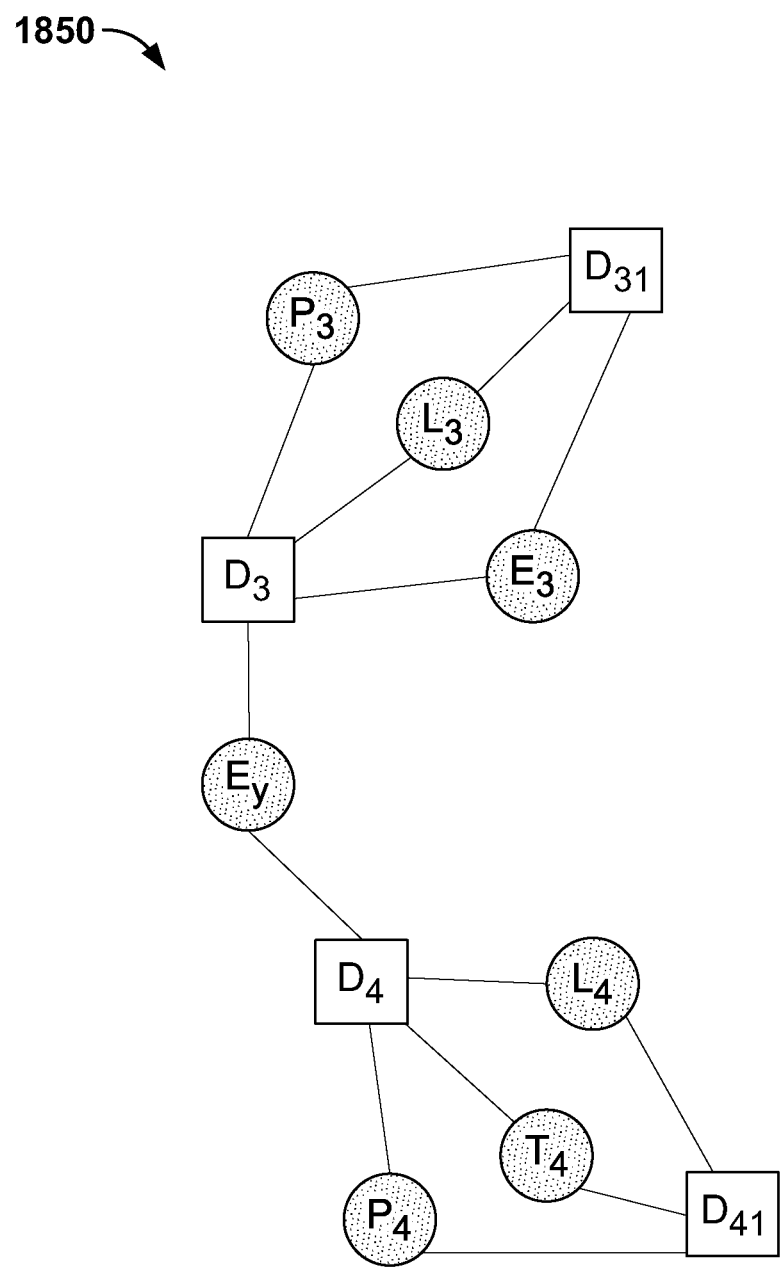

For example, as shown in schematic diagram 1850 of FIG. 18F, the computing device may, from the first node of the plurality of nodes from the first data set or the second data set, execute operations including: for each node of the plurality of nodes connected to the first node (e.g., $D_3$) based on the relevant links, repeat (A) to (E) to iteratively connect each node (e.g., $P_3$, $L_3$, $E_3$, $E_y$, $D_{31}$, $D_4$, $L_4$, $P_4$, $T_4$. and $D_{41}$) from the plurality of nodes to the one or more first sets of networks for each of the relevant links until the relevant links for connection to the plurality of nodes are not present.

Figure 21C:
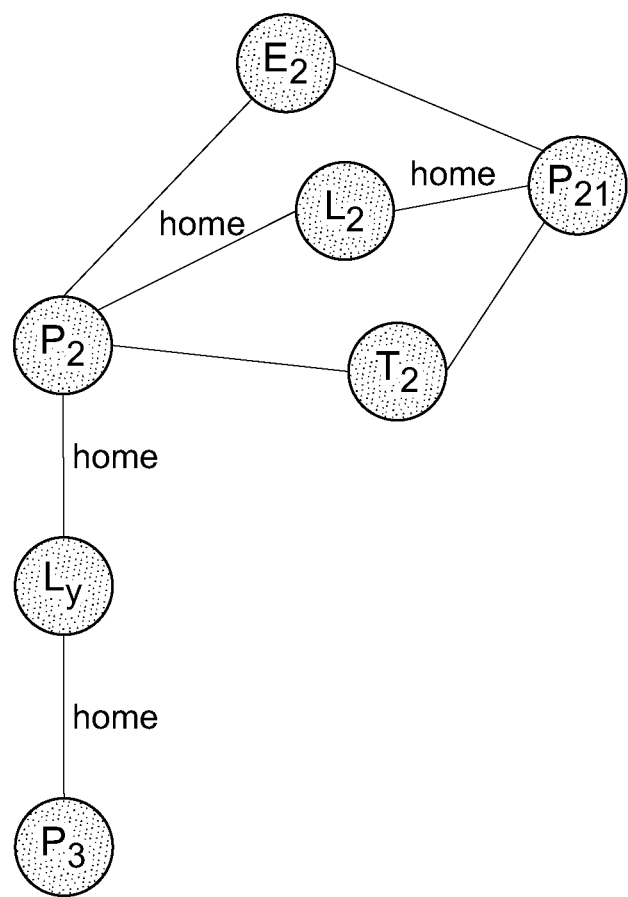
FIGS. 21C, 21D, and 21E illustrate example schematic diagrams for the operational real-time application for repeating (A) to (E) to iteratively connect each node with link relationships between nodes to the first sets of networks for each of the relevant links, according to some embodiments of the present technology.
Figure 21D:
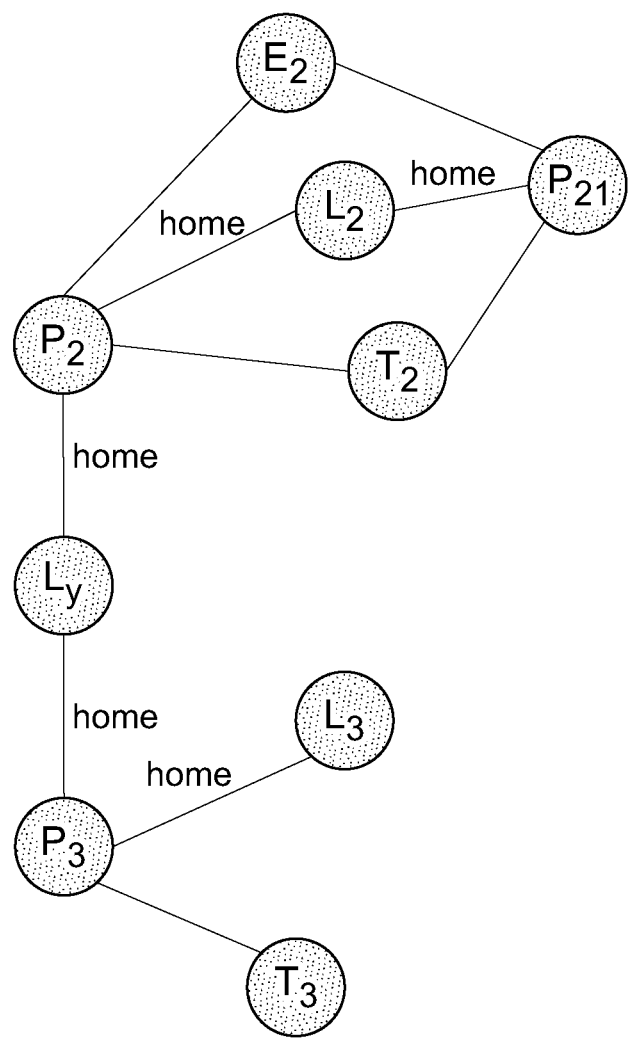
Figure 21E:
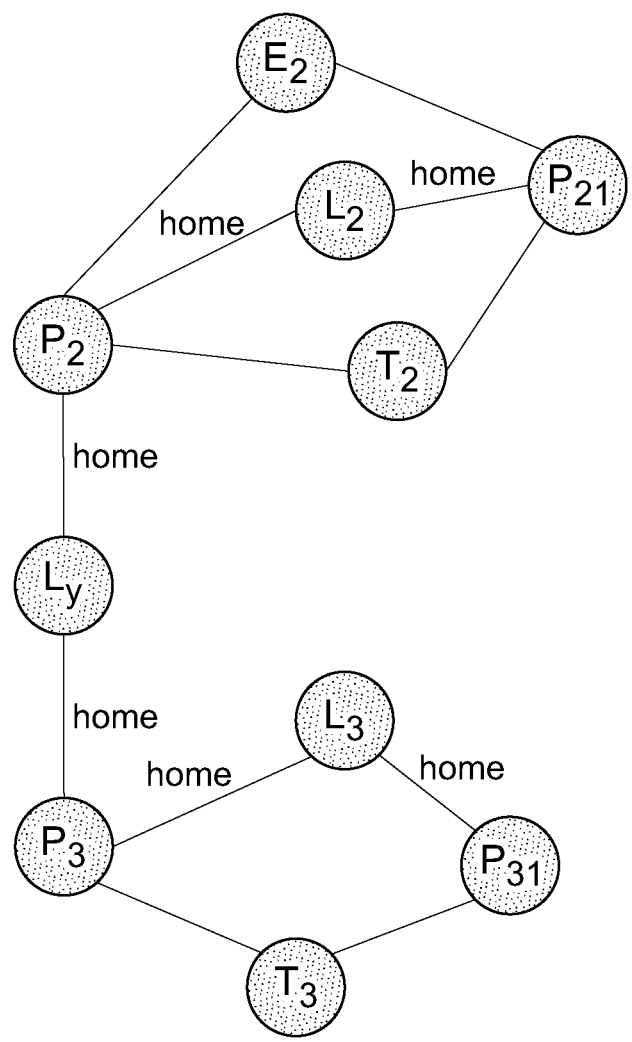

FIGS. 21C, 21D and 21E illustrate example schematic diagrams for the operational real-time application for repeating (A) to (E) to iteratively connect each node with link attributes between nodes to the first sets of networks for each of the relevant links, according to some embodiments of the present technology.

For example, as shown in schematic diagram 2120 of FIG. 21C, the computing device may, from the first node of the plurality of nodes from the first data set or the second data set, execute operations including: for each node of the plurality of nodes connected to the first node (e.g., $P_2$) based on the relevant links, repeat (A) to (E) to iteratively connect each node (e.g., $L_2$, $P_{21}$, $L_y$, and $P_3$) from the plurality of nodes to the one or more first sets of networks for each of the relevant links until the relevant links for connection to the plurality of nodes are not present.

For example, as shown in schematic diagram 2130 of FIG. 21D, the computing device may, from the first node of the plurality of nodes from the first data set or the second data set, execute operations including: for each node of the plurality of nodes connected to the first node (e.g., $P_2$) based on the relevant links, repeat (A) to (E) to iteratively connect each node (e.g., $L_2$, $P_{21}$, $L_y$, $P_3$, and $L_3$) from the plurality of nodes to the one or more first sets of networks for each of the relevant links until the relevant links for connection to the plurality of nodes are not present.

For example, as shown in schematic diagram 2140 of FIG. 21E, the computing device may, from the first node of the plurality of nodes from the first data set or the second data set, execute operations including: for each node of the plurality of nodes connected to the first node (e.g., $P_2$) based on the relevant links, repeat (A) to (E) to iteratively connect each node (e.g., $L_2$, $P_{21}$, $L_y$, $P_3$, $L_3$, and $P_{31}$) from the plurality of nodes to the one or more first sets of networks for each of the relevant links until the relevant links for connection to the plurality of nodes are not present.

For block 1530 in flow diagram 1520 of FIG. 15D, the computing device may output the one or more first sets of generated networks in a first graphical user interface, as a first input to an automated analytical process, or as a first input to an investigative system for the operational real-time application.

Figure 18G:
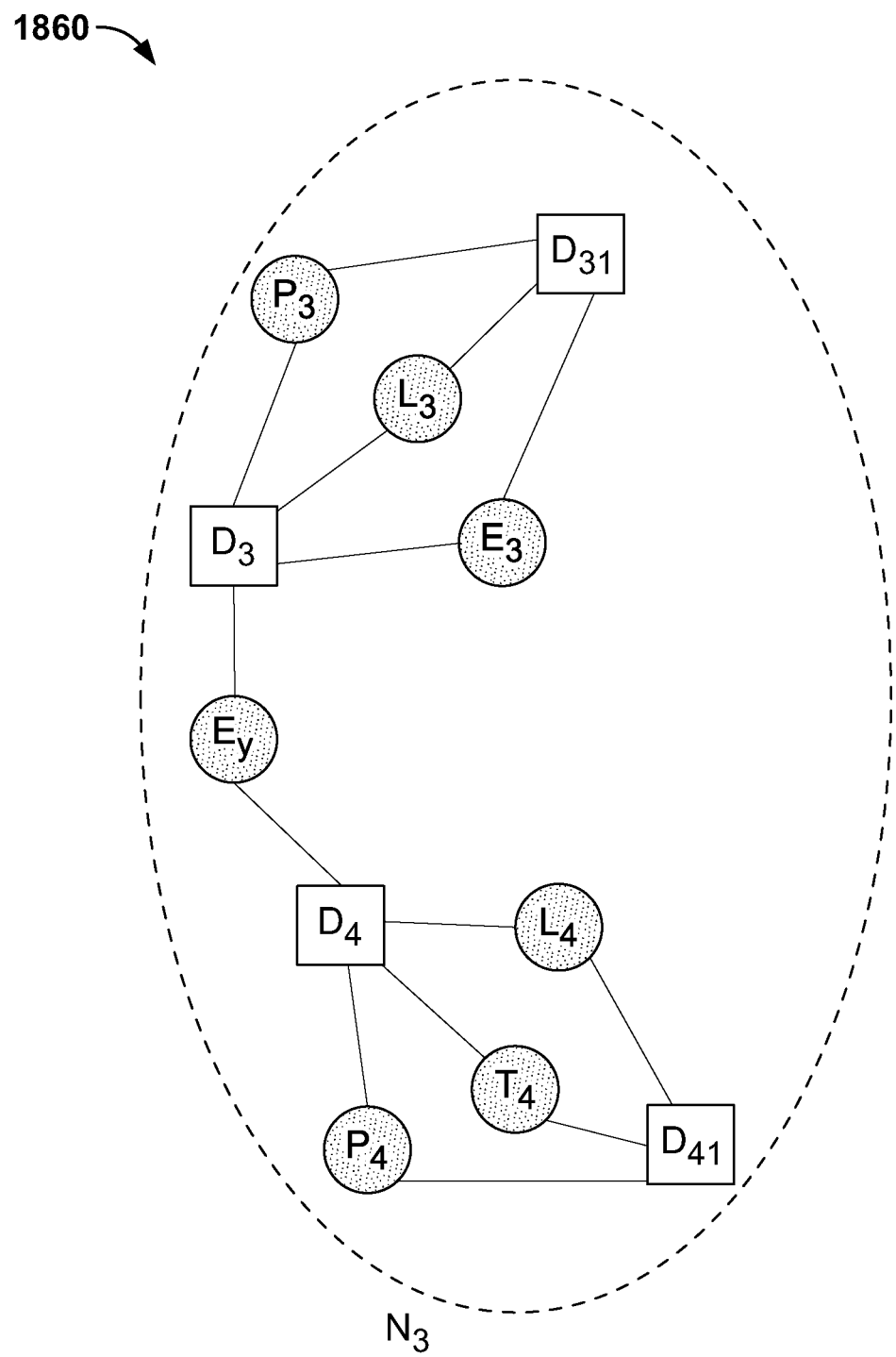
FIG. 18G illustrates an example schematic diagram for the operational real-time application for outputting the first sets of generated networks in a first graphical user interface, as a first input to an automated analytical process, or as a first input to an investigative system, according to some embodiments of the present technology.

FIG. 18G illustrates an example schematic diagram for the operational real-time application for outputting the first sets of generated networks in a first graphical user interface, as a first input to an automated analytical process, or as a first input to an investigative system, according to some embodiments of the present technology.

For example, as shown in schematic diagram 1860 of FIG. 18G, the computing device may output the one or more first sets of generated networks (e.g., $N_3$) in a first graphical user interface, as a first input to an automated analytical process, or as a first input to an investigative system.

Figure 21F:
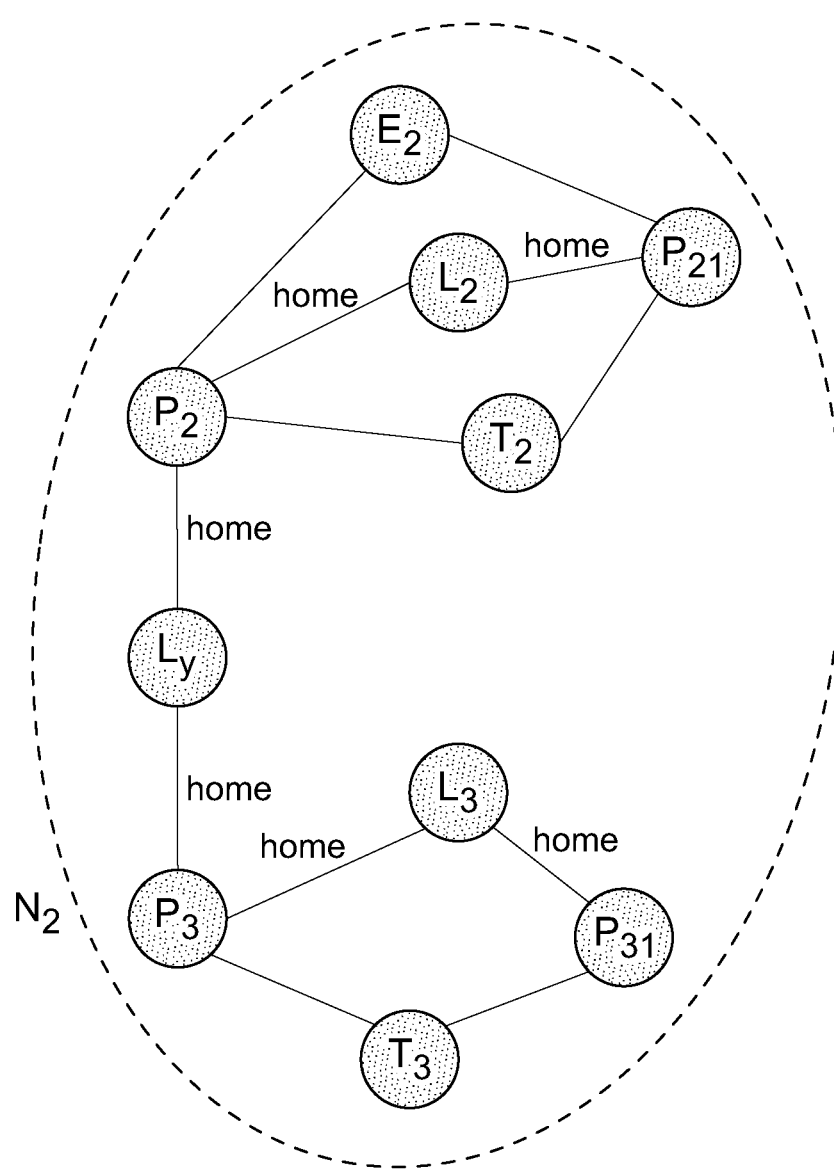
FIG. 21F illustrates an example schematic diagram for the operational real-time application for outputting the first sets of generated networks in a first graphical user interface, as a first input to an automated analytical process, or as a first input to an investigative system, according to some embodiments of the present technology.
Figure 16D:
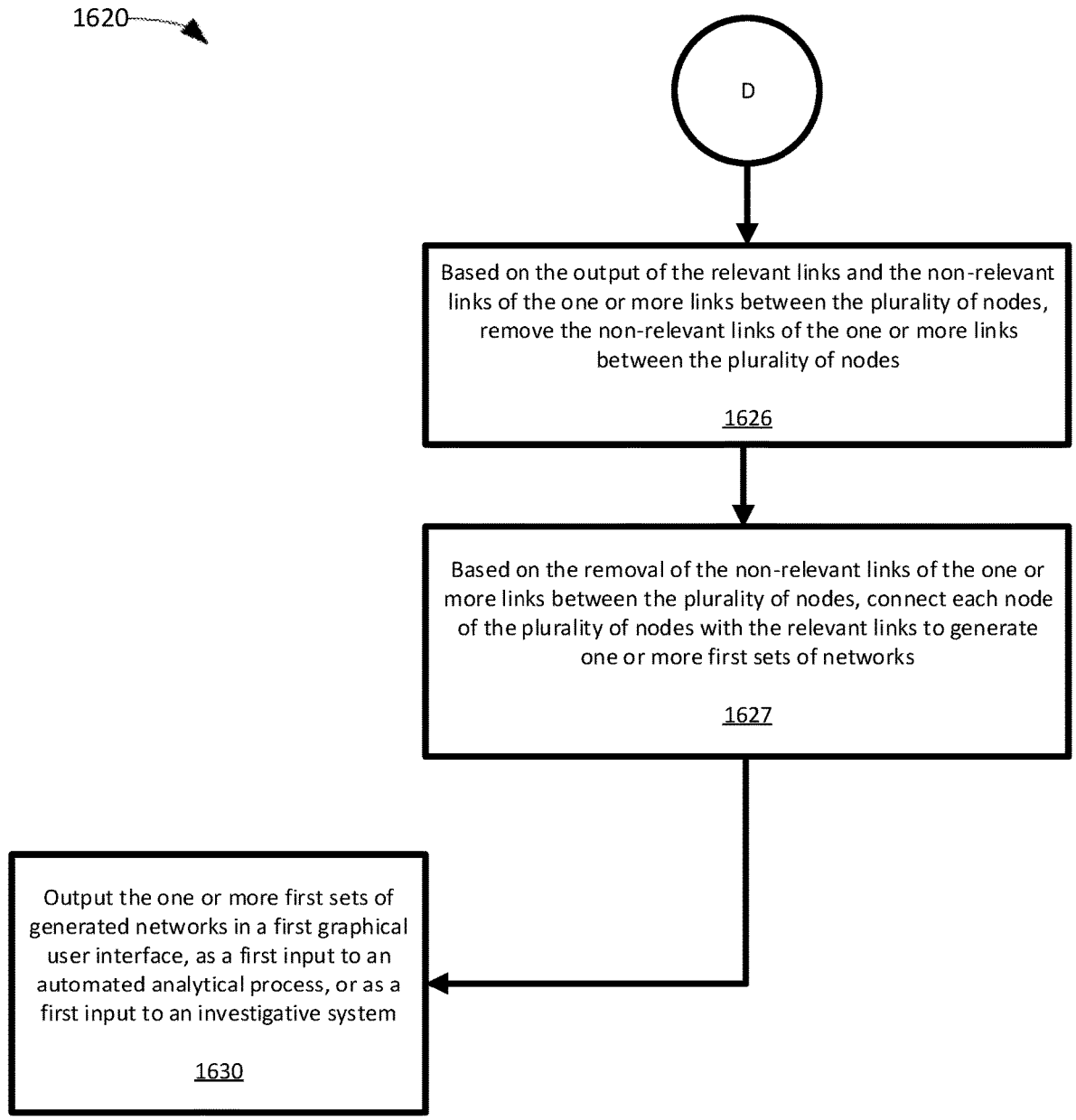

FIG. 21F illustrates an example schematic diagram for the operational real-time application for outputting the first sets of generated networks in a first graphical user interface, as a first input to an automated analytical process, or as a first input to an investigative system for the operational real-time application, according to some embodiments of the present technology.

For example, as shown in schematic diagram 2150 of FIG. 21F, the computing device may output the one or more first sets of generated networks (e.g., $N_2$) in a first graphical user interface, as a first input to an automated analytical process, or as a first input to an investigative system.

Figure 16D:
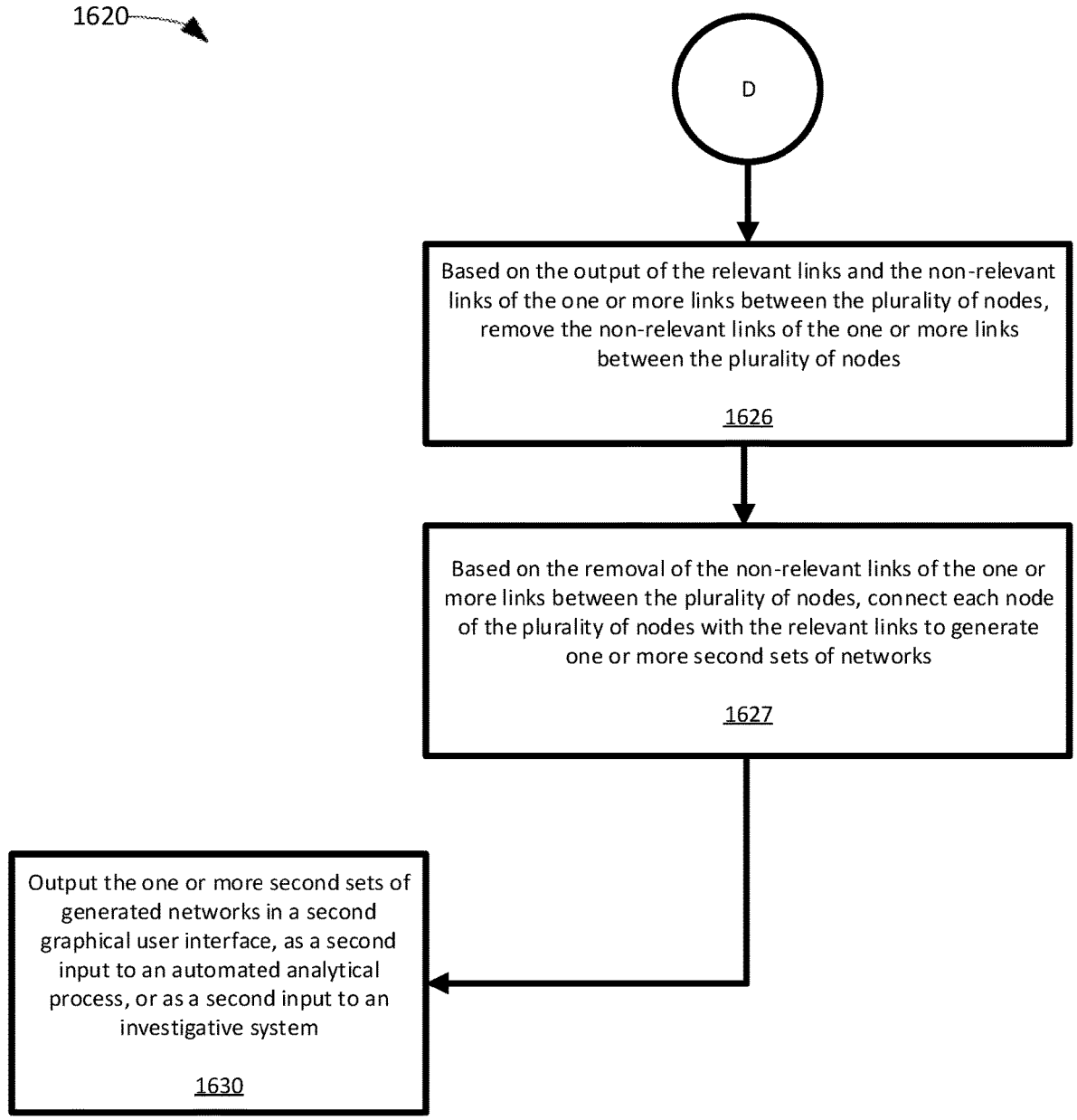

FIGS. 16C and 16D illustrate flow diagrams for executing operations for the operational batch application by applying the trained model to predict the relevant network relationships and outputting the one or more first sets of generated networks in a first graphical user interface, as a first input to an automated analytical process, or as a first input to an investigative system, according to some embodiments of the present technology.

For block 1621 in flow diagram 1620 of FIG. 16C, the computing device may obtain the first data set or a second data set associated with the plurality of nodes.

The first data set may include a training data set (e.g., material details, logistics information, parts and supplies, bank loan applications, bank accounts, police incident reports, income tax returns, insurance claims, watchlist entries, invoices, purchase orders, transactions, user accounts, ballistic reports, audit logs, network device information, healthcare records, property registrations documents, license applications, etc.) for a plurality of nodes and one or more node attributes for the plurality of nodes for training a first model.

The second data set may include a trained model dataset.

The plurality of nodes may include, for example, data representing at least one person, at least one location, at least one telephone number, at least one email address, at least one business, at least one application, at least one account, at least one vehicle, at least one IP address, at least one organization, at least one agent, at least one supplier, or at least one event.

For example, as shown in table 1421 of FIG. 14B, the computing device may obtain the first data set associated with the plurality of nodes (e.g., column "Nodes" of table 1421).

For example, as shown in table 1425 of FIG. 14C, the computing device may obtain the first data set associated with the plurality of nodes (e.g., column "Links of Nodes" in table 1425).

For example, as shown in table 1431 of FIG. 14D, the computing device may obtain a second data set associated with the plurality of nodes (e.g., column "Links of Nodes" in table 1431).

For block 1622 and block 1623 in flow diagram 1620 of FIG. 16C, the computing device may, for each node of the plurality of nodes from the first data set or the second data set, execute operations including: determine the one or more features for the one or more links between the plurality of nodes.

For example, as shown in table 1431 of FIG. 14D, the computing device may, for each node of the plurality of nodes from the second data set, execute operations including: determine the one or more features (e.g., Node Attributes including "Node 1 Type" and Node 2 Type", and "Node 1 Value", Link Attributes including "Role", and Node Attribute Computations including "Node 2 related value", "Linked node 1 count", and "Linked node 2 count") for one or more links between the plurality of nodes (e.g., Links between Node 1 ID "$D_{64}$" and Node 2 ID "$L_{62}$" in row 1432 of table 1431).

For block 1622 and block 1624 in flow diagram 1620 of FIG. 16C, the computing device may, for each node of the plurality of nodes from the first data set or the second data set, execute operations including: based on the determination of the one or more features for the one or more links between the plurality of nodes, apply the trained first model to the one or more links between the plurality of nodes.

The application of the trained first model (i.e., a decision tree, a random forest, a neural network, or another type of predictive model), by the computing device, may include running the trained first model on each row of the first data set (e.g., table 1421 in FIG. 14B or table 1425 in FIG. 14C) or second data set (e.g., table 1431 in FIG. 14D).

The application of the trained first model (i.e., a decision tree, a random forest, a neural network, or another type of predictive model), by the computing device, may include determining whether the one or more links are relevant links or non-relevant links by predicting a probability or other continuous number (e.g., a number between 0.000000 and 1.000000) as an indication of the likelihood that the one more links include relevant links or non-relevant links.

For block 1622 and block 1625 in flow diagram 1620 of FIG. 16C, the computing device may, for each node of the plurality of nodes from the first data set or the second data set, execute operations including: based on the application of the trained first model to the one or more links between the plurality of nodes, output the relevant links and non-relevant links of the one or more links between the plurality of nodes.

Figure 19A:
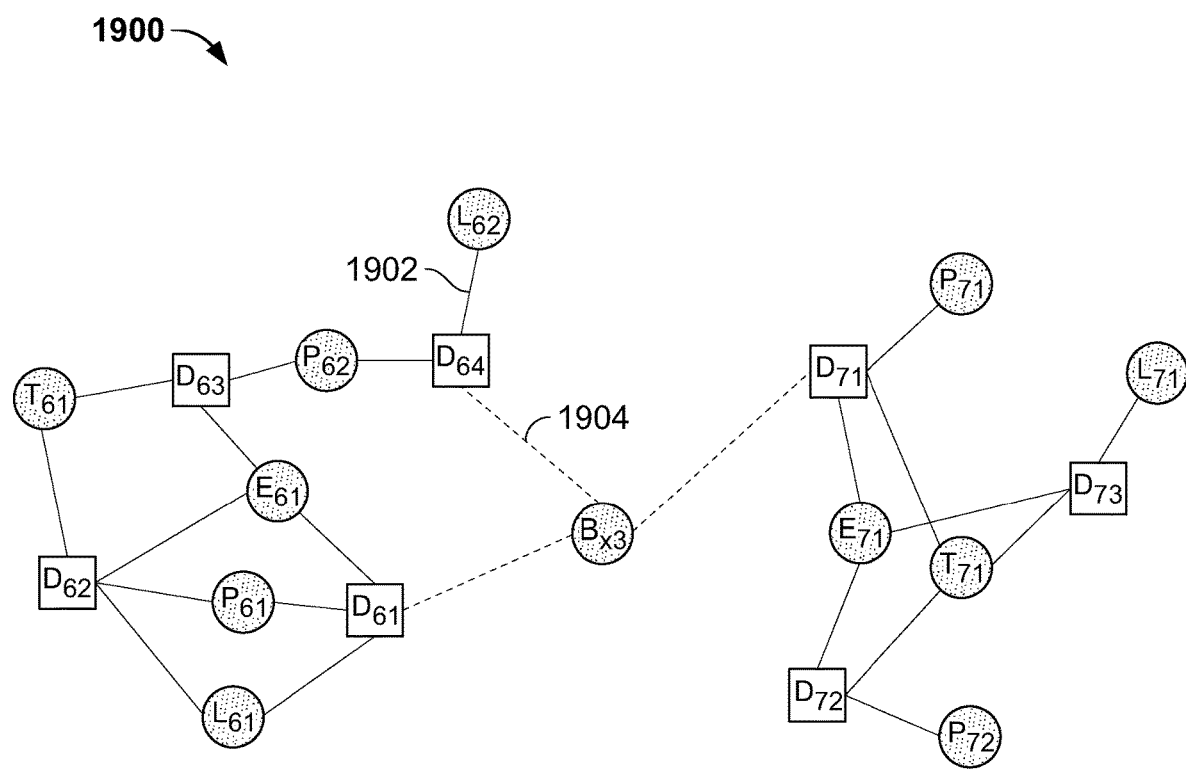
FIG. 19A illustrates an example schematic diagram for the operational batch application to output relevant and non-relevant links between nodes, according to some embodiments of the present technology.

FIG. 19A illustrates an example schematic diagram for the operational batch application to output relevant and non-relevant links between nodes, according to some embodiments of the present technology.

For example, as shown in schematic diagram 1900 of FIG. 19A, the computing device may, for each node of the plurality of nodes from the first data set or the second data set, execute operations including: based on the application of the trained first model to the one or more links between the plurality of nodes, output the relevant links (e.g., Link 7 1902 between Node $D_{64}$ and Node $L_{62}$) and non-relevant links (e.g., Link 8 1904 between Node $D_{64}$ and Node $B_{x3}$) of the one or more links between the plurality of nodes.

For block 1622 in flow diagram 1620 of FIG. 16C and block 1626 in flow diagram 1620 of FIG. 16D, the computing device may, for each node of the plurality of nodes from the first data set or the second data set, execute operations including: based on the output of the relevant links and the non-relevant links of the one or more links between the plurality of nodes, remove the non-relevant links of the one or more links between the plurality of nodes.

Figure 19B:
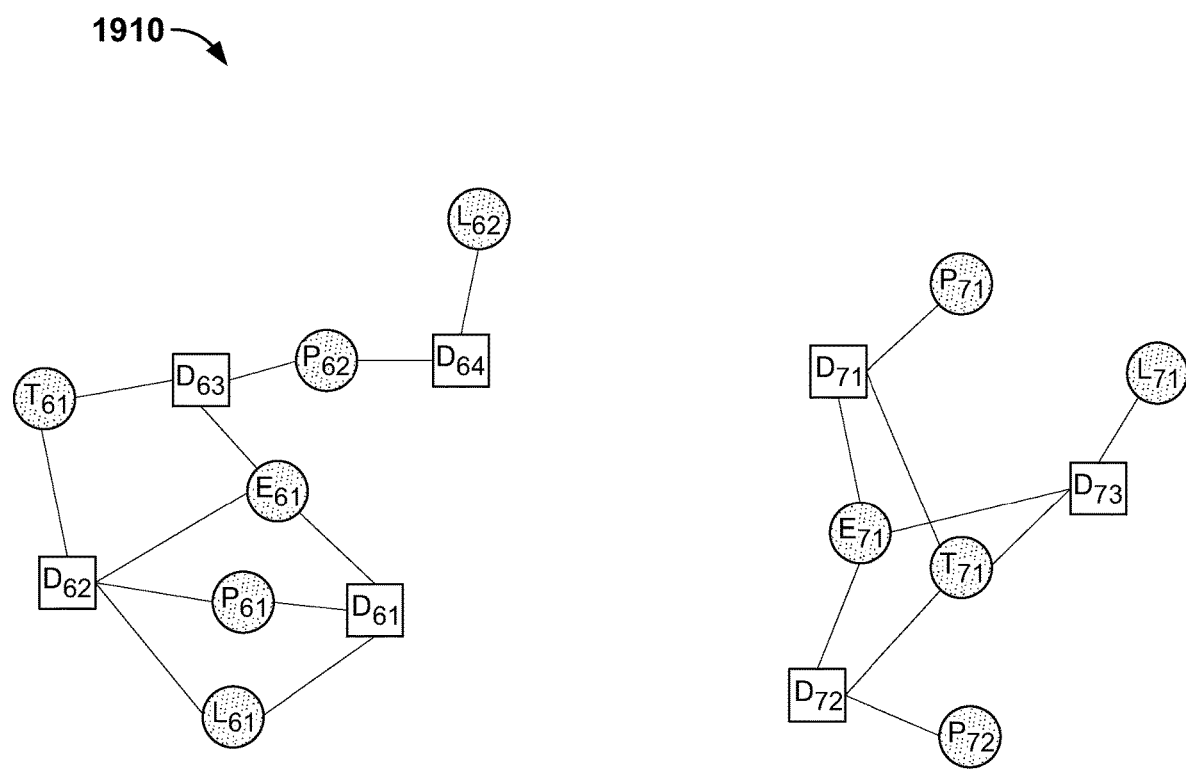
FIG. 19B illustrates an example schematic diagram for the operational batch application to remove the non-relevant links between nodes, according to some embodiments of the present technology.

For example, as shown in schematic diagram 1910 of FIG. 19B, based on the output of the relevant links and the non-relevant links of the one or more links between the plurality of nodes, the computing device may, for each node of the plurality of nodes from the first data set or the second data set, execute operations including: remove the non-relevant links (e.g., Link 8 1904 between Node $D_{64}$ and Node $B_{x3}$ as shown in schematic diagram 1900) of the one or more links between the plurality of nodes.

For block 1622 in flow diagram 1620 of FIG. 16C and block 1627 in flow diagram 1620 of FIG. 16D, the computing device may, for each node of the plurality of nodes from the first data set or the second data set, execute operations including: based on the removal of the non-relevant links of the one or more links between the plurality of nodes, connect each node of the plurality of nodes with the relevant links to generate one or more first sets of networks.

Figure 19C:
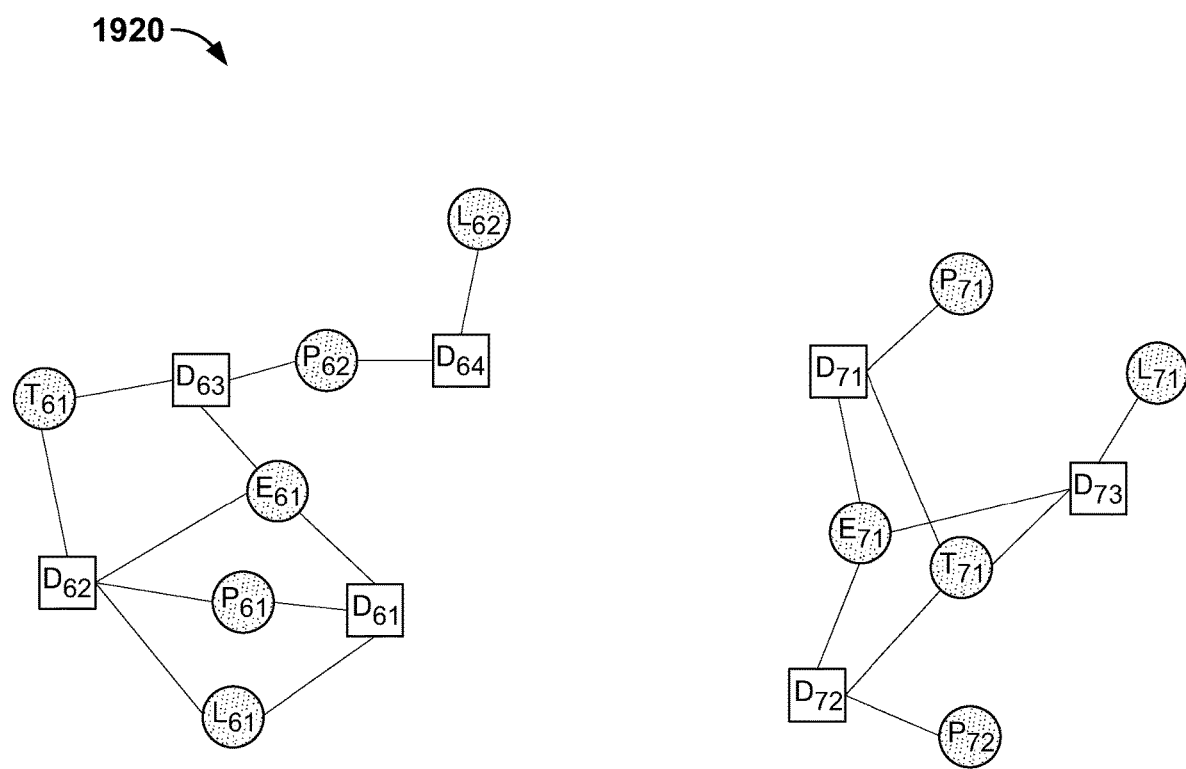
FIG. 19C illustrates an example schematic diagram for the operational batch application to connect nodes for the relevant links, according to some embodiments of the present technology.

For example, as shown in schematic diagram 1920 of FIG. 19C, the computing device may, for each node of the plurality of nodes from the first data set or the second data set, execute operations including: based on the removal of the non-relevant links of the one or more links between the plurality of nodes, connect each node of the plurality of nodes with the relevant links (e.g., Link 7 1902 between Node $D_{64}$ and Node $L_{62}$ as shown in schematic diagram 1900) to generate the one or more first sets of networks.

Alternatively, or additionally, the computing device may obtain the first data set or the second data set associated with the plurality of nodes. Based on the first data set or the second data set associated with the plurality of nodes, the computing device may determine the one or more features for the one or more links between the plurality of nodes. Based on the determination of the one or more features for the one or more links between the plurality of nodes, the computing device may apply the trained updated model to the one or more links between the plurality of nodes. Based on the application of the trained updated model to the one or more links between the plurality of nodes, the computing device may output the relevant links and the non-relevant links of the one or more links between the plurality of nodes. Based on the output of the relevant links and the non-relevant links of the one or more links between the plurality of nodes, the computing device may remove the non-relevant links of the one or more links between the plurality of nodes. Based on the removal of the non-relevant links of the one or more links between the plurality of nodes, the computing device may connect each node of the plurality of nodes with the relevant links to generate the one or more second sets of networks. The computing device may output the one or more second sets of generated networks in a second graphical user interface, as a second input to an automated analytical process, or as a second input to an investigative system.

For block 1630 in flow diagram 1620 of FIG. 16D, the computing device may output the one or more first sets of generated networks in a first graphical user interface, as a first input to an automated analytical process, or as a first input to an investigative system for the operational batch application.

Figure 19D:
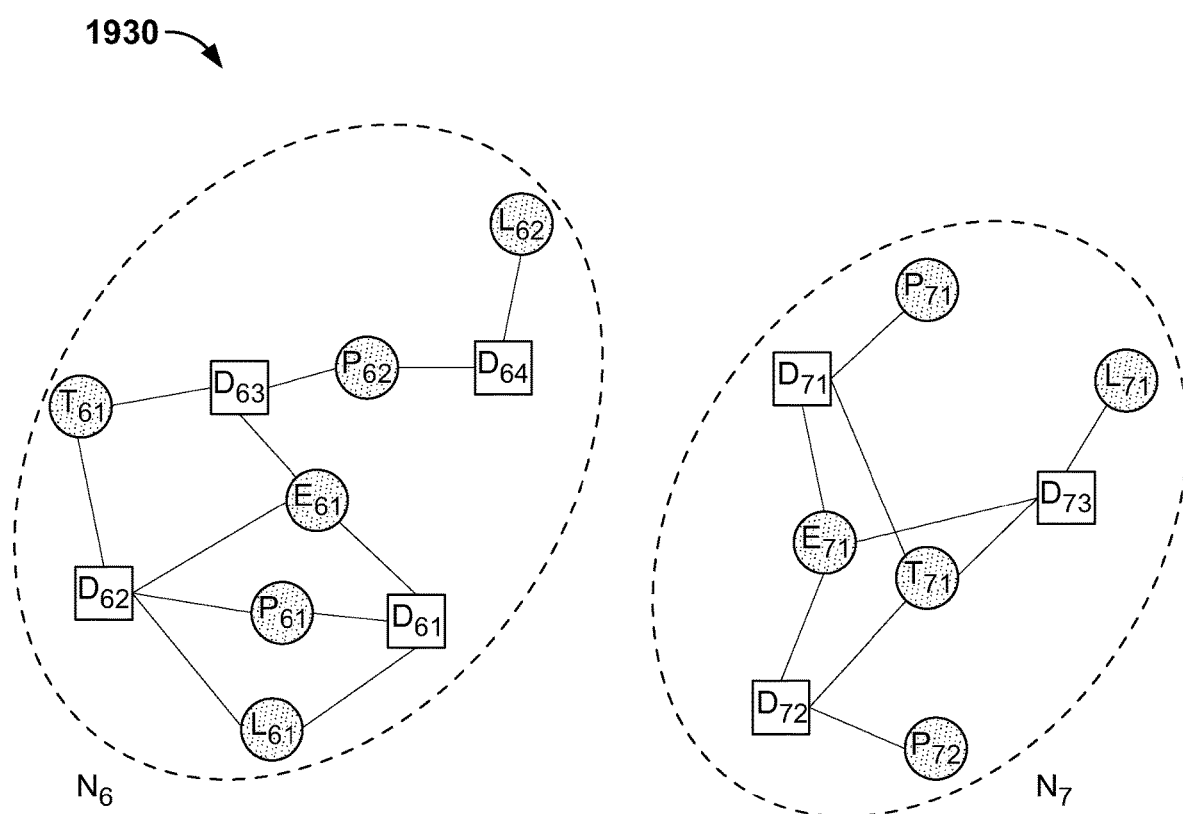
FIG. 19D illustrates an example schematic diagram for the operational batch application to output the first sets of generated networks in a first graphical user interface, as a first input to an automated analytical process, or as a first input to an investigative system, according to some embodiments of the present technology.

For example, as shown in schematic diagram 1930 of FIG. 19D, the computing device may output the one or more first sets of generated networks (e.g., $N_6$ and $N_7$) in a first graphical user interface, as a first input to an automated analytical process, or as a first input to an investigative system for the operational batch application.

The foregoing description of certain examples, including illustrated examples, has been presented only for the purpose of illustration and description and is not intended to be exhaustive or to limit the disclosure to the precise forms disclosed. Numerous modifications, adaptations, formats, and uses thereof will be apparent to those skilled in the art without departing from the scope of the disclosure. The examples disclosed herein can be combined or rearranged to yield additional examples.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims. The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments. In situations herein, a "prediction" may be referred to as a "forecast".

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be rearranged. A process is terminated when its operations are completed, but can have additional operations not included in a figure. A process can correspond to a method, a function, a procedure, a subroutine, a subprogram, etc. When a process corresponds to a function, its termination can correspond to a return of the function to the calling function or the main function. The processes may be performed in parallel using a plurality of threads and/or a plurality of worker computing devices.

Systems depicted in some of the figures can be provided in various configurations. In some examples, the systems can be configured as a distributed system where one or more components of the system are distributed across one or more networks in a cloud computing system.

What is claimed is:

1. A computer-program product tangibly embodied in a non-transitory machine-readable storage medium, the computer-program product including system instructions operable to cause a computing device to:

obtain a first data set associated with a plurality of nodes to generate one or more sets of networks;

train a first model on the first data set using a first graph to predict relevant links between the plurality of nodes by executing operations comprising:

determine one or more features for one or more links between the plurality of nodes;

determine a target variable indicator for the one or more links between the plurality of nodes using the first graph by executing operations comprising:

determine a set of subgraphs from the first graph;

determine whether each of the one or more links between each node of the plurality of nodes connect within a single subgraph of the set of subgraphs from the first graph;

based on the determination of whether each of the one or more links between each node of the plurality of nodes connect within the single subgraph of the set of subgraphs from the first graph, label the one or more links as intra-community links in the single subgraph of the set of subgraphs from the first graph;

determine whether each of the one or more links between each node of the plurality of nodes connect between at least two subgraphs of the set of subgraphs from the first graph;

based on the determination of whether each of the one or more links between each node of the plurality of nodes connect between the at least two subgraphs of the set of subgraphs from the first graph, label the one or more links as inter-community links in the at least two subgraphs of the set of subgraphs from the first graph;

output the labeled one or more links as the intra-community links in the single subgraph of the set of subgraphs from the first graph; and output the labeled one or more links as the inter-community links in the at least two subgraphs of the set of subgraphs from the first graph; and
based on the determination of the one or more features and the determination of the target variable indicator for the one or more links between the plurality of nodes using the first graph, train the first model to predict the relevant links of the one or more links between the plurality of nodes, wherein the relevant links comprise the intra-community links;
obtain the first data set or a second data set associated with the plurality of nodes;
determine a first node for the first data set or the second data set associated with the plurality of nodes;
(A) from the first node from the first data set or the second data set associated with the plurality of nodes, execute operations comprising:
(B) determine, for the first node, the one or more features for the one or more links between the plurality of nodes connected to the first node;
(C) based on the determination of the one or more features for the one or more links between the plurality of nodes connected to the first node, apply the trained first model to the one or more links between the plurality of nodes from the first node;
(D) based on the application of the trained first model to the one or more links between the plurality of nodes from the first node, output the relevant links and non-relevant links of the one or more links between the plurality of nodes from the first node and output a trained model variable, wherein the non-relevant links comprise the inter-community links;
(E) based on the output of the relevant links and the non-relevant links of the one or more links between the plurality of nodes from the first node, connect the first node to each node of the plurality of nodes for the relevant links in one or more first sets of generated networks;
based on the output of the trained model variable, optimize the application of the trained first model to the one or more links between the plurality of nodes by automatically computing a first threshold for the trained model variable for one or more factors including network size; and
for each node of the plurality of nodes connected to the first node based on the relevant links, repeat (A) to (E) to iteratively connect each node from the plurality of nodes to the one or more first sets of generated networks for each of the relevant links until the relevant links for connection to the plurality of nodes are not present; and
output the one or more first sets of generated networks in a first graphical user interface, as a first input to an automated analytical process, or as a first input to an investigative system.

2. The computer-program product of claim 1, wherein the one or more features for the one or more links between the plurality of nodes comprise:
for each of the one or more links between two nodes of the plurality of nodes:
one or more link attributes for the one or more links between each pair of connected nodes of the plurality of nodes,
one or more node attributes of each pair of the connected nodes at a first end or a second end of the one or more links,
one or more node attribute computations or one or more node attribute thresholds applied to each pair of the connected nodes at the first end or the second end of the one or more links,
one or more link attribute computations or one or more link attribute thresholds applied to one or more attributes of the one or more links for each pair of the connected nodes, and
a first network for the one or more links between each pair of the connected nodes that connects a second node from each pair of the connected nodes to a set of nodes from each pair of the connected nodes.

3. The computer-program product of claim 2, wherein the one or more link attributes comprise one or more roles.

4. The computer-program product of claim 2, wherein the one or more node attributes comprise one or more node types, one or more date of births, or one or more values.

5. The computer-program product of claim 2, wherein the one or more node attribute computations comprise one or more sums of one or more related applications, one or more counts of one or more nodes that are connected to a selected node in a relationship, or the one or more counts of the one or more nodes for the one or more node attributes that are connected to the selected node in the relationship.

6. The computer-program product of claim 1, wherein the plurality of nodes comprises data representing at least one person, at least one location, at least one telephone number, at least one email address, at least one business, at least one application, at least one account, at least one vehicle, at least one IP address, at least one organization, at least one agent, at least one supplier, or at least one event.

7. The computer-program product of claim 1, wherein the first model comprises a decision tree, a random forest, a neural network, or another type of predictive model.

8. The computer-program product of claim 1, wherein the application of the trained first model to the one or more links between the plurality of nodes is further optimized based on the output of the trained model variable by:
applying a second threshold for the trained model variable to each of the one or more links or to the one or more links for the one or more factors including mean, standard deviation, or the network size, and
applying a third threshold for the trained model variable from one or more user preferences.

9. The computer-program product of claim 1, wherein the application of the trained first model to the one or more links between the plurality of nodes comprises running the trained first model on each row of the first data set or the second data set.

10. The computer-program product of claim 1, wherein the application of the trained first model to the one or more links between the plurality of nodes comprises predicting a probability or other continuous number for determining whether the one or more links between the plurality of nodes include relevant links or non-relevant links.

11. A computer-implemented method comprising:
obtaining a first data set associated with a plurality of nodes to generate one or more sets of networks;
training a first model on the first data set using a first graph to predict relevant links between the plurality of nodes for operations comprising:
determining one or more features for one or more links between the plurality of nodes;
determining a target variable indicator for the one or more links between the plurality of nodes using the first graph by:
determining a set of subgraphs from the first graph;

determining whether each of the one or more links between each node of the plurality of nodes connect within a single subgraph of the set of subgraphs from the first graph;

based on the determination of whether each of the one or more links between each node of the plurality of nodes connect within the single subgraph of the set of subgraphs from the first graph, labeling the one or more links as intra-community links in the single subgraph of the set of subgraphs from the first graph;

determining whether each of the one or more links between each node of the plurality of nodes connect between at least two subgraphs of the set of subgraphs from the first graph;

based on the determination of whether each of the one or more links between each node of the plurality of nodes connect between the at least two subgraphs of the set of subgraphs from the first graph, labeling the one or more links as inter-community links in the at least two subgraphs of the set of subgraphs from the first graph;

outputting the labeled one or more links as the intra-community links in the single subgraph of the set of subgraphs from the first graph; and outputting the labeled one or more links as the inter-community links in the at least two subgraphs of the set of subgraphs from the first graph; and based on the determination of the one or more features and the determination of the target variable indicator for the one or more links between the plurality of nodes using the first graph, training the first model to predict the relevant links of the one or more links between the plurality of nodes, wherein the relevant links comprise the intra-community links;

obtaining the first data set or a second data set associated with the plurality of nodes;

determining a first node for the first data set or the second data set associated with the plurality of nodes;

(A) from the first node from the first data set or the second data set associated with the plurality of nodes, for operations comprising:

(B) determining, for the first node, the one or more features for the one or more links between the plurality of nodes connected to the first node;

(C) based on the determination of the one or more features for the one or more links between the plurality of nodes connected to the first node, applying the trained first model to the one or more links between the plurality of nodes from the first node;

(D) based on the application of the trained first model to the one or more links between the plurality of nodes from the first node, outputting the relevant links and non-relevant links of the one or more links between the plurality of nodes from the first node and outputting a trained model variable, wherein the non-relevant links comprise the inter-community links;

(E) based on the outputting of the relevant links and the non-relevant links of the one or more links between the plurality of nodes from the first node, connecting the first node to the relevant links in one or more first sets of generated networks;

based on the outputting of the trained model variable, optimizing the application of the trained first model to the one or more links between the plurality of nodes by automatically computing a first threshold for the trained model variable for one or more factors including network size; and for each node of the plurality of nodes connected to the first node based on the relevant links, repeating (A) to (E) to iteratively connect each node from the plurality of nodes to the one or more first sets of generated networks for each of the relevant links until the relevant links for connection to the plurality of nodes are not present; and outputting the one or more first sets of generated networks in a first graphical user interface, as a first input to an automated analytical process, or as a first input to an investigative system.

12. The computer-implemented method of claim 11, wherein the one or more features for the one or more links between the plurality of nodes comprise:

for each of the one or more links between two nodes of the plurality of nodes:

one or more link attributes for the one or more links between each pair of connected nodes of the plurality of nodes, one or more node attributes of each pair of the connected nodes at a first end or a second end of the one or more links, one or more node attribute computations or one or more node attribute thresholds applied to each pair of the connected nodes at the first end or the second end of the one or more links, one or more link attribute computations or one or more link attribute thresholds applied to one or more attributes of the one or more links for each pair of the connected nodes, and a first network for the one or more links between each pair of the connected nodes that connects a second node from each pair of the connected nodes to a set of nodes from each pair of the connected nodes.

13. The computer-implemented method of claim 12, wherein the one or more link attributes comprise one or more roles.

14. The computer-implemented method of claim 12, wherein the one or more node attributes comprise one or more node types, one or more date of births, or one or more values.

15. The computer-implemented method of claim 12, wherein the one or more node attribute computations comprise one or more sums of one or more related applications, one or more counts of one or more nodes that are connected to a selected node in a relationship, or the one or more counts of the one or more nodes for the one or more node attributes that are connected to the selected node in the relationship.

16. The computer-implemented method of claim 11, wherein the plurality of nodes comprises data representing at least one person, at least one location, at least one telephone number, at least one email address, at least one business, at least one application, at least one account, at least one vehicle, at least one IP address, at least one organization, at least one agent, at least one supplier, or at least one event.

17. The computer-implemented method of claim 11, wherein the first model comprises a decision tree, a random forest, a neural network, or another type of predictive model.

18. The computer-implemented method of claim 11, wherein the application of the trained first model to the one or more links between the plurality of nodes comprises running the trained first model on each row of the first data set or the second data set.

19. The computer-implemented method of claim 11, wherein the application of the trained first model to the one or more links between the plurality of nodes comprises predicting a probability or other continuous number for determining whether the one or more links between the plurality of nodes include relevant links or non-relevant links.

20. The computer-implemented method of claim 11, wherein the application of the trained first model to the one or more links between the plurality of nodes is further optimized based on the outputting of the trained model variable by:
applying a second threshold for the trained model variable to each of the one or more links or to the one or more links for the one or more factors including mean, standard deviation, or the network size, and
applying a third threshold for the trained model variable from one or more user preferences.

21. A computing device comprising processor and memory, the memory containing instructions executable by the processor wherein the computing device is configured to:
obtain a first data set associated with a plurality of nodes to generate one or more sets of networks;
train a first model on the first data set using a first graph to predict relevant links between the plurality of nodes by executing operations comprising:
determine one or more features for one or more links between the plurality of nodes;
determine a target variable indicator for the one or more links between the plurality of nodes using the first graph by executing operations comprising:
determine a set of subgraphs from the first graph;
determine whether each of the one or more links between each node of the plurality of nodes connect within a single subgraph of the set of subgraphs from the first graph;
based on the determination of whether each of the one or more links between each node of the plurality of nodes connect within the single subgraph of the set of subgraphs from the first graph, label the one or more links as intra-community links in the single subgraph of the set of subgraphs from the first graph;
determine whether each of the one or more links between each node of the plurality of nodes connect between at least two subgraphs of the set of subgraphs from the first graph;
based on the determination of whether each of the one or more links between each node of the plurality of nodes connect between the at least two subgraphs of the set of subgraphs from the first graph, label the one or more links as inter-community links in the at least two subgraphs of the set of subgraphs from the first graph;
output the labeled one or more links as the intra-community links in the single subgraph of the set of subgraphs from the first graph; and
output the labeled one or more links as the inter-community links in the at least two subgraphs of the set of subgraphs from the first graph; and
based on the determination of the one or more features and the determination of the target variable indicator for the one or more links between the plurality of nodes using the first graph, train the first model to predict the relevant links of the one or more links between the plurality of nodes, wherein the relevant links comprise the intra-community links;
obtain the first data set or a second data set associated with the plurality of nodes;
determine a first node for the first data set or the second data set associated with the plurality of nodes;
(A) from the first node from the first data set or the second data set associated with the plurality of nodes, execute operations comprising:
(B) determine, for the first node, the one or more features for the one or more links between the plurality of nodes connected to the first node;
(C) based on the determination of the one or more features for the one or more links between the plurality of nodes connected to the first node, apply the trained first model to the one or more links between the plurality of nodes from the first node;
(D) based on the application of the trained first model to the one or more links between the plurality of nodes from the first node, output the relevant links and non-relevant links of the one or more links between the plurality of nodes from the first node and output a trained model variable, wherein the non-relevant links comprise the inter-community links;
(E) based on the output of the relevant links and the non-relevant links of the one or more links between the plurality of nodes from the first node, connect the first node to each node of the plurality of nodes for the relevant links in one or more first sets of generated networks;
based on the output of the trained model variable, optimize the application of the trained first model to the one or more links between the plurality of nodes by automatically computing a first threshold for the trained model variable for one or more factors including network size; and
for each node of the plurality of nodes connected to the first node based on the relevant links, repeat (A) to (E) to iteratively connect each node from the plurality of nodes to the one or more first sets of generated networks for each of the relevant links until the relevant links for connection to the plurality of nodes are not present; and
output the one or more first sets of generated networks in a first graphical user interface, as a first input to an automated analytical process, or as a first input to an investigative system.

22. The computing device of claim 21, wherein the one or more features for the one or more links between the plurality of nodes comprise:
for each of the one or more links between two nodes of the plurality of nodes:
one or more link attributes for the one or more links between each pair of connected nodes of the plurality of nodes,
one or more node attributes of each pair of the connected nodes at a first end or a second end of the one or more links,
one or more node attribute computations or one or more node attribute thresholds applied to each pair of the connected nodes at the first end or the second end of the one or more links,
one or more link attribute computations or one or more link attribute thresholds applied to one or more attributes of the one or more links for each pair of the connected nodes, and
a first network for the one or more links between each pair of the connected nodes that connects a second node from each pair of the connected nodes to a set of nodes from each pair of the connected nodes.

23. The computing device of claim 22, wherein the one or more link attributes comprise one or more roles.

24. The computing device of claim 22, wherein the one or more node attributes comprise one or more node types, one or more date of births, or one or more values.

25. The computing device of claim 22, wherein the one or more node attribute computations comprise one or more sums of one or more related applications, one or more counts of one or more nodes that are connected to a selected node in a relationship, or the one or more counts of the one or more nodes for the one or more node attributes that are connected to the selected node in the relationship.

26. The computing device of claim 21, wherein the plurality of nodes comprises data representing at least one person, at least one location, at least one telephone number, at least one email address, at least one business, at least one application, at least one account, at least one vehicle, at least one IP address, at least one organization, at least one agent, at least one supplier, or at least one event.

27. The computing device of claim 21, wherein the first model comprises a decision tree, a random forest, a neural network, or another type of predictive model.

28. The computing device of claim 21, wherein the application of the trained first model to the one or more links between the plurality of nodes is further optimized based on the output of the trained model variable by:
 applying a second threshold for the trained model variable to each of the one or more links or to the one or more links for the one or more factors including mean, standard deviation, or the network size, and
 applying a third threshold for the trained model variable from one or more user preferences.

29. The computing device of claim 21, wherein the application of the trained first model to the one or more links between the plurality of nodes comprises running the trained first model on each row of the first data set or the second data set.

30. The computing device of claim 21, wherein the application of the trained first model to the one or more links between the plurality of nodes comprises predicting a probability or other continuous number for determining whether the one or more links between the plurality of nodes include relevant links or non-relevant links.

* * * * *

UNITED STATES PATENT AND TRADEMARK OFFICE
CERTIFICATE OF CORRECTION

PATENT NO. : 12,277,511 B2
APPLICATION NO. : 18/777760
DATED : April 15, 2025
INVENTOR(S) : Nicholas Akbar Ablitt et al.

It is certified that error appears in the above-identified patent and that said Letters Patent is hereby corrected as shown below:

On the Title Page

Item (57) ABSTRACT

Delete the phrase "relevant links to generate one or more second sets of" and replace with --relevant links to generate one or more first sets of--.

Delete the phrase "networks, and outputs the one or more second sets of" and replace with --networks, and outputs the one or more first sets of--.

In the Drawings

Sheet 15, Fig. 14B:
In the column "Nodes", the numbers and/or letters following the letters D, B, P, L, E, and T for the Node ID should be subscripted.

Sheet 16, Fig. 14C:
In the columns "Links of Nodes", the numbers and/or letters following the letters D, B, P, L, E, and T for Node 1 ID and Node 2 ID should be subscripted.

Sheet 17: Fig. 14D:
In the columns "Links of Nodes", the numbers and/or letters following the letters D, B, P, L, E, and T for Node 1 ID and Node 2 ID should be subscripted.

Sheet 27, Fig. 17B:
In the column "Nodes", the numbers and/or letters following the letters D, B, P, L, E, and T for the Node ID should be subscripted.

Sheet 28, Fig. 17C:

Signed and Sealed this
Seventeenth Day of June, 2025

Coke Morgan Stewart
*Acting Director of the United States Patent and Trademark Office*

CERTIFICATE OF CORRECTION (continued)
U.S. Pat. No. 12,277,511 B2

In the column "Nodes", the numbers and/or letters following the letters D, B, P, L, E, and T for Node 1 ID and Node 2 ID should be subscripted.

Sheet 41, Fig. 20B:
In the columns "Links of Nodes", the numbers and/or letters following the letters P, L, E, and T for Node 1 ID and Node 2 ID should be subscripted.

In the Specification

Column 6, Line 7:
Delete the phrase "determine the target variable, according to some embodi-" and replace with --determine the target variable indicator, according to some embodi- --.

Column 6, Line 22:
Delete the phrase "first sets of networks for each of the relevant links, according" and replace with --first sets of generated networks for each of the relevant links, according--.

Column 6, Line 55:
Delete the phrase "rithm to determine the target variable, according to some" and replace with --rithm to determine the target variable indicator, according to some--.

Column 7, Line 4:
Delete the phrase "relationships between nodes to the first sets of networks for" and replace with --relationships between nodes to the first sets of generated networks for--.

Column 28, Line 33:
Delete the phrase "ESPE 1001 maintains the event block containership" and replace with --ESPE 800 maintains the event block containership--.

Column 41, Line 31:
Delete the phrase "one or more links between two of the nodes plurality of" and replace with --one or more links between two nodes of the plurality of nodes--.

Column 42, Line 51:
Delete the phrase "rithm to determine the target variable, according to some" and replace with --rithm to determine the target variable indicator, according to some--.

Column 43, Line 46:
Delete the phrase "determine the target variable, according to some embodi-" and replace with --determine the target variable indicator, according to some embodi- --.

Column 50, Line 42:
Delete the phrase "relevant links in one or more first sets of networks." and replace with --relevant links in one or more first sets of generated networks.--.

Column 50, Line 53:

Delete the phrase "1810) in one or more first sets of networks." and replace with --1810) in one or more first sets of generated networks.--.

Column 50, Line 64:
Delete the phrase "diagram 2110) in one or more first sets of networks." and replace with --diagram 2110) in one or more first sets of generated networks.--.

Column 51, Line 5:
Delete the phrase "of nodes to the one or more first sets of networks for each" and replace with --of nodes to the one or more first sets of generated networks for each--.

Column 51, Line 11:
Delete the phrase "first sets of networks for each of the relevant links, according" and replace with --first sets of generated networks for each of the relevant links, according--.

Column 51, Line 21:
Delete the phrase "plurality of nodes to the one or more first sets of networks" and replace with --plurality of nodes to the one or more first sets of generated networks--.

Column 51, Line 31:
Delete the phrase "plurality of nodes to the one or more first sets of networks" and replace with --plurality of nodes to the one or more first sets of generated networks--.

Column 51, Line 42:
Delete the phrase "networks for each of the relevant links until the relevant" and replace with --generated networks for each of the relevant links until the relevant--.

Column 51, Line 52:
Delete the phrase "networks for each of the relevant links until the relevant" and replace with --generated networks for each of the relevant links until the relevant--.

Column 51, Line 57:
Delete the phrase "attributes between nodes to the first sets of networks for each" and replace with --attributes between nodes to the first sets of generated networks for each--.

Column 51, Line 67:
Delete the phrase "nodes to the one or more first sets of networks for each of" and replace with --nodes to the one or more first sets of generated networks for each of--.

Column 52, Line 10:
Delete the phrase "of nodes to the one or more first sets of networks for each" and replace with --of nodes to the one or more first sets of generated networks for each--.

Column 52, Line 20:

Delete the phrase "plurality of nodes to the one or more first sets of networks" and replace with --plurality of nodes to the one or more first sets of generated networks--.